(12) United States Patent
Hofmeister et al.

(10) Patent No.: US 7,417,950 B2
(45) Date of Patent: Aug. 26, 2008

(54) METHOD AND APPARATUS FOR PERFORMING DATA FLOW INGRESS/EGRESS ADMISSION CONTROL IN A PROVIDER NETWORK

(75) Inventors: Ralph Theodore Hofmeister, Los Altos, CA (US); Ping Pan, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 982 days.

(21) Appl. No.: 10/769,891

(22) Filed: Feb. 3, 2004

(65) Prior Publication Data
US 2004/0156313 A1 Aug. 12, 2004

Related U.S. Application Data

(60) Provisional application No. 60/444,456, filed on Feb. 3, 2003, provisional application No. 60/444,440, filed on Feb. 3, 2003.

(51) Int. Cl.
*H04L 12/26* (2006.01)
(52) U.S. Cl. ...................... 370/230; 370/235
(58) Field of Classification Search ........................ None
See application file for complete search history.

(56) References Cited

U.S. PATENT DOCUMENTS

2002/0097730 A1* 7/2002 Langille et al. ............. 370/401
2003/0097443 A1* 5/2003 Gillett et al. ................ 709/225
2004/0066779 A1* 4/2004 Barrack et al. .............. 370/389
2004/0081172 A1* 4/2004 Ould-Brahim ......... 370/395.53
2004/0223498 A1* 11/2004 Sanderson et al. ..... 370/395.52

* cited by examiner

Primary Examiner—Firmin Backer
Assistant Examiner—Rhonda Murphy
(74) Attorney, Agent, or Firm—Clements Bernard Miller; Christopher L. Bernard; Tyler S. Brown

(57) ABSTRACT

A method, apparatus and network for transporting layer-2 frames, such as Ethernet MAC, ATM AAL5, and Frame Relay, over MPLS, SONET/SDH, or OTN optical transport networks as well as electrical transport networks is disclosed. The method establishes "pseudo-wires" between, for example, routers, Layer-2 packet switches, or SONET/SDH switches. Inter-related ingress and egress resource tables may be used by provider edge nodes to negotiate consistently managed data tunnels across a provider network on behalf of data flowing from/to a diverse base of customer edge nodes. Detailed network resource information particular to each of the data flows is exchanged between provider edge nodes during the creation of pseudo-wires. Admission control algorithms are applied at the ingress and egress points in order to manage the data flows into a provider network and exiting from a provider network to customer equipment. By applying pseudo-wire shuffling and preemption techniques, the providers can make better use of their network resources by admitting more pseudo-wires.

19 Claims, 42 Drawing Sheets

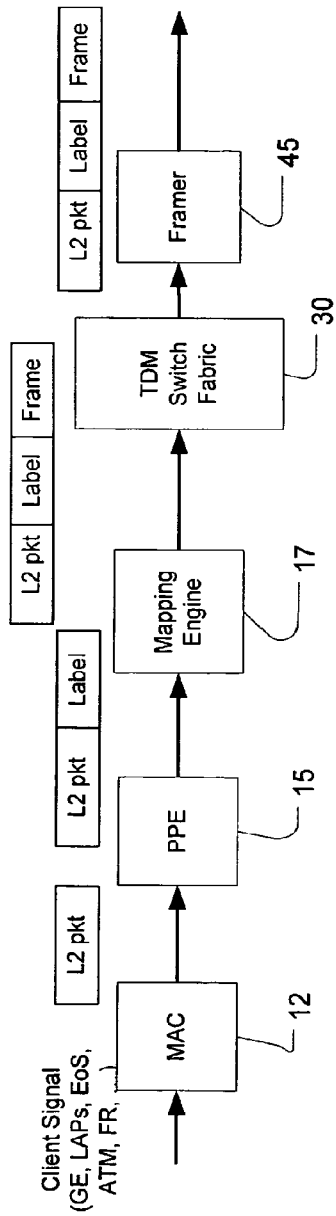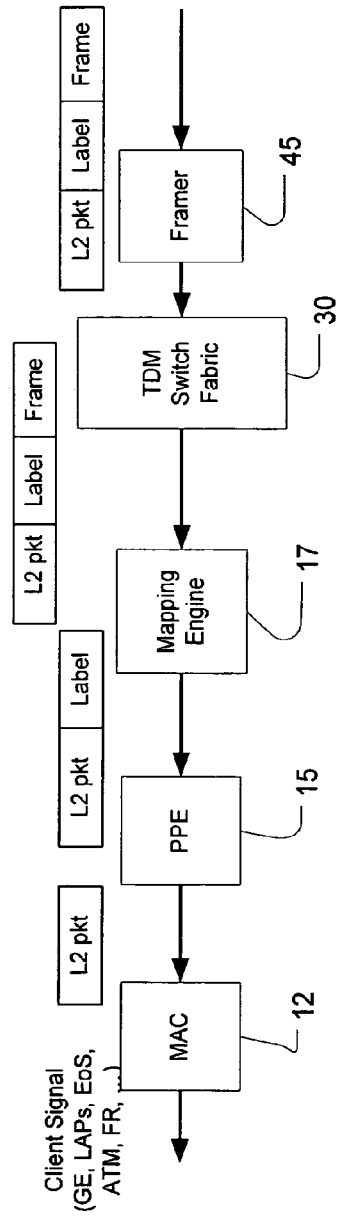

PACKET FILTER TABLE — 60

| PACKET FILTER (DATA INTERFACE, LABEL) | OUTGOING OPTICAL CONNECTION | ENCAPSULATION LABEL | FILTER PRIORITY | GUARANTEED QOS |
|---|---|---|---|---|
| PACKET FILTER-1 (PORT 1, ETHERNET VLAN 100) | SONET VCG NUMBER 3 | MPLS LABEL 10000 | 3 | X |
| PACKET FILTER-2 (PORT 5, ATM VCI/VPI 12/45) | SONET VCG NUMBER 3 | MPLS LABEL 20000 | 3 | Y |
| PACKET FILTER-3 (PORT 2, FR DLCI 900) | OPTICAL INTERFACE 1 | MPLS LABEL 500 | 3 | Z |
| PACKET FILTER-4 (PORT 1, MPLS LABEL 10000) | SONET VCG NUMBER 5 | MPLS LABEL 10001 | 1 | S |

Figure 7b

| CIRCUIT FILTER TABLE ⌐80 | | | |
|---|---|---|---|
| CIRCUIT FILTER (OPTICAL CONNECTION, LABEL) | OUTGOING DATA INTERFACE | OVERWRITTEN LABEL | GUARANTEED QOS |
| CIRCUIT FILTER-1 (SONET VCG 3, LABEL 20000) | DATA PORT 1 | ETHERNET VLAN 200 | X |
| CIRCUIT FILTER-2 (SONET VCG 3, LABEL 20001) | DATA PORT 2 | ATM VCI/VPI 23/56 | Y |
| CIRCUIT FILTER-3 (OPTICAL INTERFACE 1, LABEL 300) | DATA PORT 1 | NONE | Z |
| CIRCUIT FILTER-4 (SONET VCG 5, LABEL 12000) | DATA PORT 23 | FRAME RELAY DLCI 200 | S |
| CIRCUIT FILTER-5 (SONET VCG 3, LABEL 3) | HOST INTERFACE | NONE | T |

Figure 7c

| SESSION TABLE | | | |
|---|---|---|---|
| SESSION (CONTROL MESSAGE ID) | OUTGOING OPTICAL CONNECTION | ENCAPSULATION LABEL | GUARANTEED QOS |
| SESSION 1 (TCP SRC PORT 1345) | SONET VCG NUMBER 3 | MPLS LABEL 3 | X |
| SESSION 2 (TCP SRC PORT 3456) | SONET VCG NUMBER 3 | MPLS LABEL 3 | Y |
| SESSION 3 (UDP PORT 1998) | OPTICAL INTERFACE 1 | MPLS LABEL 10000 | Z |

Figure 7d

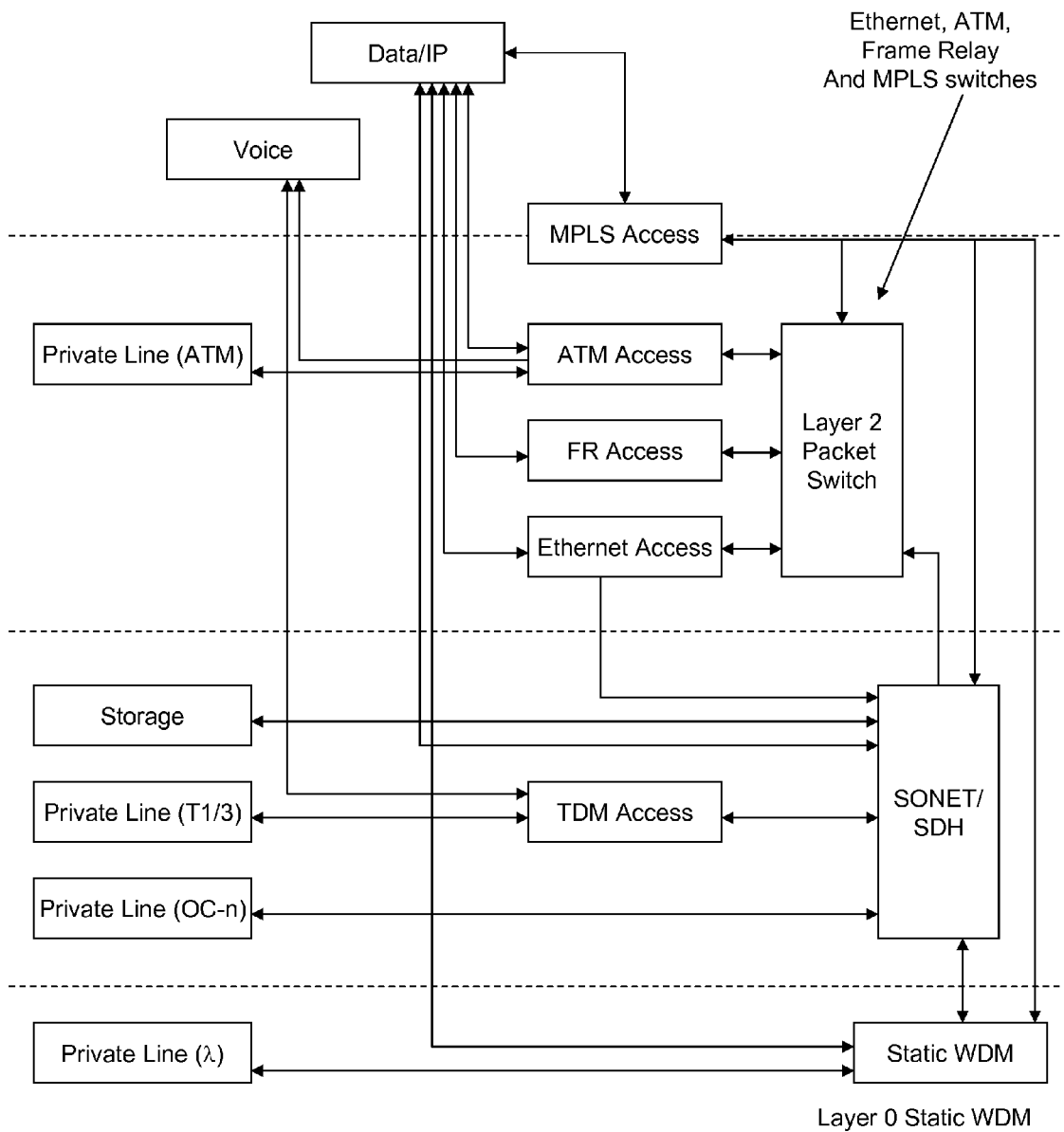
Figure 21
(Conventional)

| PACKET FILTER TABLE |||||||
|---|---|---|---|---|---|---|
| PACKET FILTER (DATA INTERFACE, LABEL) | DATA TUNNEL | ENCAPSULATION LABEL | CIR | CLASS | SETUP PRIORITY | HOLDING PRIORITY |
| PACKET FILTER-1 (PORT 1, ETHERNET VLAN 100) | SONET VCG NUMBER 3 | MPLS LABEL 10000 | 50 Mb/Sec | AF-1 | 3 | 5 |
| PACKET FILTER-2 (PORT 5, ATM VCI/VPI 12/45) | ROUTER INTERFACE 5 | MPLS LABEL 20000 | 8 Mb/Sec | EF | 3 | 5 |
| PACKET FILTER-3 (PORT 2, FR DLCI 900) | SONET VCG NUMBER 3 | MPLS LABEL 500 | 10 Mb/Sec | AF-1 | 3 | 5 |
| PACKET FILTER-4 (PORT 10) | ETHERNET INTERFACE 12 | MPLS LABEL 50001 | 1 Gb/Sec | AF-3 | 5 | 5 |

| CIRCUIT FILTER TABLE | | | | | | |
|---|---|---|---|---|---|---|
| CIRCUIT FILTER (DATA TUNNEL, LABEL) | OUTGOING DATA INTERFACE | CIR | CLASS | SETUP PRIORITY | HOLDING PRIORITY |
| CIRCUIT FILTER-1 (SONET VCG 3, LABEL 20000) | DATA PORT 1 | 50 Mb/Sec | AF-1 | 3 | 3 |
| CIRCUIT FILTER-2 (SONET VCG 3, LABEL 20001) | DATA PORT 2 | 8 Mb/Sec | EF | 3 | 3 |
| CIRCUIT FILTER-3 (OPTICAL INTERFACE 1, LABEL 300) | DATA PORT 10 | 10 Gb/Sec | AF-3 | 3 | 3 |
| CIRCUIT FILTER-4 (SONET VCG 5, LABEL 12000) | DATA PORT 1 | 100 Mb/Sec | AF-1 | 1 | 1 |
| CIRCUIT FILTER-5 (SONET VCG 3, LABEL 3) | DATA PORT 2 | 1 Gb/Sec | AF-1 | 5 | 5 |

SESSION TABLE ⎯225

| SESSION (CONTROL MESSAGE ID) | OUTGOING DATA TUNNEL | ENCAPSULATION LABEL | CIR | CLASS |
|---|---|---|---|---|
| SESSION 1 (TCP SRC PORT 1345) | SONET VCG NUMBER 3 | MPLS LABEL 3 | 1 Mb/Sec | EF |
| SESSION 2 (TCP SRC PORT 3456) | MPLS LSP 8 | MPLS LABEL 3 | 2 Mb/Sec | EF |
| SESSION 3 (TCP SRC PORT 1998) | OPTICAL INTERFACE 1 | MPLS LABEL 10000 | N/A | EF |

Figure 28

| | | INGRESS RESOURCE TABLE ⌐232 | | | |
|---|---|---|---|---|---|
| DATA TUNNEL | PHYSICAL BANDWIDTH | AVAILABLE TOTAL BANDWIDTH | AVAILABLE BANDWIDTH CLASS 1 | AVAILABLE BANDWIDTH CLASS ... | AVAILABLE BANDWIDTH CLASS N |
| MPLS LSP with label 45 | 80 Mb/Sec | 70 Mb/Sec | 20 Mb/sec | ... | 30 Mb/sec |
| SONET VCG 4 | 100 Mb/Sec | 50 Mb/Sec | 50 Mb/Sec | ... | 0 |
| DEDICATED POS CONNECTION | 45 Mb/Sec | 12 Mb/Sec | 1.5 Mb/src | ... | 3.0 Mb/src |

Figure 29a

| | | | EGRESS RESOURCE TABLE ⌐ 237 | | |
|---|---|---|---|---|---|
| DATA INTERFACE | PHYSICAL BANDWIDTH | AVAILABLE TOTAL BANDWIDTH | AVAILABLE BANDWIDTH CLASS 1 | AVAILABLE BANDWIDTH CLASS .... | AVAILABLE BANDWIDTH CLASS N |
| ATM Interface | 150 Mb/Sec | 70 Mb/Sec | 20 Mb/sec | ... | 30 Mb/sec |
| Ethernet Interface | 100 Mb/Sec | 50 Mb/Sec | 50 Mb/Sec | ... | 0 |
| DS3 Interface | 45 Mb/Sec | 12 Mb/Sec | 1.5 Mb/src | ... | 3.0 Mb/src |

Figure 29b

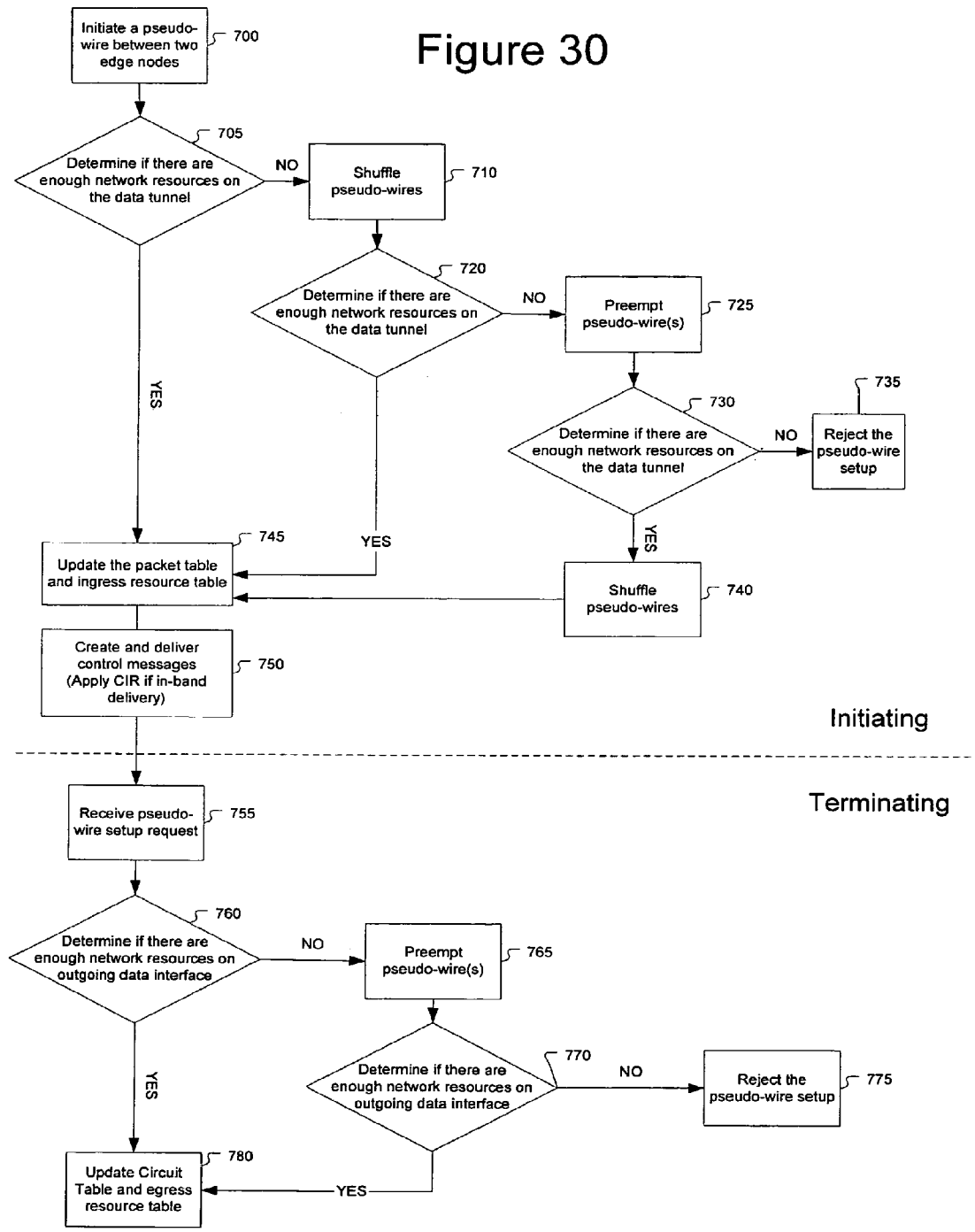

METHOD AND APPARATUS FOR PERFORMING DATA FLOW INGRESS/EGRESS ADMISSION CONTROL IN A PROVIDER NETWORK

CROSS-REFERENCE TO RELATED APPLICATION

This application claims priority to U.S. patent application Ser. No. 10/757,528, filed Jan. 15, 2004 (which is a provisional conversion of and claims priority to Provisional Application No. 60/440,313, filed Jan. 15, 2003); U.S. Provisional Patent Application 60/444,456, filed Feb. 3, 2003, and U.S. Provisional Patent Application 60/444,440, filed Feb. 3, 2003, all of which are by common inventors, Ping Pan and Ralph Theodore Hofmeister, all of which are hereby fully incorporated herein by reference.

BACKGROUND OF THE INVENTION

1. Field of Invention

The invention generally relates to methods and apparatuses for transporting diverse traffic types such as different types of layer-2 traffic over an optical transport network such as a SONET/SDH network. The invention more particularly relates to utilizing pseudo-wires carried directly on top of the SONET, SDH, or OTN layer to transport diverse data packet traffic types such as various types of layer-2 traffic. The second embodiment of the invention expands the field of invention to also cover electrical transport networks and expands the functionality to include admission control at the ingress and egress points of a provider network.

2. Description of Related Art

Service provider communication networks today consist of multiple types of equipment designed to transmit and route many kinds of traffic. Traditionally, these networks evolved from voice/telephone service so they were designed to carry fixed-sized circuit connections between end users. As data applications have evolved and capacity requirements have grown, several generations of packet switched networking equipment was installed into networks to route the packet data. Examples include ATM, Gigabit Ethernet, and MPLS, as shown in FIG. 21.

While new packet switching technologies continue to emerge, service providers must continue to service older technologies as it takes many years for end users to phase out a particular technology. This has led to the service providers maintaining several independent packet switched networks to carry the different types of service. Provisioning and maintaining these multiple networks is costly it would be advantageous to converge these packet switched networks onto a common network. As shown in FIG. 21, Layer-2 and MPLS switches are deployed to aggregate data flows into SONET backbone.

Conventionally circuit switched connections are used to provide transport functions between the various packet switching network equipment. But these circuit switched connections are limited in flexibility: they are available in limited bandwidth sizes: 10 Gbps, 2.5 Gbps, 622 Mbps, 155 Mbps, 53 Mbps, 1.5 Mbps, 64 Kbps, and are provisioned and maintained independently of the packet switched traffic. The static nature of these circuit connections imposes inefficiency in utilization of the capacity of the circuit switched network when carrying packet data traffic.

As a result, the interface between the packet data layer (layer 2) of the carrier network and the circuit switch layer (layer 1) leads to network utilization inefficiencies and difficult and expensive provisioning and maintenance tasks for the service providers.

The invention described herein presents a method to couple the Layer-2/MPLS packet data convergence function directly onto circuit switch equipment and integrate the control and management of connections in layer 1 and 2. Integration of these functions will greatly reduce provisioning and maintenance expenses of carrier networks and improve the utilization of the network capacity. The benefit of the invention is evident in FIG. 22.

Luca Martini and others have introduced the concept of pseudo-wires in a number of Internet Engineering Task Force (IETF) drafts, which has been widely referred to as "draft-martini". In Martini's design, some pseudo-wires can be initiated from the edge of multi-protocol label switching (MPLS) and/or IP backbone networks. Once established, a customer's layer-2 traffic can be aggregated into the pseudo-wires. To control the pseudo-wires, LDP (label distribution protocol) messages are routed through the backbone network to communicate between network edges. A serious drawback with the draft-martini design is that communication carriers must rely on MPLS/IP backbones with expensive high-performance routers to support the control messaging and label distribution protocol thereby greatly increasing the cost of transporting Layer-2 traffic which is otherwise inexpensive and relatively simple. In reality, these routers are essentially used to perform relatively trivial switching functionality.

In a parallel development, the Optical Internetworking Forum (OIF) has defined a user-network interface (UNI) specification that allows users to request the creation of Synchronous Optical Network (SONET) connections for data traffic. However, there are a number of issues in the UNI approach:

Both user and network elements must implement the UNI specification thereby dramatically increasing the cost of implementation and creating compatibility problems with non-UNI networks that interface with the UNI-enabled network.

The existing OIF UNI is only designed to interface user and network elements over optical interfaces.

George Swallow and others have proposed an overlay model where MPLS routers can use an RSVP (resource reservation protocol extension for traffic engineering) protocol to communicate with a GMPLS-enabled (generalized multi-protocol label switching-enabled) optical backbone. This approach can potentially introduce user traffic aggregation from optical network edges. However, this model requires MPLS and IP to be used across the transport networks. Also, this approach may require the carriers to reveal internal routing and resource information to the external customers, which is not practical in most of the operational networks today.

There have been a number of advancements of SONET/SDH technology in recent years. For example, Virtual Concatenation provides the flexibility that allows edge switches to create SONET/SDH connections with finer granularity bandwidth. Link Capacity Adjustment Scheme (LCAS) uses several control bits in the SONET/SDH frame to increase or decrease a connection's bandwidth. Finally, Generic Framing Procedure (GFP) specifies the framing format for a number of link protocols, such as Ethernet and PPP.

It is admitted that MPLS, LDP, draft-martini, and OIF UNI, Virtual Concatenation, LCAS and GFP are conventional elements with respect to the invention. Although the invention utilizes some of these conventional elements, details of which may be found in available literature, the methods and apparatuses disclosed and claimed herein differ substantially therefrom. In other words, the invention leverages such conventional technologies in unique ways to achieve a method and apparatus for transporting packet data from customer data nodes over an optical network.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 5 is a functional block diagram illustrating operational details of the inventive packet-data-enabled optical connection switch according to the invention and further illustrating the processing of the data packets on the ingress pathway through the switch;

FIG. 6 is a functional block diagram illustrating operational details of the inventive packet-data-enabled optical connection switch according to the invention and further illustrating the processing of the data packets on the egress pathway through the switch;

FIG. 7b is a diagram of the packet filter table structure according to the invention;

FIG. 7c is a diagram of the circuit filter table structure according to the invention;

FIG. 7d is a diagram of the session table structure according to the invention;

FIG. 21 is a model of a conventional network used by communication providers;

FIG. 26 is a diagram of the packet filter table structure according to a second embodiment of the invention;

FIG. 27 is a diagram of the circuit filter table structure according to a second embodiment of the invention;

FIG. 28 is a diagram of the session filter table structure according to a second embodiment of the invention;

FIG. 29a is a diagram of the ingress resource table structure according to a second embodiment of the invention;

FIG. 29b is a diagram of the egress resource table structure according to a second embodiment of the invention;

FIG. 30 is a high-level flowchart illustrating the processes and methods performed by the invention for pseudo-wire admission control provisioning at both pseudo-wire initiating and terminating points;

DETAILED DESCRIPTION OF INVENTION

Figure 1:
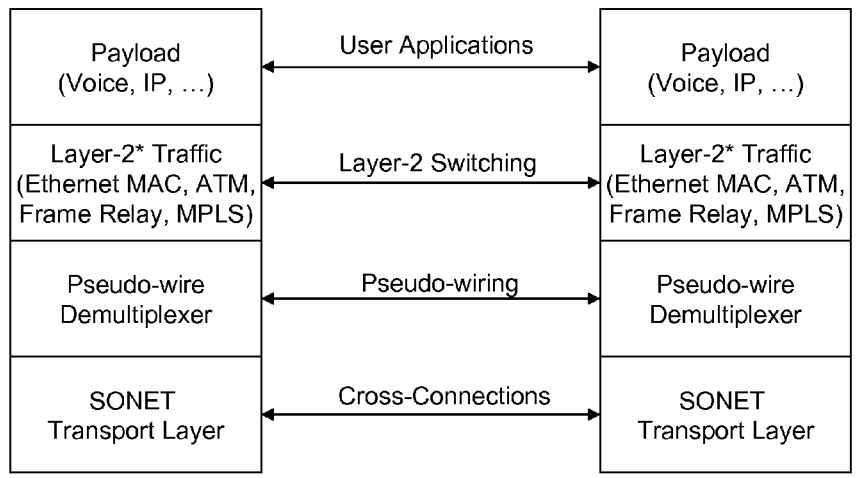
FIG. 1 is a network protocol layer model according to the concepts of the invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Definitions:

The invention described below utilizes various terms that may or may not be fully consistent with the conventional understanding of similar or identical terms. To clarify the meaning of these various terms the following definitions are used by this invention description:

a) MAC: media access control: The interface to the physical media. Assembles and disassembles frames and controls physical interface communications. The physical interface and frame format is L2-specific so that different client interfaces will contain specific MAC devices and/or multi-purpose MAC devices.

b) PALM: Packet Access Line Module. unit that originates and terminates packet data traffic from/to other equipment via physical interfaces. The PALM differs from the TDM (Time Division Multiplexed) Line Module in that it terminates packet data physical interfaces and frames and processes the packet traffic. The PALM described in more detail below generally contains the PPE (packet processing engine) and PPE controller and performs the translation and aggregation of packet data to/from optical connections. The simplified PALM' in the server architecture does not originate/terminate the optical connections. Instead, it translates packet data to/from internal connections between the PALM' and the server cards.

c) PPE: Packet Processing Engine. Performs per-packet forwarding decisions, appends/removes encapsulation labels, processes and delivers control messages, collects performance statistics, polices incoming traffic and shapes outgoing traffic.

d) optical circuit switch: A network element that switches and manages optical connections.

e) line module: a field-replaceable unit of the switch that contains the physical ports for traffic termination and origination.

f) data flow: a sequence of data packets that are associated with one another. All packets in a flow originate at the same node and terminate at the same node but not all packets with the same origin and termination are necessarily in the same flow as one another.

i) customer data flow: includes all types of L2 and MPLS packets. Flows from/to the client edge are differentiated by one another by various means, depending on the physical interface and frame format of the data link layer.

ii) provider data flow: also feeds into the line modules being used as well as the various node definitions below. The invention does not depend on the topology or protection scheme of the optical network. The invention simply requires a point-to-point connection between two provider edge nodes.

g) provider edge node: the nodes at which client data packets from a flow are translated from/to an optical connection. Packets in a flow will traverse two and only two provider edge nodes: the ingress and the egress.

h) customer edge node: the node originating (terminating) the data link layer session terminating (originating) on the provider edge node client port.

i) intermediate provider nodes: nodes that the optical connection traffic passes through between the ingress and egress provider edge nodes. The intermediate nodes do not have to be aware of the data flows contained within the optical connections. Their primary function is to switch/manage the optical connection as they would a traditional or non-data flow optical connection.

j) encapsulation label: A unique identifier contained in every data packet traversing the optical connection, used to differentiate pseudo-wires. The encapsulation label is normally appended by the ingress provider edge node and removed by the egress provider edge node. However, it is possible and may be desirable in some cases for the encapsulation label to be appended and/or removed by a customer node, or over-written by an intermediate provider node.

k) pseudo-wire: a logical point-to-point connection between two provider edge nodes that is used to forward data packets from one and only one flow. One or more pseudo wires may be contained in an optical connection. A pseudo wire differs from a flow in that: 1) it originates and terminates on provider edge nodes while a flow does so on customer nodes; 2) the arrival sequence of packets will be maintained over the pseudo wire while a flow may not guarantee the sequence of packets.

l) control message label: a unique label such as the IP4 Explicit NULL Label that distinguishes control messages from data packets. In general, a unique encapsulation label to differentiate packets in an optical connection that are used by the provider nodes to pass management and control information between themselves.

m) control message: a message or signal that is used to control the provider network, customer edge nodes, components thereof, or the data being transported across the provider network or to the customer edge nodes. The invention does not generate the control messages or effect control based on them. Instead, the invention is concerned with transporting such conventional control messages. In general, the invention can practically tunnel any appropriate control message. Some illustrative but non-limiting examples are as follows:

1. control messages relating to MPLS/IP control protocols: such control messages are used to discover and establish pseudo-wires as well as MPLS labeled-switch-path. All of these MPLS/IP control messages may be aggregated into an optical connection with label Explicit-Null or other control message encapsulation label according to the invention as discussed in detail below. Some of the more important categories of control messages may be taken from the following protocols: LDP (label distribution protocol), RSVP (resource reservation protocol), and OSPF (open shortest path first).

2. IP Data control messages: To ensure the connectivity between two edge nodes, the user can aggregate probing packets from an edge node, and check if they can be received at the other edge node. Such probing packets are defined in ICMP (internet control message protocol) and LSP-ping (a special sequence of packets designed to detect the connectivity of MPLS LSPs as known in the art.

3. Layer-2 messages: To interconnect two layer-2 data interfaces through an optical connection, it is possible to tunnel conventional Layer-2 control messages such as ARP (address resolution protocol) PAUSE (a signaling protocol in Ethernet for flow control), heartbeat messages between two nodes through an identifiable control message encapsulation label according to the teachings of the invention.

4. Control messages relating to upper application data: when supporting IP encapsulated packets, such as real-time traffic using RTP (real time protocol) which are used to convert real-time streams into IP packets. The invention can pick out or capture the in-band control packets within RTP packets such as RTCP (Real Time Control Protocol) packets and deliver them to the other edge of the optical connection. This will allow the edge nodes to monitor real-time flows, and enforce associated QoS for the flows.

General Description

In general terms, the invention initiates and maintains pseudo-wires directly over existing SONET networks using the already-deployed SONET switching gear. In the invention, unlike a UNI-based network, the switching intelligence only needs to be implemented in the SONET switches (network elements) and the users are not required to implement additional functionality. Furthermore, the invention works over a wide variety of customer interfaces including Ethernet, ATM, and Frame Relay optical and/or copper interfaces.

By examining some of the existing communication backbone topologies and traffic patterns, the inventors noticed that much of the data traffic comes from traditional switching networks: Ethernet, Frame Relay and ATM. Typically, voice traffic can be transported via Frame Relay circuits, and ADSL is based on ATM. With the recent rapid advancement in Gigabit Ethernet technology, Ethernet interfaces have been gradually deployed at places where both IP and non-IP traffic aggregation takes place.

Hence, the invention represents a very practical application that enables carriers to "tunnel" user traffic through well-provisioned SONET transport backbones from the edge of their networks. Further, the idea of developing yet another layer of tunnels on top of SONET cross-connections, such as building MPLS LSPs (label switched paths) as is being proposed by router vendors, is not economically practical or technically beneficial.

The invention creates "pseudo-wires" over, for example, SONET cross-connections directly, and switches layer-2 MAC frames from network edges, reducing cost and complexity of the network switching elements. The invention may utilize many of the conventional mechanisms for setting up pseudo-wires but in unique ways as explained herein. Details of the conventional pseudo-wire mechanisms are well known and need not be discussed here in detail. Instead, this disclosure focuses on the adaptation of pseudo-wire techniques such that a pseudo wire may be carried directly over a provisioned SONET network. Alternatively, the pseudo wire may be carried directly over a provisioned Synchronous Digital Heirarchy (SDH) or Optical Transport Network (OTN) network.

The inventive protocol-layering model is shown in FIG. 1. It is important to realize that this protocol-layering model is different from the current framework, where pseudo-wires are created on top of either MPLS or IP GRE (generic routing encapsulation) tunnels which are, in turn, carried on top of the SONET transport layer.

One constraint in the conventional framework is that to create and manage MPLS or GRE tunnels (generic routing encapsulation), IP routing, IGP (interior gateway protocols) and BGP (border gateway protocol) and signaling RSVP-TE (resource reservation protocol extension for traffic engineering) and LDP (label distribution protocol) have to be used throughout the network. Therefore, to transfer layer-2 traffic according to conventional schemes such as those proposed by Luca Martini, the carriers have to rely on an IP overlay network between the layer-2 switching networks and the transport networks. Due to backbone traffic volume, high-end expensive backbone routers are required to construct such overlay networks. This design could result in adding tremendous cost to carriers, while their existing SONET transport links and equipment may be under-utilized. Also, maintaining an additional overlay IP network increases the network management and operation cost to the carriers.

Thus, to achieve the objectives of transporting layer-2 traffic, the inventors create pseudo-wires over, for example, SONET cross-connections directly, and support draft-martini (or equivalent) on SONET switches at network edges to setup and manage pseudo-wires. No router over-lay network is required in the inventive design.

Returning to FIG. 1, the protocol-layering model includes the conventional SONET transport layer that creates and maintains SONET cross connections in the conventional fashion. The pseudo-wiring is carried directly on top of the SONET transport layer according to the inventive protocol-layering model. Such pseudo-wires may be used to carry Layer-2 traffic such as Ethernet MAC, ATM, Frame Relay, etc. as well as MPLS data packets. In general, any packetized traffic may be carried by the pseudo-wires. The next layer is the actual payload which may be any data including voice, data packets, etc as is well known in the art.

It is important to realize here that, in the conventional model proposed in IETF and Luca Martini, the pseudo-wiring layer situates above IP layer. Below the IP layer is MPLS, Layer-2 and transport layers, respectively. One of the main reasons for such a model is to use IP layer for control message delivery. Since only routers have the ability to deliver control messages through the Internet backbone, pseudo-wiring therefore becomes a router-only application. In contrast, the invention utilizes the conventional SONET transport layer to deliver control messages between edge nodes. As a result, pseudo-wiring can be accomplished on devices other than routers at a much cheaper cost.

Overview Of Operation

Before proceeding to the apparatus details, a general overview of the inventive operation is provided. Setting up pseudo wires (PW) may follow a procedure as defined in [PWE3-CTRL (L. Martini, et al, "Transport of Layer 2 Frame Over MPLS", draft-ietf-pwe3-control-protocol-05.txt)], but this procedure is modified by the invention to operate in the context of PW directly on top of the SONET, SDH, OTN or equivalent layer. The operation reference model for a SONET system is shown in FIG. 2 but it is to be understood that substantially the same reference model applies for SDH and OTN.

Figure 2:
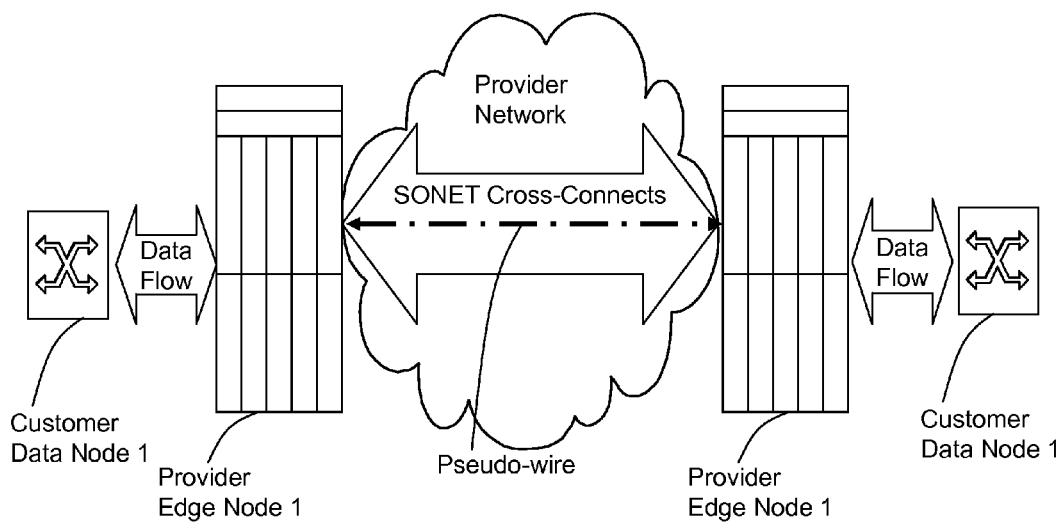
FIG. 2 is a simplified network diagram showing a very high level view of the inventive pseudo-wire directly over optical transport network connection techniques according to the invention.

As shown in FIG. 2, the inventive network includes customer data nodes such as customer data nodes 1 and 2. A customer data node may be a conventional switch or router. The provider edge node generally includes conventional SONET cross-connect functionality but implemented by a data-enabled SONET switch according to the invention such as the one illustrated in FIG. 4 and further explained below.

From the customer network edge (customer data nodes as illustrated in FIG. 2 represent the customer network edge), data flow such as layer-2 frames enter the provider's backbone. More specifically, a data packet such as a layer-2 frame may be sent from customer data node 1 to provider edge node 1. The provider edge nodes 1, 2 set up a SONET cross-connection in the usual and conventional fashion across the provider network.

The invention then sets up a pseudo wire directly within the SONET cross-connect as further illustrated in FIG. 2. The pseudo-wire and SONET cross-connect are terminated at the other end of the provider network, in this case at provider edge node 2. The provider edge node 2 then transmits the data flow (e.g. layer-2 frames) to the customer data node 2.

It is to be understood that the provider network typically includes far more than 2 edge nodes and that intermediate nodes are also typically included but for ease of illustration such additional nodes are omitted from FIG. 2.

Each of the layer-2 frames within the layer 2 flow has a "flow-id" in their header. The flow-id may be implemented with conventional VLAN-ID's for Ethernet MAC frames, DLCI for Frame Relay frames, and VPI/VCI for ATM cells. It is also a possibility that the customer edge equipment may inject MPLS frames into the backbone. The use of this flow-id for the setting up and maintenance of pseudo wires according to the invention is further explained below.

Figure 3:
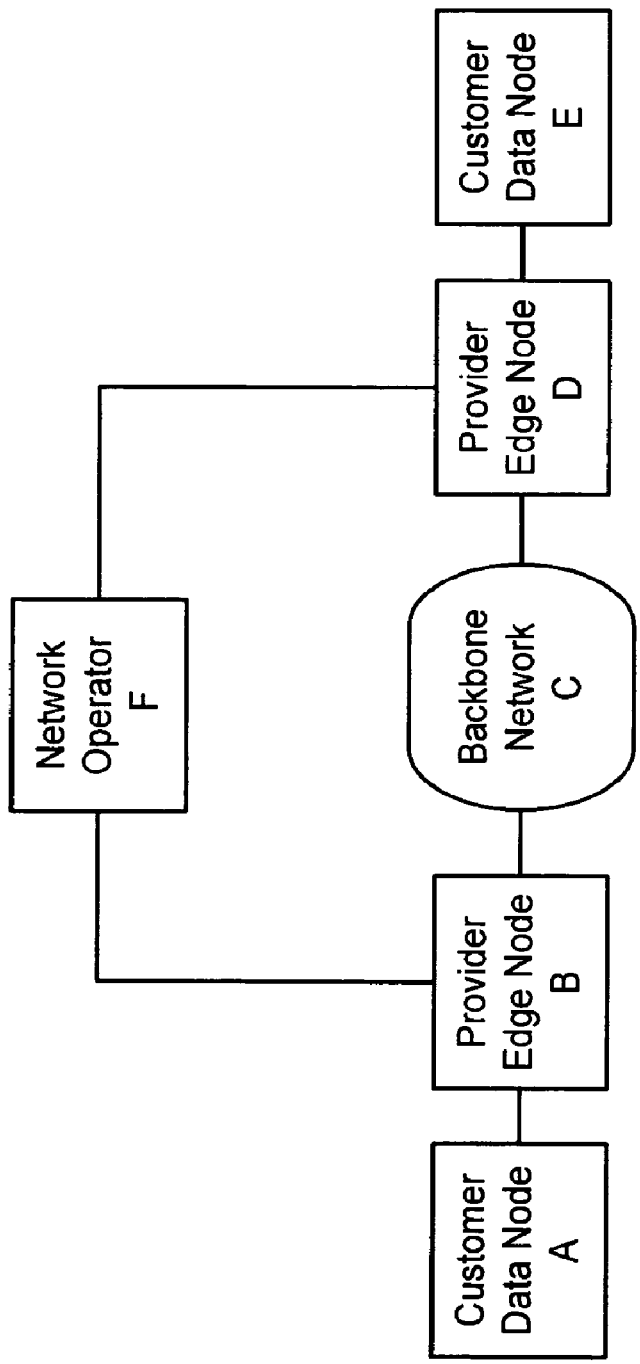
FIG. 3 is a network operation model in a high-level block diagram format for explaining network operation according to the invention.

FIG. 3 is a network operation model according to the invention and is useful for illustrating the general concepts of the invention. The customer data nodes (A, E) and provider edge nodes (B, D) may be implemented as discussed above. The backbone network is a conventional optical network such as a SONET, SDH or OTN-based network that is typically part of a provider network.

In reference to FIG. 3, data packets travel from A to E through B, C and D. Each packet is encapsulated with either Layer-2 and/or MPLS label. Each Layer-2 and MPLS label uniquely identifies one data flow between two nodes. In this description, when such a data flow is placed onto the provider network according to the inventive teachings it is referred to as "pseudo-wire". Further, it is assumed that the data flows and pseudo-wires are bidirectional, although the mechanism defined here does not exclude the operation for uni-directional traffic. It is further assumed that the backbone network, C, is a conventional carrier's transport network utilizing conventional mechanisms such as SONET-switching to deliver data. In other words, no modifications are necessary for the backbone network C elements to carry the inventive pseudo-wires.

Provider edge nodes B and D are the devices to which this invention will apply and represent the network elements that would be modified (or replaced) according to the invention. Provider edge nodes B and D are capable of performing both data switching and circuit switching. "Data switching" means that the packets are forwarded based on Layer-2 and MPLS headers. "Circuit switching" means all data sent to the circuit will be routed through the network along the same path from the time the circuit is established until it is terminated.

Upon the completion of inspecting an incoming data packet, provider edge nodes B and D will encapsulate the data packet with a label that can uniquely identify the user flow to which the packet belongs, and send the packet to a pre-established circuit over backbone network C. At egress, provider edge nodes B and D will recover the packet from the circuit, remove the label and transmit the packet out to the proper destination. There exist one or multiple circuits between provider edge nodes B and D. Each circuit can aggregate one or multiple pseudo-wires.

From the control plane perspective, it takes two steps to initiate a pseudo-wire over a circuit between provider edge nodes B and D. The first step requires the network operator, F, to download the mapping between the pseudo-wires and the circuits to the provider edge nodes B and D. The creation of the mappings may be the result of a prior business agreement, or bilateral agreement between carriers, and is beyond the scope of this invention.

Once the mapping information has been received and processed on provider edge nodes B and D, B and D will start to negotiate with each other to agree upon the encapsulation labels that pseudo-wires should use for packet encapsulation. By default, provider edge nodes B and D will allocate two encapsulation labels for each pseudo-wire, one for receiving and another for transmitting. Upon the completion of the label negotiation, provider edge nodes B and D will update the encapsulation label information to the data plane, and thus a pseudo-wire has been created.

At any given time, provider edge nodes B and D may inform operation status to network operator F. Likewise, network operator F may query provider edge nodes B and D for control and accounting information. However, it is beyond the scope of this invention to further specify the relationship between network operator F and customer (client) data nodes, A and E.

The apparatus elements within the provider edge nodes that is responsible for the functionality described above is shown in block diagram form in FIG. 4. As shown therein, the inventive modifications are within an optical circuit switch such as a SONET, SDH or OTN optical circuit switch and transform the conventional optical circuit switch into what is termed herein a "packet-data-enabled optical connection switch" which is represented as element 5 in the drawings.

Figure 4:
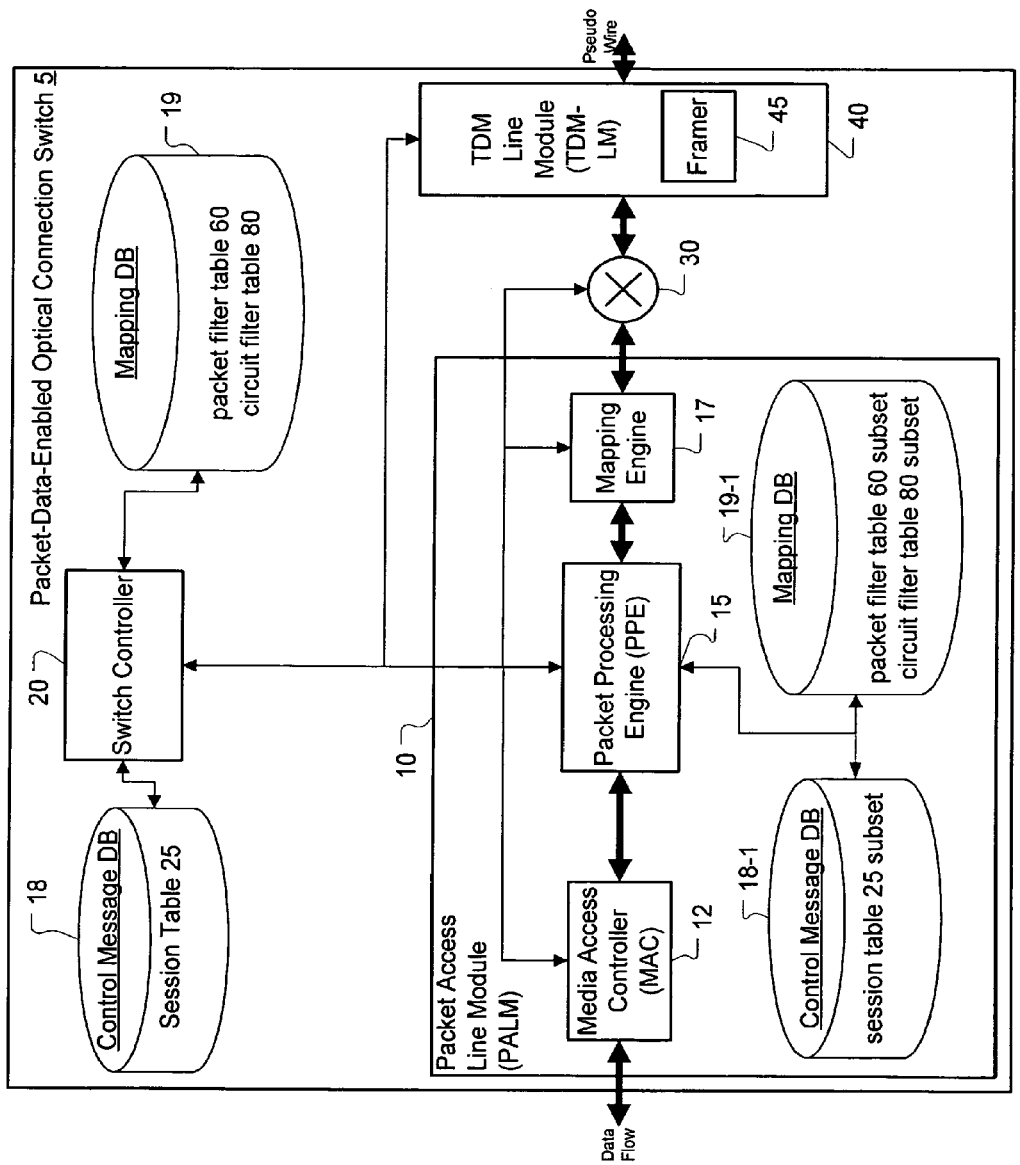
FIG. 4 is a structural block diagram illustrating a packet-data-enabled optical connection switch according to the concepts of the invention.

As shown in FIG. 4, the packet-data-enabled optical connection switch 5 includes a packet access line module (PALM) 10 that receives packet data from a port. This is diagrammatically indicated by a data flow arrow but the physical port will also include an appropriate physical interface (not shown) the conventional construction of which will vary depending upon the type of packet data being received and physical interface (optical, copper, line rate) as is known in the art. The PALM 10 is operatively connected to a TDM switch fabric 30 which may be constructed with a known cross connecting TDM switch fabric such as those used in conventional SONET switches one example of which is used by the CoreDirector® switch made by CIENA Corporation.

FIG. 4 is a simplified drawing for the purposes of explaining the processing of a single data flow and therefore shows only a single PALM 10 having only one port receiving a data flow. Likewise, the simplified drawing of FIG. 4 only shows one output from the TDM switch fabric to a single TDM line module 40. It is to be understood that the actual implementation would have a plurality of ports for the PALM 10. Furthermore, the actual implementation would have a plurality of ports that feed into the TDM switch fabric 30 and that the TDM switch fabric 30 output will feed into a plurality of TDM line modules 40 and output ports. In addition, it is to be understood that the implementation would have a mechanism to aggregate packet data from a plurality of PALMs prior to transmitting into the optical connections. Such a mechanism for aggregating packet data is known in the packet data switch art and could be included in the inventive packet-data-enabled optical connection switch 5, 5'.

In general, the packet fabric 34 provides connectivity between PPEs and the PPEs perform the aggregation. Even without aggregation over multiple PALMs there could still be other types of aggregation performed by the invention because a single PALM 10 may have multiple physical ports and flows from different ports may be mapped to pseudo-wires that reside in a common optical connection.

Examples of a full packet-data enabled optical switch are explained below in reference to FIGS. 8 and 10.

The TDM line module(s) 40 are conventional elements in and of themselves and provide the functions of framing (via conventional framer 45 included therein) and, electrical-to-optical conversion, and optical signal transmitting such that the data may be carried as an optical signal over the provider network. The framer 45 is a very conventional element and may utilize conventional optical transport framing schemes such as SONET, SDH, OTN, or a future developed optical signal transport framing scheme. It is greatly preferred that standardized optical transport framing schemes be used so as to take advantage of and otherwise leverage the existing optical networks utilizing such standardized framing schemes. In the U.S., this would mean SONET while in Europe it would be SDH since those are the respectively prevailing standards at this time.

The PALM 10 includes a media access controller (MAC) 12 which is a conventional element receiving packet data and terminating the customer data flow. The MAC also extracts the packet data such as an L2 packet from the customer data flow. The MAC 12 is connected to a packet processing engine (PPE) 15 that is a unique element constructed according to the principles of the invention as further discussed below in relation to FIGS. 7a-d.

The packet processing engine 15 has access to a mapping database 19-1 that contains mapping tables (packet filter table 60 subset and circuit filter table 80 subset which are explained below in relation to FIGS. 7a-c). The PPE 15 also has access to a control message database 18-1 which includes a session table 25 subset. Generally speaking, the PPE 15 classifies the incoming packet or otherwise determines what type of packet is incoming, polices the data flow, collects performance statistics, appends an appropriate encapsulation label, aggregates traffic and shapes the outgoing traffic for logical circuits. Aggregation of traffic is possible since a single optical connection (e.g. a subnetwork connection which may be at a rate of OC-12, OC-48, etc) may hold more than one pseudo wire containing a packet. Further details of the PPE 15 operation are provided below in relation to FIG. 7a.

The PPE is operatively connected to the mapping engine 17 which is itself a conventional element that encapsulates the packet+label. One example of such encapsulation that may be used by the invention is the conventional GFP (Generic Framing Procedure as defined by ITU-T G.7041/Y.1303). Other examples include LAPS (Link Access Procedure-SDH, ITU standard X.86), PoS (Packet over SONET IETF RFC2615) and other HDLC-framing methods (such as the ones used on Cisco routers).

The mapping engine 17 also originates and terminates optical connections as is known in the art (e.g. optical connections using SONET, SDH or OTN). The mapping engine, in one implementation originates/terminates the optical connection. The TDM fabric 30 and TDM LM/framer 45 allow muxing/demuxing of the optical connection so that it may go out one or more physical ports and share the physical port with other TDM traffic and/or other PW-carrying optical connections. These optical connections output from the mapping engine are then sent to the TDM switch fabric 30 that switches the connections (or circuit elements if virtual concatenation is used). The switch fabric 30 is connected to a TDM line module 40 which includes a framer 45 that implements a conventional SONET, SDH, or OTN optical transport framing and originates/terminates the optical transport signal to/from the provider network.

As mentioned above and as shown in FIG. 4, the main data flow pathway through the packet-data-enabled optical circuit switch 5 is a bidirectional pathway. Although the above description mainly focuses on the left-to-right (ingress) flow taking the customer data flow and processing it to output an optical signal on the provider network, the reverse (egress) flow is also part of the invention. This is further discussed below in relation to, for example, FIGS. 5 (ingress flow) and 6 (egress flow).

As further shown in FIG. 4, a switch controller 20 has control over the MAC 12, PPE 15, mapping engine 17, TDM switch fabric 30 and TDM line module 40. The switch controller 20 may be constructed with, for example, a general-purpose microprocessor and associated memory, ASIC(s), FPGA(s) or other well-known techniques for building such control modules. The control functions performed by the switch controller 20 are programmed into the microprocessor, ASIC, FPGA, etc. Conventional aspects of switch controller 20 functionality such as certain conventional aspects of control over the TDM switch fabric 30, line module 40, MAC 12 and mapping engine 17 are not described in detail herein. As appropriate, this disclosure focuses on the novel aspects of control exercised by the switch controller 20 and are explained in detail below particularly in relation to FIGS. 17-19. Generally speaking, the PW label negotiation is performed by the switch controller 20 as the PPE 15 typically cannot provide system-wide label allocation and network view etc. Once the labels have been negotiated, the switch controller 20 will download the negotiated labels to the PPEs 15 for data switching. The switch controller 20 has access to a control message database (DB) 18 which includes a session table 25. The database 18 holding session table 25 may be stored in a separate memory module as shown in FIG. 4 or it may be stored in a common memory module along with the mapping tables of database 19. More specifically, the switch controller 20 maintains a master copy of all information including a master copy of the control message database 18 storing the session table 25 and a master copy of the mapping database 19 including the packet filter table 60 and circuit filter table 80. The switch controller 20 distributes the information from all of these tables to the PPE 15 on each individual PALM 10.

Figure 8:
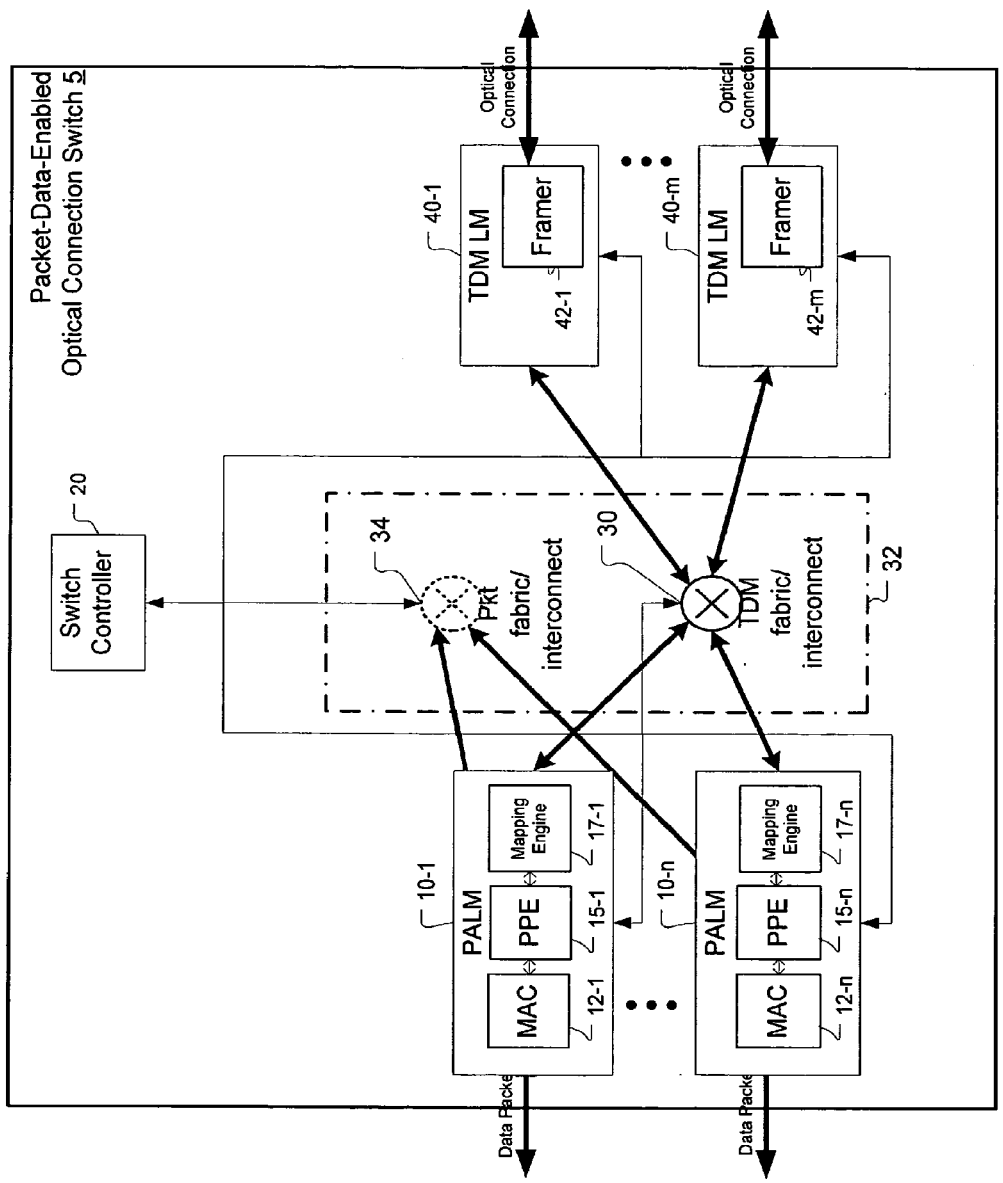
FIG. 8 is a high-level block diagram of a packet-data-enabled optical connection switch according to the invention.

In a full packet-data-enabled optical connection switch 5 such as the one shown in FIG. 8, the switch controller 20 controls a plurality of PALMs 10-1 through 10-n each of which includes a PPE 15. Continuing this notation, the individual PPEs 15-1 through 15-n each have a corresponding subset of the control message database 18 and the mapping database 19. Thus, the individual PPEs 15-n each store a control message DB subset 18-n (storing a session table 25 subset) and a mapping DB subset 19-n (storing a packet filter table 60 subset and a circuit filter table 80 subset).

FIG. 5 further illustrates the inventive ingress processing of packet data arriving as a client signal. In detail, FIG. 5 shows the main elements of the packet-data-enabled optical connection switch 5 including MAC 12, PPE 15, mapping engine 17, TDM switch fabric 30 and framer 45. A customer data flow arriving at the MAC 12 may be in a wide variety of formats including but not limited to GE (gigabit Ethernet), LAPS (link access procedure—SDH), EoS (Ethernet over SONET), ATM (asynchronous transfer mode), FR (frame relay), RPR (Resilient Packet Ring IEEE 802.17), POS (Packet over SONET) or any layer 2 packet with or without an MPLS label.

All of these data types are represented in FIG. 5 as a layer-2 packet (L2 pkt) after the associated transport frame structure has been removed. As shown therein, the MAC 12 extracts the L2 packet. The PPE 15 appends an appropriate encapsulation label (further discussed below) which is shown as "L2 pkt/ Label" in FIG. 5. The mapping engine encapsulates the L2 packet with the encapsulation label in a GFP frame or equivalent and optical connection frame structure. The mapping engine further encapsulates the packet as necessary in a compatible format for the TDM switch fabric 30. The packet traverses the TDM switch fabric in the optical connection to one or more framers 45 where the optical connection may be groomed with other optical connections and prepared for transmission in a conventional optical frame such as a SONET frame, SDH frame or OTN frame.

FIG. 6 further illustrates the reverse or egress path through the packet-data-enabled optical connection switch 5 from the perspective of the data flow through the packet-data-enabled optical connection switch 5. Specifically, data packets transmitted through the optical transport network via pseudowires carried on optical connections are received by the framer 45 where the underlying SONET, SDH, or OTN frame structure is terminated and the payload envelope is converted as necessary into a compatible format for the TDM switch fabric 30. The data packets traverse the TDM switch fabric to the mapping engine 17, which converts as necessary from the TDM switch fabric format, terminates individual optical connections, and extracts packets and removes the GFP or equivalent frame overhead. The underlying packet that still includes the encapsulation label is passed to the PPE 15. The PPE determines the appropriate physical port to send the packet out on and optionally overwrites the L2 label based on the encapsulation label value and the optical connection it was received on. The PPE removes the encapsulation label prior to passing the L2 packet to the MAC. The MAC encapsulates the L2 packet in the appropriate L1 frame/format and sends it to the physical port for transmission to the customer edge node.

Edge-to-Edge Message Tunneling

Figure 7:
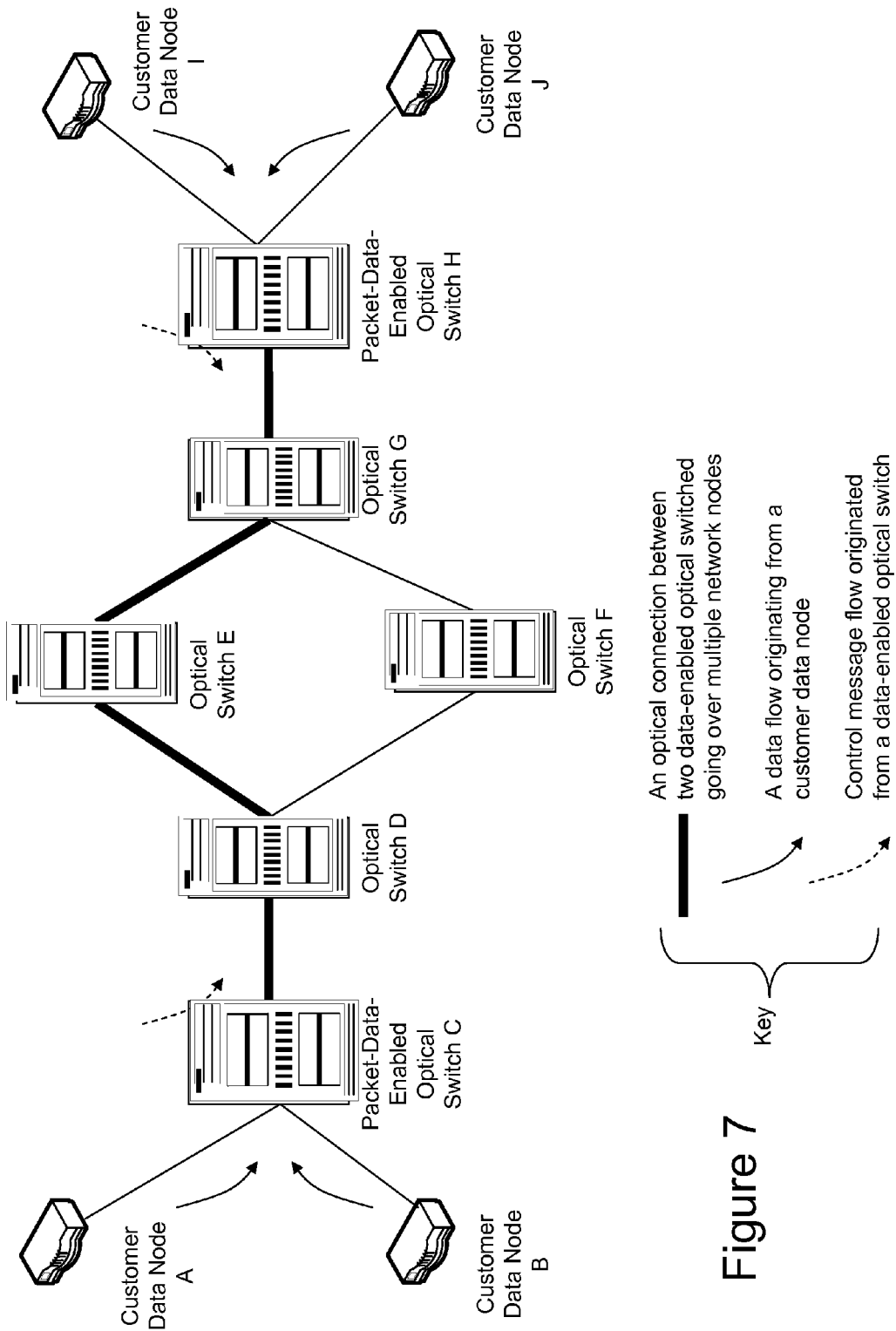
FIG. 7 is a network diagram explaining the operation of control messages according to the concepts of the invention.

FIG. 7 illustrates the structure of a network that can aggregate multiple data flows over a single optical connection. There exists an optical connection between two Packet-Data-Enabled Optical Connection Switches, C and H that are built according to the invention (e.g. the packet-data-enabled optical connection switch 5, 5' as described herein). The remainder of the nodes A, B, D-G, I and J are conventional equipment. The optical connection can be in the form of, for example, a SONET, SDH or OTN transport circuit.

The optical connection can aggregate multiple data flows from Customer Nodes A, B, I, and J. Each flow is associated with a unique encapsulation label at either receive or transmit direction. The packets that belong to a particular flow will be encapsulated with a label at C and H. The value of the label is the result of control-plane negotiation between C and H as further explained below.

One critical issue in this architecture is the delivery of the control messages. Obviously, to support large number of data flows, each Data-Enabled Optical Switch may require processing a large volume of control traffic. There are a number of methods to accomplish this including:

1. Route control messages through the network. This is the method used in the Internet, where each control packet is delivered hop-by-hop until it reaches the final destination. Note: in the similar method of aggregating data flows over MPLS network [draft-martini], the control packets are "routed" through the router network. This approach is not practical in optical networks, since this would require every optical node to establish a special connection to a neighboring optical node for the purpose of delivering control messages only.

2. Send control messages through SONET DCC channel: the DCC channel is a set of control overhead fields in SONET frames. It has been used to exchange control messages between optical nodes within optical networks. DCC channels, however, have very limited bandwidth. The option of inserting data-control messages to DCC channels may cause traffic congestion which would result in optical network internal information loss.

3. Out-of-band signaling: Like SS7 networks operated in PSTN networks, one option is to build an out-of-band control network for control message delivery. However, this can be very costly in terms of network manageability.

After evaluating all the existing options, the inventors created an in-band method for control message delivery. The idea is to treat control messages as regular data packets, and inject them into the optical connection that they are supposed to provision for the data flows. In other words, in the invention, all control packets are to be "tunneled" through SONET (or SDH or OTN) cross-connections as regular payload from the edge. Each data flow is associated with a label, and the invention encapsulates each control message with an identifiable encapsulation label that can be recognized by the edge nodes.

In FIG. 7, there exists an optical connection going through nodes C, D, E, G and H. The provider edge nodes D and H include a data enabled optical switch 5 according to the invention such that C and H will use the connection to exchange control messages. Each control message is encapsulated with a label that both C and H can recognize. Subsequently, C and H will capture and send the control messages to the control plane for processing. One example of an identifiable label is the Explicit NULL label defined in Rosen et. al, "MPLS Label Stack Encoding", RFC3032, Network Working Group, Request for comments 3032 submitted to Internet Society, January 2001 which may be found at http://www.ietf.org/rfc/rfc3032.txt). The identifiable label is also called a control message encapsulation label herein and is not limited to the NULL label mentioned above. Indeed, any label could be used as the control message encapsulation label. For example, the provider edge nodes may negotiate any label to serve as the control message encapsulation label and such a label will thereafter identify the data packet as a control message.

There are a number of advantages in the inventive approach described herein including:

1. Control message processing only involves the edge nodes. Network intermediate nodes are not disturbed, need no modification and merely pass along optical signals in the normal fashion. In FIG. 7, other than the provider edge nodes C and H, the rest of the optical nodes (D, E, F, and G) are not aware of the existence of control messages.

2. Since control messages are encapsulated with labels, this simplifies the processing overhead at the provider edge nodes. The control messages are processed as regular data packets. Instead of sending out to a data interface, they are forwarded to the control module. The detailed mechanism for accomplishing this is elaborated upon below.

3. Since control messages traverse the same optical connections that data flows will traverse, it is easier and faster for the edge nodes to react to network failures. In comparison, in MPLS networks, when there is a failure on the data plane, it will take seconds before the control plane will be aware of the problem—likely to be notified from the routing protocol updates. In the inventive approach, the control-plane and the data-plane share the same fate. As a result, the control-plane can respond to failures faster. This is a huge advantage particularly because protection mechanisms can be triggered much faster thereby preventing data loss. At modern line rates currently approaching 40 gigabits/seconds per wavelength activating protection mechanisms in a shorter time will prevent the loss of tremendous amounts of data.

Generally speaking, the invention operates as follows. When a data flow such as a layer-2 frame is received from a user's network, the PPE 15 encapsulates (or pushes) a pre-negotiated encapsulation label onto the packet. On the other hand, when a control packet (such as LDP Hello message) needs to be delivered through the network, the invention pushes an identifiable label such as the "IP4 Explicit NULL Label" on to the control message. The PPE 15 will direct all frames into the pre-established SONET connections (pseudo-wires). Further detailed operation is provided below in relation to FIGS. 14 and 16.

On the other end of the SONET connection, the PPE 15 will de-encapsulate (or pop) all received frames. For data packets, the PPE 15 forwards them to the user network. If the received label is the identifiable control message label (e.g. "IP4 Explicit NULL Label"), the PPE 15 forwards the message to the switch's central processor 20 for further processing. Further details are provided below in relation to FIGS. 14 and 15b.

Figure 14:
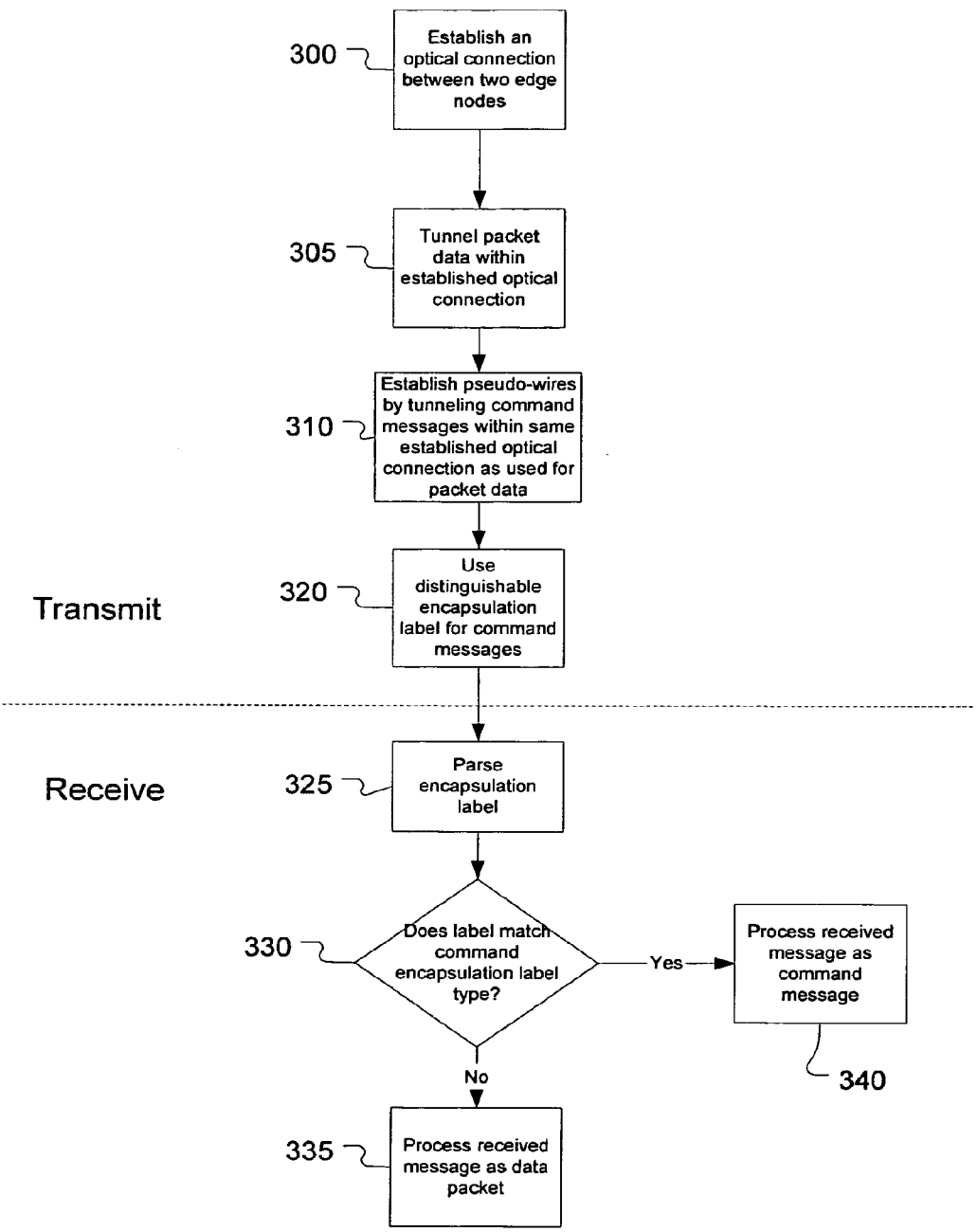
FIG. 14 is a high level flowchart illustrating the general operation of the invention from both the transmit and receive perspectives.

FIG. 14 is a high level flowchart illustrating the general operation of the invention from both the transmit and receive perspectives. All of the operations outlined in FIG. 14 are performed by the PPE 15. As shown therein, the invention first establishes (300) an optical connection between two provider edge nodes which is a conventional process in and of itself that may use conventional SONET, SDH or OTN techniques to do so. The data packets may be aggregated into this optical connection. Next, the PPE 15 tunnels (305) packet data within the established optical connection. Pseudo-wires may then be established (310) by tunneling command messages within the same established optical connection as used for the packet data. Like the data packets, the control messages may also be aggregated within the same optical connection at least to the extent the control messages share the same optical connection pathway through the provider network. When transporting control messages, the PPE utilizes (320) a distinguishable encapsulation label for the command message. Such a distinguishable encapsulation label is also referred to herein as a control message encapsulation message.

On the receive end, as further shown in FIG. 14, the PPE 15 parses the encapsulation label from the received data. The PPE 15 may then decide (330) whether the parsed encapsulation label matches the command encapsulation label type. If yes, then the received message is processed (340) as a command message a process which may includes sending the command message to the switch controller 20. If the parsed label does not match the command message encapsulation label type, then the received message is processed (335) as a data packet a process which may include using the parsed label to lookup the outgoing data interface from the circuit table 80 that applies to the particular data packet just received.

Figure 7A:
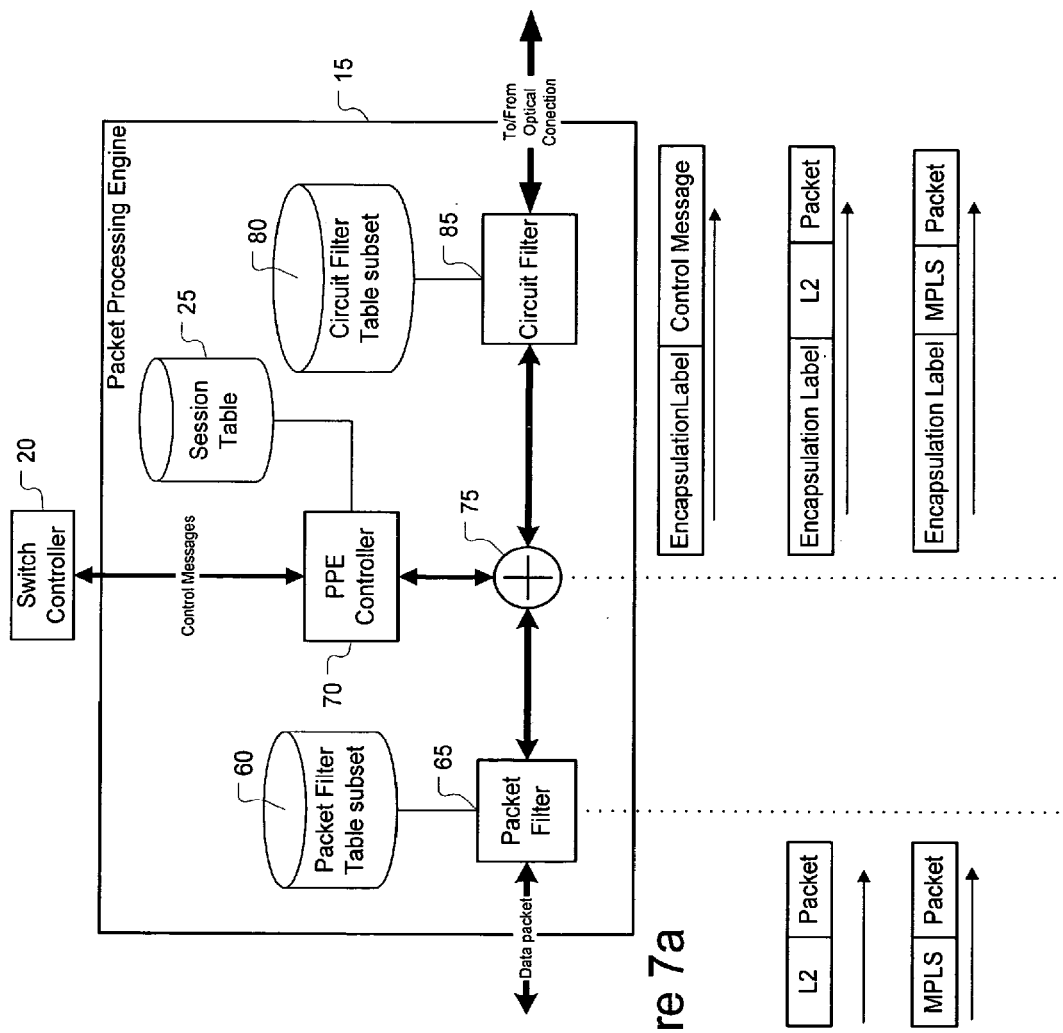
FIG. 7a is a detailed block diagram illustrating the structure and function of the packet processing engine according to the invention.

FIG. 7a is a detailed block diagram of the packet processing engine (PPE) 15 that is a key part of the invention and which may, for example, be part of the packet access line module 10 as shown in FIG. 4.

The packet processing engine 15 is the device responsible for processing incoming data packets, mapping packets into optical connections, processing packets received from optical connections, and injecting control messages into optical connections. Unlike traditional switching devices that perform either packet or circuit switching, in the invention design, each PPE 15 operates for both packet and circuit switching simultaneously.

The processing of data packets includes operations such as packet header lookup, extra header encapsulation, and packet switching into optical connections. The processing of packets from optical connections includes operations such as SONET Path Over Head (POH), packet header manipulation and label switching. One SONET POH handling is the ability to work with Virtual Concatenation and LCAS that are used to group and maintain optical connections.

The PPE 15 includes a packet filter 65 receiving data packets as shown from the MAC 12. The packet filter 65 has an operative connection to packet filter tables 60 (actually a subset of all the packet filter tables as discussed above in relation to FIG. 4).

Packet filter 65 is the engine that processes the packets from data interfaces. The packet filter 65 is associated with and has access to packet filter table 60. For each incoming data packet, the packet filter 65 will extract data interface information and the packet's Layer-2 and/or MPLS headers, and use the packet filter table 60 to determine the encapsulation labels and the corresponding logical connection. The packet filter 65 forwards the packets into the corresponding optical connections so determined.

Packet filter 65 is connected to a packet forwarder 75 which is responsible for adding/stripping the labels, and forward packets to/from data and circuit interfaces.

Elements 65, 75, and 85 may be implemented any number of ways and with any number of physical elements such as logical entities within a software program. For high packet-switching performance, Elements 65, 75 and 85 can be implemented with specialize ASIC, FPGA, or off-the-shelf Network Processors. To satisfy pseudo-wire QoS requirements, further ASIC, FPGA and off-the-shelf Traffic Management chips may be required. Another example is a network processor unit complex which would include a network processing unit (NPU), memory, and optionally a traffic management chip with software coded to implement the invention running on the NPU. Another option would put all of these functions on one or more ASICs.

Packet forwarder 75 is also connected to a circuit filter 85 which has access to circuit filter table 80 (again, a subset of the circuit filter table maintained by the switch controller 20 as discussed above in relation to FIG. 4).

The circuit filter 85 is the engine that processes the packets coming from optical connections. Circuit filter 85 is associated with and has access to the circuit filter table 80. For each packet fetched from the optical connection, circuit filter 85 will extract the encapsulation label that identifies the data flow from the packet, and search the circuit filter table 80 for the outgoing data interface. If the packet is a control message (as determined by the identifiable encapsulation label for control messages), it will be forwarded to the switch controller 20 via the control message pathway as further shown in FIG. 7a. Otherwise, the circuit filter 85 strips off the label, and forwards the recovered packet to the corresponding data interface.

PPE controller 70 has a control connection to packet forwarder 75 and a control message pathway to switch controller 60. In addition, PPE controller 70 has access to session table 25 (again, a subset of the session filter table maintained by the switch controller 20 as discussed above in relation to FIG. 4).

The PPE Controller 70 is the logical entity that communicates with the switch controller 20. PPE controller 70 is associated with and has access to the session table 25, which maintains the mapping of control messages and outgoing optical connections. To inject a control message, PPE controller 70 searches the session table 25 to determine the encapsulating label and optical connection. Once the information is located, PPE controller 70 will encapsulate the control message and send out the control message via the optical connection (by way of the mapping engine 17, TDM switch fabric 30, and TDM line module 40).

The packet filter 65 and circuit filter 85 may be constructed as logical elements within a software program. As such these filters 65, 85 may share processing resources with the PPE controller 70 or may be separately constructed.

In more detail and as shown in FIG. 7b, the packet filter table 60 has the following attributes:

A Searching Key which includes the packet's (incoming) data interface and label information.
  (Incoming) data interface: This is the interface that receives the packet. It can be the identification for either a physical or logical interface. The invention makes no assumption on how such information is actually obtained. However, the interface information is required for each packet being received.
  Label: This can be, for example, a Layer-2 or MPLS header. A Layer-2 header can be an Ethernet MAC and VLAN tag, a Frame Relay DLCI, or an ATM VCI/VPI. It is noteworthy that a received packet may have been encapsulated with a Layer-2 header and a MPLS label. In this case, two matching keys are defined: one with Layer-2 header; the other, MPLS label. In FIG. 7b, Packet-Filter-1 and Packet-Filter-4 can be applied to the same packet.
Outgoing Optical Connection: This is the connection that the packet will be injected into as it enters the provider network.
Encapsulation Label: The label for each data flow. It will be encapsulated with the packet.
Filter Priority: The importance of the filter. As mentioned above, a packet may be encapsulated with both Layer-2 and MPLS. Thus, two matching filters may be found. We use the Filter Priority to decide which filter should be applied to the packet. In FIG. 7b, if a packet received from Port-1 that matches to both Packet-Filter-1 and Packet-Filter-4, Packet-Filter-1 will be chosen since it has a higher priority.
Guaranteed QoS: This is an optional field when QoS (quality of service) is an issue. If so, each data flow should comply within a fixed traffic boundary. Otherwise, traffic congestion may result within an optical connection. This field maintains the guaranteed QoS for the flow. For packets that do not comply, a user-defined traffic conditioning mechanism will be used. The mechanism itself is beyond the scope of this invention.

As shown in FIG. 7b, the packet filter table 60 is populated with data showing the various types of packets that may be processed including Ethernet, ATM, FR and MPLS. Indeed, in this populated packet filter table 60, the PPE 15 is handling 4 different flows each with a unique encapsulation label. The corresponding outgoing optical connection fields are associated with each of these packet types.

As further shown in FIG. 7a, the data packets that arrive at the packet filter may be in the form of a layer 2 data (L2) with an associated packet or frame structure encapsulating the L2 data. Alternatively, an MPLS data with an associated packet or frame structure may also arrive at the packet filter 65. At element 75, the element 75 pushes a pre-negotiated encapsulation label onto the L2 packet or MPLS packet. When a control message is received from switch controller 50 via PPE controller 70, the element 75 also pushes a pre-negotiated encapsulation label onto the control message. With the encapsulation label added, the data flow is next sent to the circuit filter 85 before being output as a logical circuit (SNC or sub-network connection) to the next stage which is the mapping engine 17 as shown in FIG. 4.

Figure 15A:
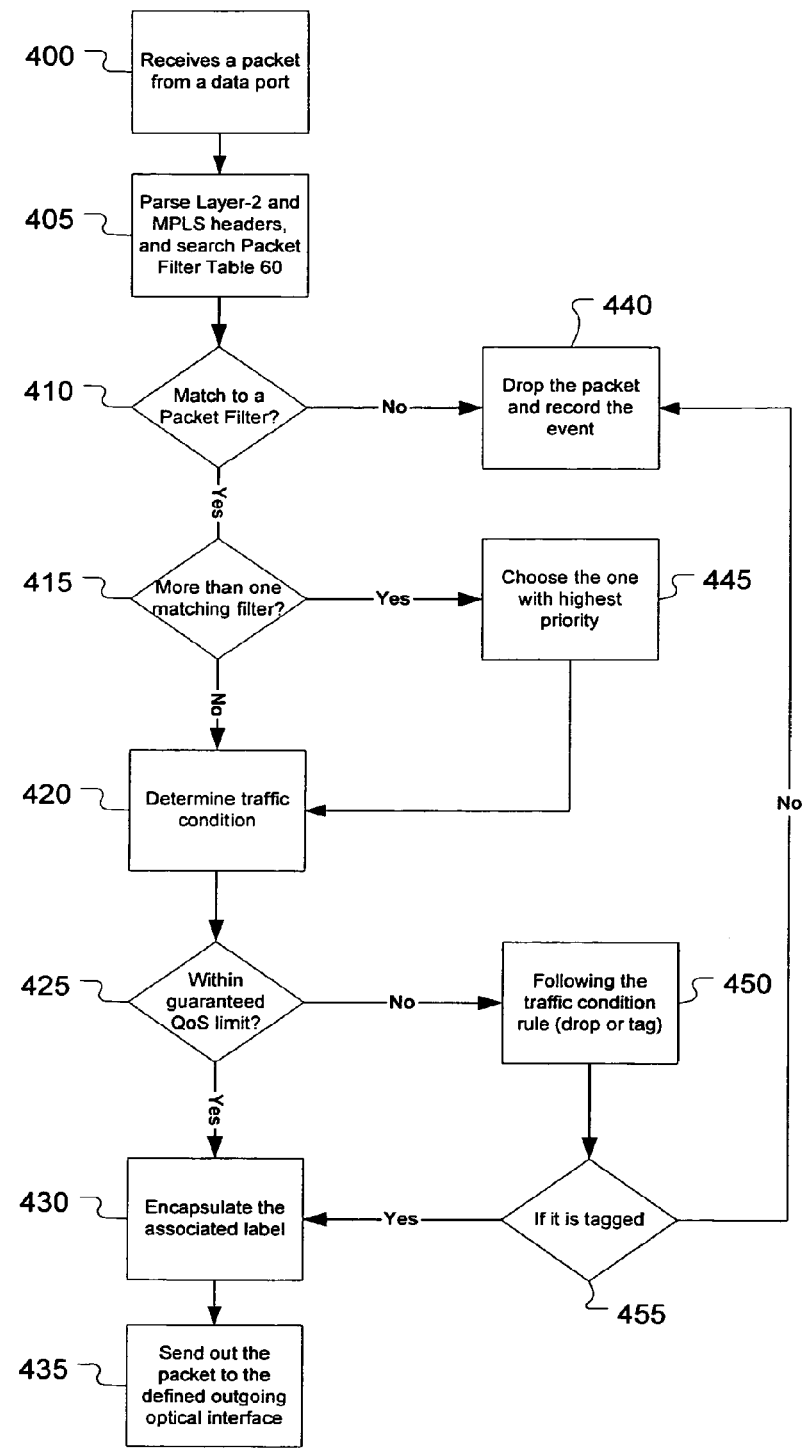
FIG. 15a is a flow chart illustrating the inventive processing of a data packet received from a data port.

FIG. 15a shows in more detail the processing performed by the PPE 15 on a data packet received from a data interface. As shown therein, the PPE 15 receives (400) a packet from a data port and then the packet filter 65 parses (405) the layer-2 (and perhaps the MPLS header if present) and searches the packet filter table 60.

The packet filter 65 then decides (410) whether there is a match with the packet filter table 60. If not, then the packet is dropped (440) thereby ending processing for the received packet.

If there is a match, the flow proceeds and decides (415) if there is more than one matching filter which may be the case if the packet is encapsulated with both Layer-2 and MPLS headers (or other multiple headers as may be the case). More than one header cases the packet filter 65 to choose (445) the header with the highest priority (see filter priority field in Fib. 7b).

The traffic condition may then be determined (420). When a filter is found for a packet, the traffic condition for that flow, such as the bandwidth consumed by the flow, will be known. The packet filter 65 and packet filter table 60 keep track of the QoS information for all flows. If, by receiving this packet, it will cause the flow's QoS parameters (such as bandwidth consumption) to be over its defined limit, the PPE 15 will apply traffic conditioning to the packet, either dropping or tagging the packet. With this information, the packet filter 65 may then determine (425) if the traffic condition is within a QoS limit. The invention does not define the actual mechanism for the packet filter 65 to come to that decision 425; rather, it only operates on the final outcome. If not within the QoS limit, then the traffic condition or rule is followed 450 meaning that the traffic is dropped or tagged. If (455) not tagged, the packet is dropped (440). If it is tagged, the flow proceeds to the encapsulation (430) step. Steps 420, 425, 450, 455 are considered option and implemented only when QoS is a factor.

The encapsulation (430) involves looking up the encapsulation label from the packet filter table 60 and pushing the encapsulation label onto the packet as illustrated in FIG. 7a. Then, the encapsulated packet may be sent (435) out to the outgoing optical connection as defined in the packet filter table 60.

In general, the PPE 15 performs the following processes. Since each SONET cross-connection can carry traffic from multiple L2 users, it is necessary to be able to distinguish individual user's frames at place where de-multiplexing takes place. The PPE takes care of this by pushing an encapsulation label onto every L2 frame that will enter the provider network. The encapsulation label may come from the negotiation between provider edges using LDP.

At exiting edge, the encapsulation label will be popped, and the original frames will be recovered and delivered out to the destination customer. This process is described below in more detail in relation to FIG. 15b and the circuit filter table of FIG. 7c.

FIG. 7c: Circuit Filter Table

The Circuit Filter Table has the following attributes:
- Searching Key: Optical Connection and Label
  - Optical Connection: The connection where a packet is received. It can be a SONET VCG (Virtual Concatenation Group) or an optical interface
  - Label: This is the label that has been inserted at the ingress of the data flow. It is used to identify a specific data flow.
- Outgoing Data Interface: The interface where the packet to be forwarded. As shown in FIG. 7c, all control messages go to "Host Interface", which is the Switch Controller in this case.
- Overwritten Label: It is possible that the customer may want to change a packet's Layer-2 label as it traverses through the optical network. One such instance is that the customers want to change Ethernet VLAN values to satisfy Ethernet bridging protocol requirements. Overwritten Label contains the new label information. PPE is responsible for the label over-writing.
- Guaranteed QoS: Each data flow must comply within a fixed traffic boundary. Otherwise, this may result in traffic congestion at outgoing data port. This field maintains the guaranteed QoS for the flow. For packets that do not comply, a user-defined traffic conditioning mechanism will be used. The mechanism itself is beyond the scope of this invention.

Figure 15B:
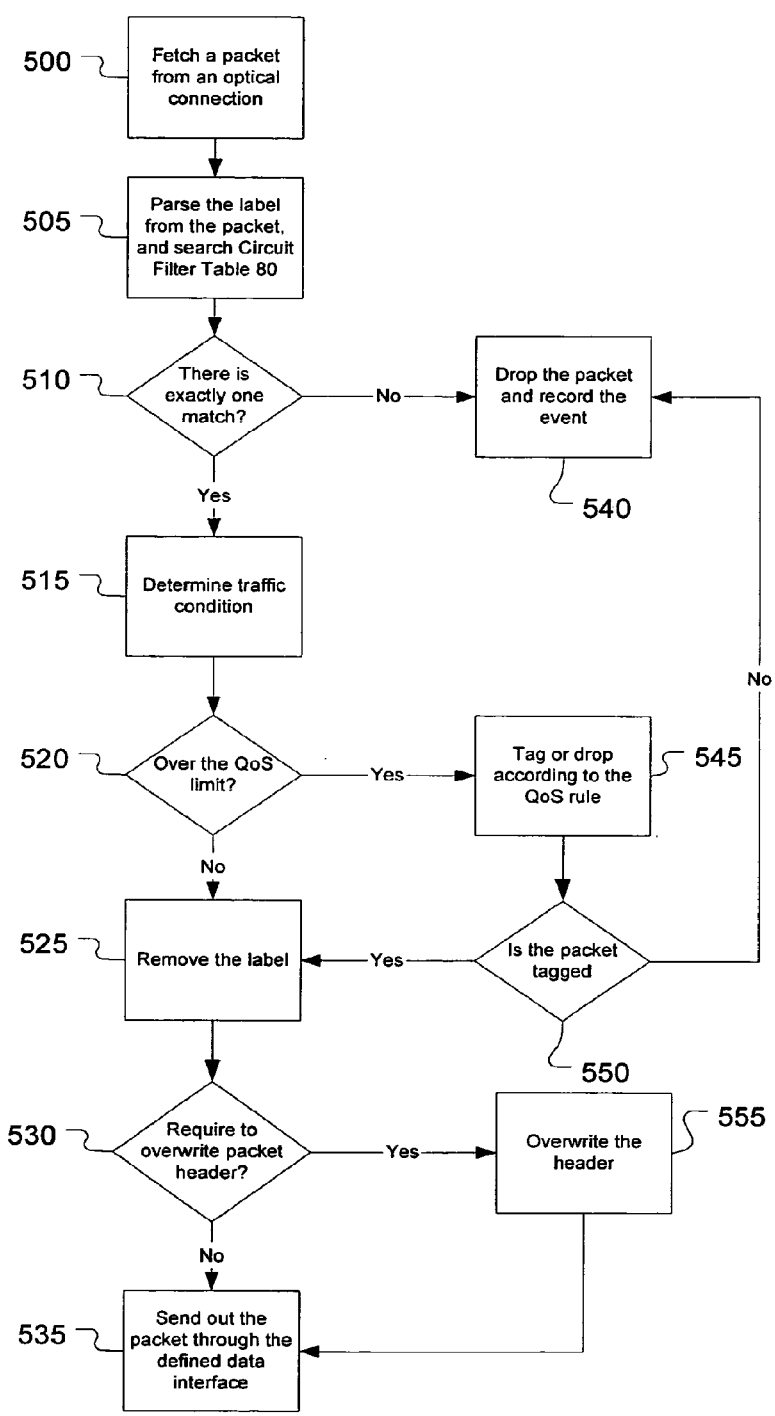
FIG. 15b is a flow chart illustrating the inventive processing of a packet fetched from an optical connection including the processing of both data packets and control messages.

As shown in FIG. 15b, the PPE 15 performs the following processes when receiving a packet from an optical connection. First, the PPE fetches (500) the packet from an optical connection. The circuit filter 85 may then parse (505) the encapsulation label from the packet and use it to search the circuit filter table 80 (see FIG. 7c). The results of the circuit filter table 80 search are used to determine (510) if there is exactly one match. If not, the packet is dropped (540) and this event is recorded.

If there is only one match, then the circuit filter 85 may determine (515) the traffic condition. Once again, the circuit filter is keeping track of the QoS parameters, (bandwidth, delay, and packet dropped etc.) for every flow. If by receiving this packet causes the flow's QoS parameters going over the limit, we will have to either drop or tag the packet.) The results of this determination (515) are used to decide (520) if the traffic condition is over the QoS limit. If yes, then the packet is (tagged or dropped) (545) according to the QoS rule stored in the circuit filter table 80 for that packet. A decision (550) is based on whether the packet is tagged or dropped: if to be dropped the flow proceeds to drop (540) the packet; otherwise, the flow proceeds to remove (525) the encapsulation label. Like the QoS processing described above in relation to FIG. 15a, these steps are option if QoS is not a factor in the system.

After removing (525) the label, the circuit filter 85 decides (530) whether to require overwriting of the packet header. See the description for the parameter above for details. If yes, the circuit filter 85 overwrites the header according to the entry for that circuit contained in the circuit filter table 80. If the entry indicates that the label is not to be overwritten than the PPE 15 sends out the packet through the data interface defined in the circuit filter table 80 for that packet. In this way, the data flow arriving from the provider network may be correctly routed to the correct data interface and, ultimately, to the correct client edge node.

Since the control messages come as labeled packets, the circuit filter table 80 will match them to "host interface". The sending step 535 will send regular packets to data interfaces, and control messages to this "host interface" which is the switch controller 20 itself.

Figure 16:
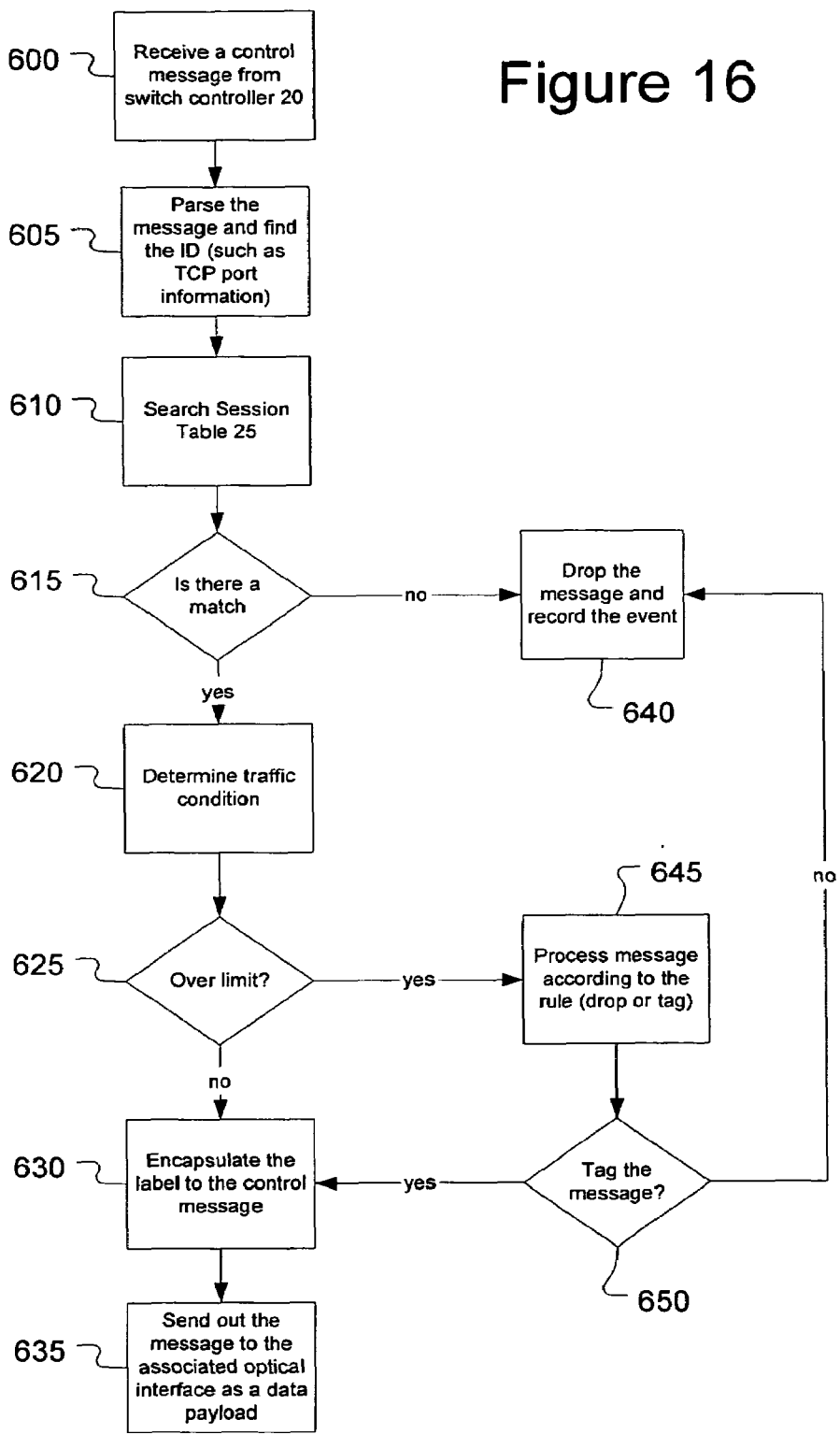
FIG. 16 is a flow chart illustrating the inventive method of injecting a control message into an optical interface.

FIG. 16 and session table 7d further explain the control messaging procedures. PPE controller 70 implements the process of FIG. 16 with access to the session table 25 of FIG. 7d.

FIG. 7d: Session Table

The Session Table 25 has the following attributes:
- Searching Key: Control Message ID
  - Each control message carries a unique ID to identify which "peering session" it belongs to. A peering session is a logical connection between two edge nodes. It is used to exchange control information between two nodes. For example, in pseudo-wire operation, the customer may apply LDP [RFC3036] to negotiate data flows. LDP operates over TCP. Between two edge nodes, all control messages go over a TCP session that can be uniquely identified with TCP Sender Port Number, and IP addresses. In this invention disclosure, we shall not specify the exact message ID format. However, it is reasonable to assume that each control message carries enough information to identify the session to which it belongs.
  - As an example, in FIG. 7d, there are three sessions that are identified with TCP and UDP port numbers.
- Outgoing Optical Connection: This is the connection that the control messages will be injected into.
- Encapsulation Label: The identifiable label for the control message. PPE will insert this label to the control message.
- Guaranteed QoS: All control messages within a session will have a fixed network resource level. This is designed to protect the control messages from potential congestion caused by regular data traffic.

The process begins by the PPE controller 70 receiving (600) a control message from the switch controller 20 which is then parsed (605) to find the ID as explained above.

The PPE controller 70 then searches (610) the session table 25 according to the control message ID parsed (605) from the control message. The results of the search are used to decide (615) if there is a match such that the corresponding entry may be retrieved from the session table 25. If not match, the message is dropped (640) and the event recorded. If there is a match, the PPE controller 70 may perform some QoS processing (steps 620, 625, 645, 650, 640) that are analogous to the QoS processing described above in relation to FIGS. 15a and 15b such that a repetition here is not necessary. Again, this QoS processing is considered an optional but desirable feature.

After QoS processing, the PPE may then send (635) out the control message to the associated optical interface (identified by the entry in the session table 25 for that control message) as a data payload. Specifically, the control message is tunneled as payload within a SONET, SDH or OTN frame payload and thereby shares its fate with the packet data being carried by the provider network.

Provisioning of Pseudo-Wires

The conventional LDP (label distribution protocol, RFC3036) is used by the invention to setup and manage pseudo wires: each pseudo-wire runs over a bi-directional cross-connection such as a SONET, SDH, or OTN cross-connection. Each pseudo-wire includes two unidirectional paths, one in each direction. Each provider edge initiates the setup of the path on behalf of ingress L2 traffic.

Each path may be uniquely identified by the triple <sender, receiver, encapsulation label>. The triple is part of the message sent between nodes during the label negotiation phase shown in FIG. 17. The VCID is an example of an encapsulation label that may be used by the invention. A conventional VCID label is a 32-bit quantity that must be unique in the context of a single LDP session between two provider edges. For a given pseudo-wire, the same encapsulation label (e.g. VCID) must be used when setting up both paths.

As described during our discussion on FIG. 3, to aggregate a data flow and thus establish a pseudo-wire, the network operator first downloads all the mapping information to the provider edge nodes. Through LDP, two provider edge nodes negotiate encapsulation label for a data flow.

To create a pseudo wire between two provider edges, the network operator needs to provide the IP addresses of the provider edges, and assign a, for example, 32-bit VCID to represent this pseudo wire. To support Ethernet VLAN services, the operator needs to feed VLAN-ID's to both provider edges as well.

Through LDP, two provider edge nodes exchange encapsulation label, physical port and VLAN information, and negotiate the encapsulation labels. Specifically, LDP will use Virtual Circuit FEC and Generic Label FEC during label negotiation. Upon completion, the provider edge nodes will program hardware for frame classification and MPLS label encapsulation. The detailed operation of LDP is conventional and beyond the scope of this invention.

Figure 17:
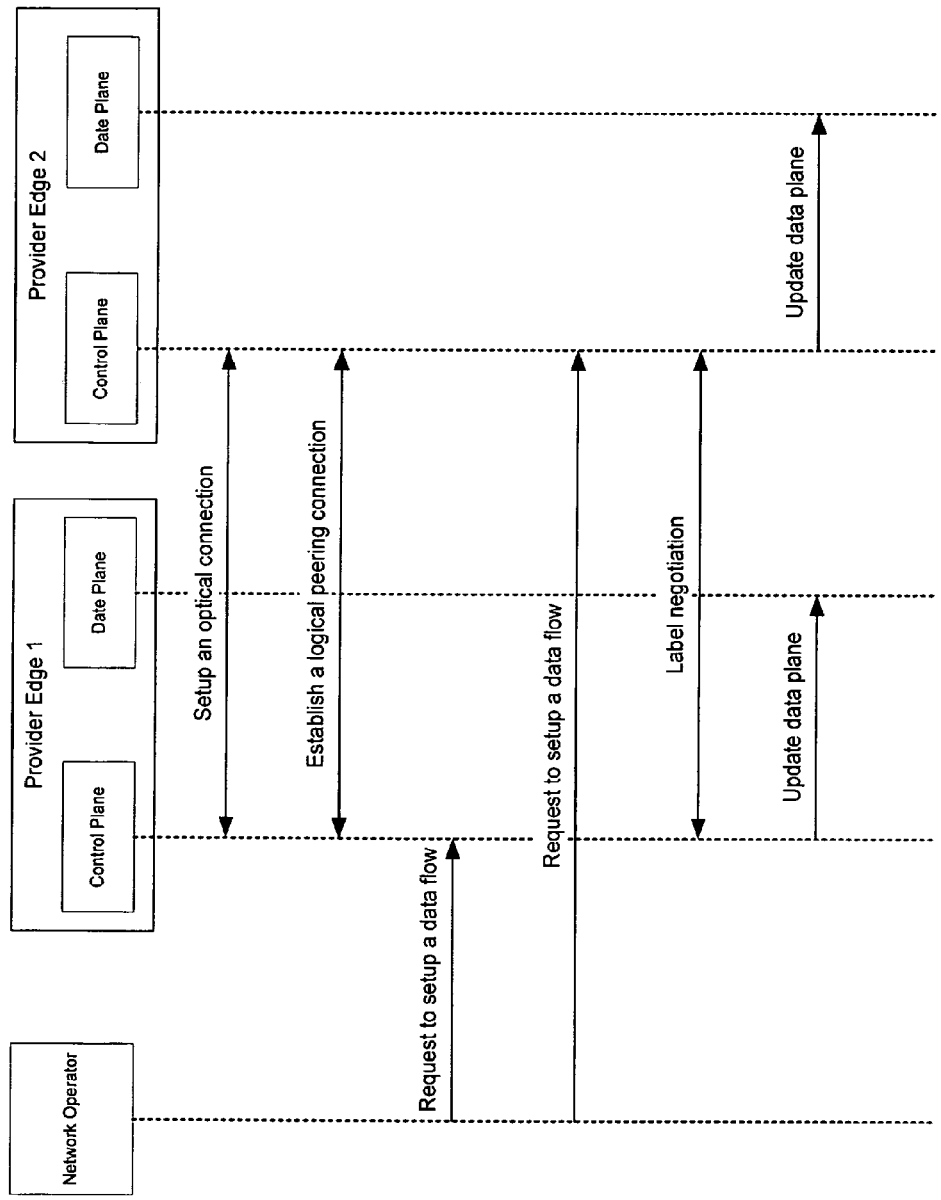
FIG. 17 is a sequence diagram showing the inventive method of setting up data flow over an optical connection.

FIG. 17 further explains the process of setting up a pseudo wire over optical network according to the invention. Essentially, FIG. 17 is a sequence diagram that performs the following processes.

1. Initially, there exists an operational optical connection between provider edge nodes (Node-1 and Node-2 in FIG. 17). Traditionally, in carrier networks, such connections are static in nature—they are not frequently modified once established.
2. Node-1 and Node-2 will establish a peering session over the optical connection. The method for session establishment is to inject control messages into the connection, and each control message is encapsulated with an identifiable label. (See the description for FIGS. 7 and 7d above)
3. Upon the establishment of the peering session, Network Operator will issue data flow setup requests to both Node-1 and Node-2. The request will include the following information:
   a. The data interfaces that packets will traverse.
   b. The optical connection the packets need to aggregate into.
   c. The QoS (bandwidth) requirements for each flow.
   d. Optionally, the packet Layer-2 label to be overwritten (see the description for FIG. 7c)
4. The integrity of the requests is maintained by the network operators, and is beyond the scope of this invention.
5. Node-1 and Node-2 will exchange control messages and negotiate the labels to be used by the data flows. An example of the label negotiation is described in [draft-martini].
6. Upon the completion of the label negotiation, Node-1 and Node-2 will update the data-plane with the label information, that is, to populate the packet filter table 60 and the circuit filter table 80 on the PPE 15.
7. Data flow can now be transmitted over the optical connection.

Figure 18:
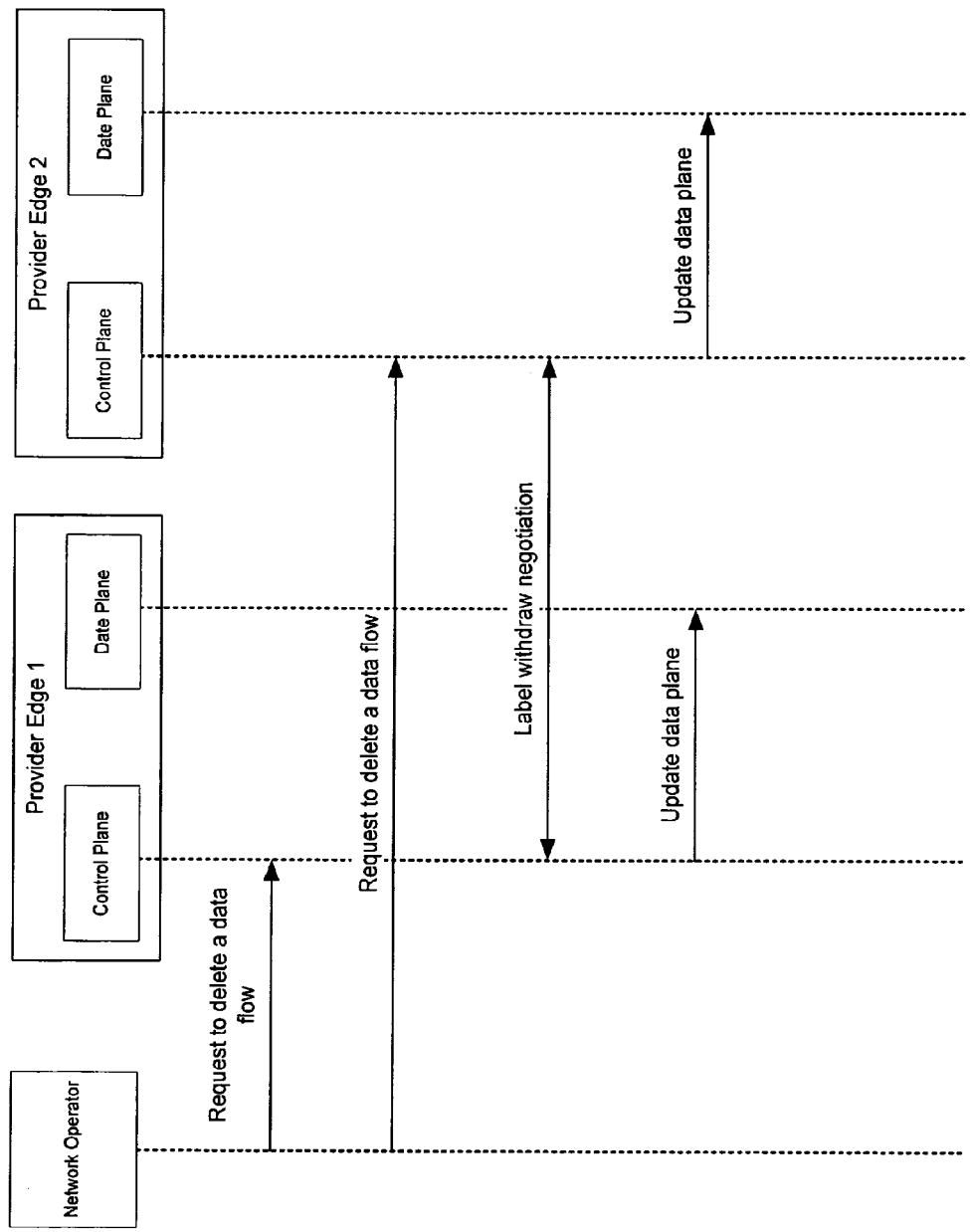
FIG. 18 is a sequence diagram showing the inventive method of removing a data flow over an optical connection.

FIG. 18 further explains the process of tearing down or deleting a pseudo wire according to the invention. Essentially, FIG. 18 is a sequence diagram that performs the following processes.

1. The Network Operator sends the deletion requests to both Node-1 and Node-2.
2. Node-1 and Node-2 will exchange control messages and withdraw the labels that are previously allocated for the data flow. In case of SONET connection failure or operational teardown, LDP is responsible for withdrawing labels at provider edges
3. Upon the completion of the operation, Node-1 and Node-2 will update the data plane by deleting the corresponding entries from the Packet/Circuit Filter Tables.

Figure 19:
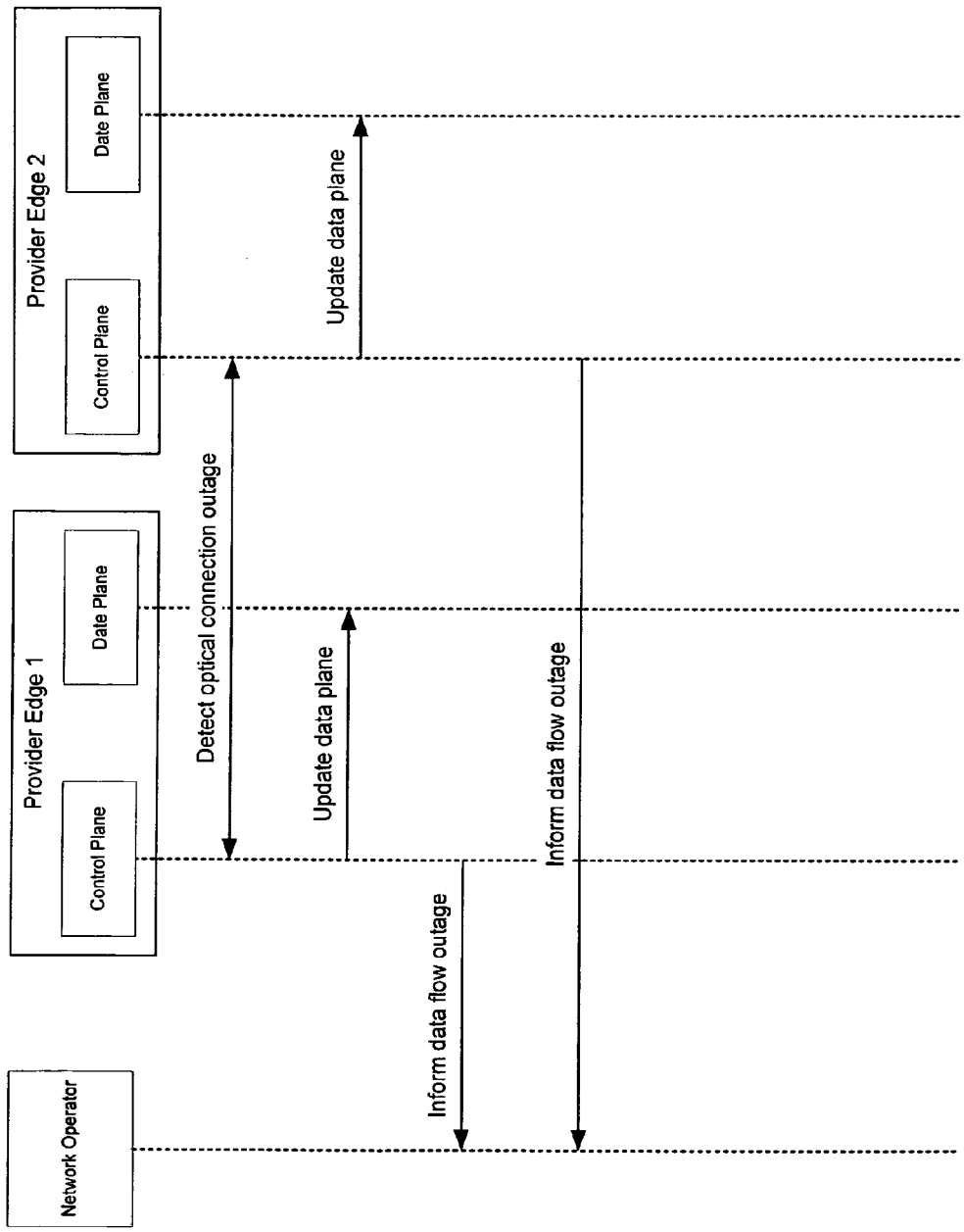
FIG. 19 is a sequence diagram showing the inventive method of handling the situation in which the optical connection has failed or become deactivated.

FIG. 19 further explains the process of handing outages on the optical connections that affect one or more pseudo wires according to the invention. Essentially, FIG. 19 is a sequence diagram that performs the following processes.

1. The optical connection between Node-1 and Node-2 is no longer working. This could be the result of a planned outage by the carriers, or a link failure in the network. The outage may be detected in any number of conventional fashions and such detection is outside the scope of this invention.
2. Node-1 and Node-2 will update the data-plane immediately. One action is to suspend all the relevant Packet/Circuit Filters on PPE. Another option is to reroute the traffic to another optical connection. The mechanism of rerouting at pseudo-wire level is beyond the scope of this invention.
3. Node-1 and Node-2 will notify the condition to Network Operator.

Alternative Architectures Benefiting from Invention

The switch fabric 32 is a generalized interconnect between line modules. The interconnects are for optical connections and may also include an additional packet flow interconnect to exchange packet data between modules prior to the mapping engine function. The implementation of the fabric interconnects is outside the scope the invention and does not impact the invention functions. Conceptually, it is convenient to consider two independent switch fabrics as shown in FIGS. 8 through 13b; the TDM switch fabric 30 for optical connections and the packet fabric 34 for packet data that has not been mapped to an optical connection. However, in practice the interconnect function may be implemented in any fashion and with any number of technologies. Examples of other fabric implementations include a single TDM switch fabric, a single packet switch fabric, and technologies may include any pure electrical, or a hybrid optical/electrical switch fabric.

Some higher-level architectural details and alternatives will be explored in this section. All of these architectures clearly benefit by utilizing the inventive concepts as further explained below.

The invention described herein may be implemented on any form of optical connection switch. Given the variety of sizes and designs of switches and the varying needs in data packet capacity requirements, it is natural that there are many possible configurations for incorporating the functionality described in the invention into such switch designs.

Generally speaking, the functional elements of the switch described herein are not required to be oriented or arranged as shown in FIG. 8. For example, the PPE 15 may be located on a dedicated field replaceable card independent of the line modules 40, switch controller 20, or switch fabric 32 as shown in FIG. 9.

Figure 9:
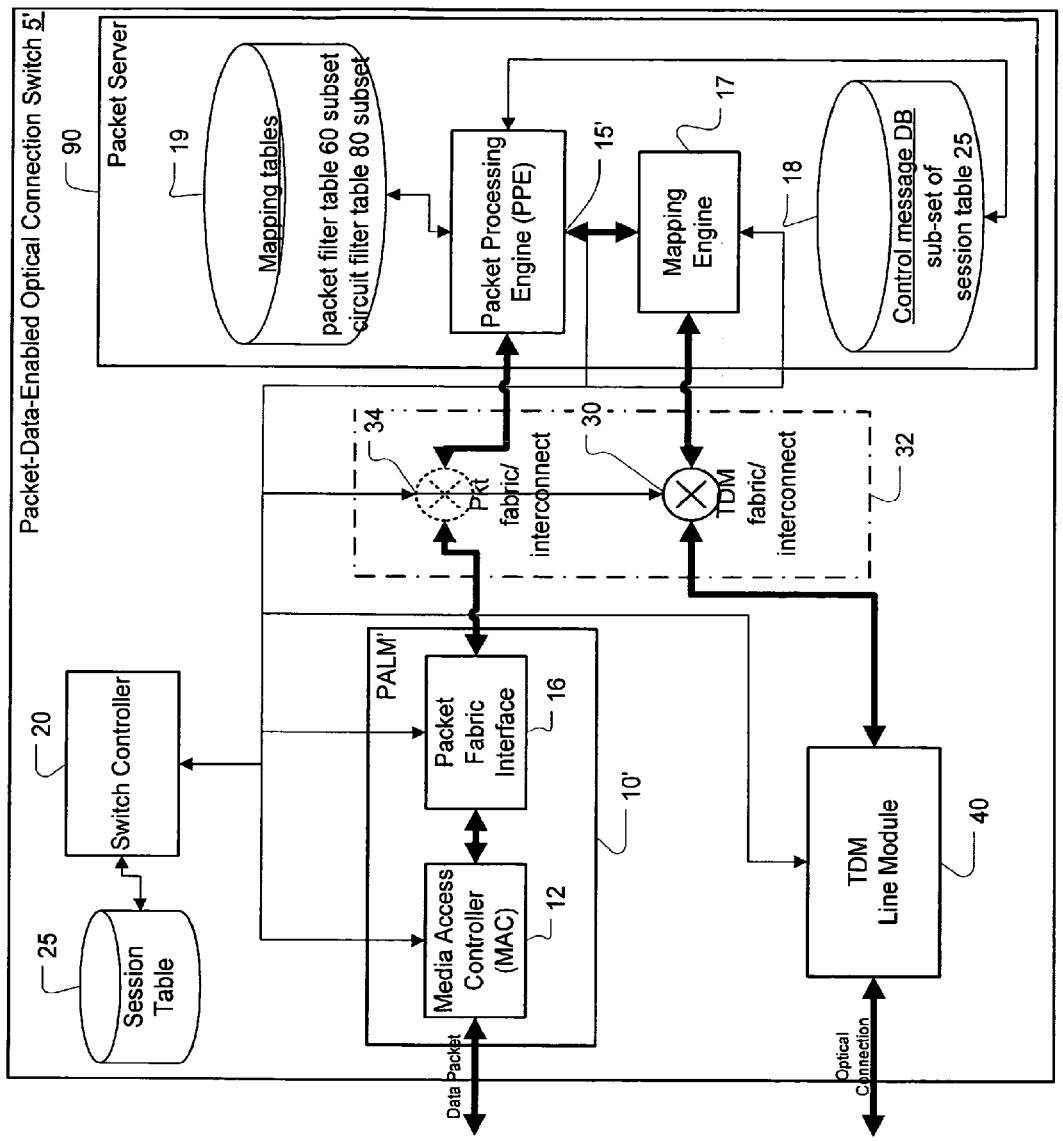
FIG. 9 is a detailed block diagram of alternative construction and operation of a packet data-enabled optical connection switch and further illustrating an alternative connection of a packet access line module (PALM') according to the invention.

As further shown in the packet-data-enabled optical connection switch 5' configuration of FIG. 9, the packet server 90 contains the PPE 15 and mapping engine 17 while the MAC 12 is contained on a simplified Packet Access Line Module (PALM' 10'). The TDM Line Module 40 is a conventional optical connection originating/terminating module as in FIG. 8. The switch 5' shown in FIG. 9 is a simplified diagram of a practical switch and has only one PALM' 10', one TDM line module 40 and one packet server 90 but it is to be understood that in a practical implementation that a plurality of these elements are includes to provide the switch with greater capacity.

Comparing the FIG. 9 configuration of the switch 5' against the FIG. 8 configuration, the mapping engines 17 function identically. The PPE 15 functions are also identical but implementation would be different, thus PPE is labeled 15' in FIG. 9. The switch controller 20 and the tables 25, 60, 80 would also be the same other than differences in switch control coordination of flows to PPE and PPE to optical connection which is more complicated.

More specifically, the PPE 15' in FIG. 9 sends and receives traffic via the mapping engine 17 and packet fabric 34 while the PPE 15 in FIG. 8 may also send and receive traffic via a physical client port via the MAC 12. In both configurations the PPE's primary function is to manage pseudo-wires in optical connections and translate and manage packet data flows from/to the pseudo-wires.

In order to benefit from statistical multiplexing gain, many pseudo-wires (on the order of 1,000 s or 10,000 s) will be carried in each optical connection. The data flows that are translated into these pseudo-wires will normally connect to the packet-data-enabled optical connection switch over many different physical ports. These physical ports may be located on several different PALMs 10. The PPE 15 will aggregate these multiple pseudo-wires and use traffic shaping principals to share one or more optical connections between the pseudo-wires. The source/destination flow associated with each pseudo-wire may reach the PPE via a MAC 12 located on the PALM 10 with the PPE 15, or it may be forwarded via the packet fabric 34 from a PPE 15 located on another PALM 10. This is the architecture shown in FIG. 8.

As the space and power limits of the PALM 10 will limit the size and capacity of the PPE 15 that can be located on the PALM 10, it may be desirable to locate the PALM on a dedicated module like the packet server 90 shown in FIG. 9. In this configuration, the PPE' 15' operates as described above.

The packet server 90 is essentially another example of switch architecture with the PPE and other data functions included.

As described earlier, the implementation of the interconnect switch fabric 32 is beyond the scope of the invention. Depending on the implementation of the packet data interconnect function 34, it may be necessary to translate the packet data traffic from/to the PPE 15, 15' into a compatible format for the interconnect. In FIG. 9, the packet fabric interface 16 is fulfilling this function. This is a detail that could be considered part of the packet fabric/interconnect implementation and removed from the figure as in FIGS. 10-13a.

Figure 10:
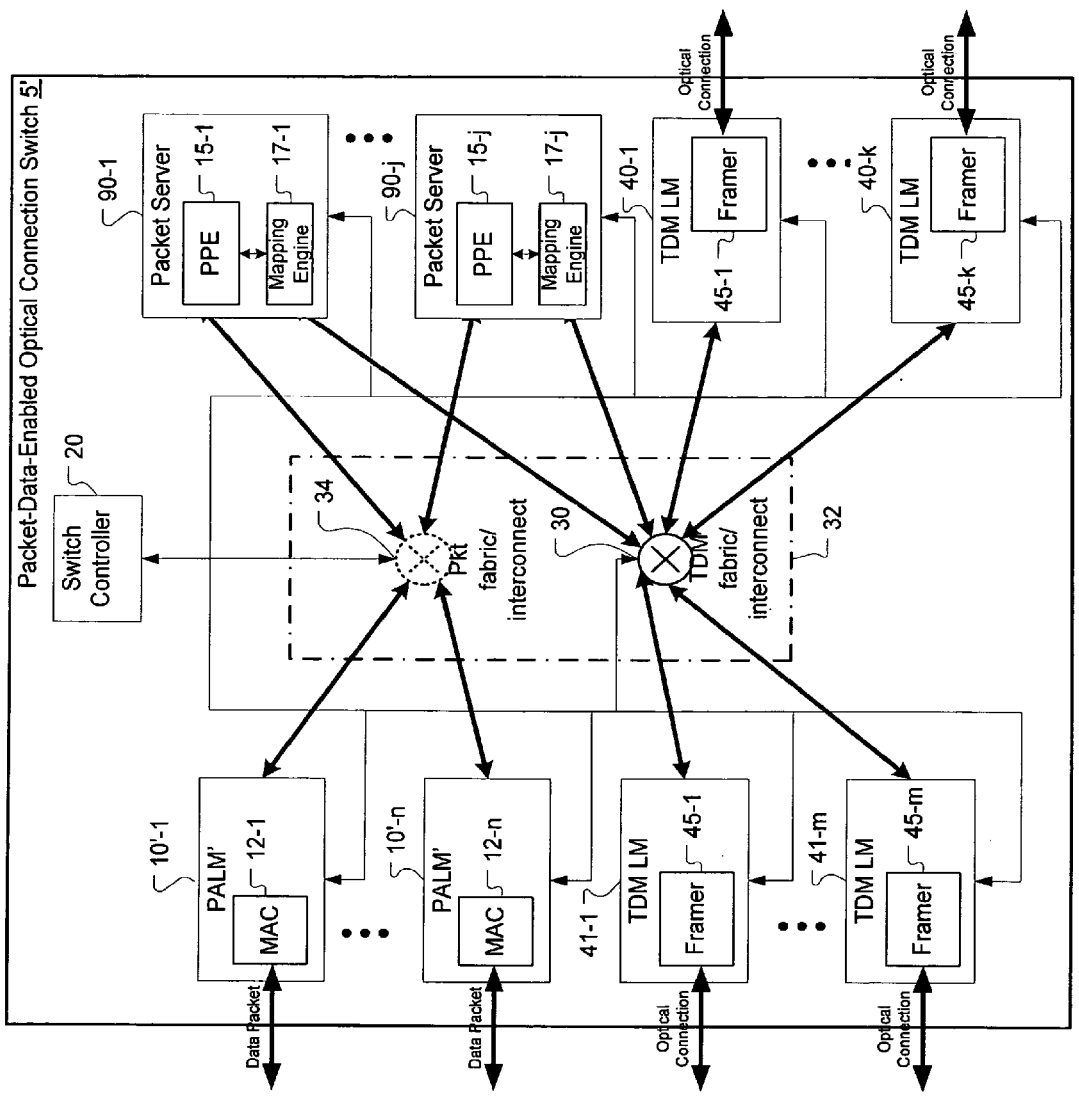
FIG. 10 is a high-level block diagram showing an alternative packet-data-enabled optical connection configuration according to the invention and utilizing the alternative packet access line module of FIG. 9.

More specifically, the switch 5' may contain multiple packet server modules 55 to increase the packet processing capacity of the switch 5' and/or for redundancy as shown in FIG. 10. As shown therein, n PALM' modules labeled 10'-1 through 10'-n are provided. In addition, j packet servers labeled 90-1 through 90-j are also provided.

Packet traffic transmitted between PALM' 10' cards and packet server 90 cards can be carried over a packet switch fabric 34 or interconnect as shown in FIG. 10. The packet switch fabric 34 or interconnect may be implemented any number of ways. Examples of implementations include but are not limited to a dedicated packet switch element contained on a field replaceable switching card; dedicated backplane traces between PALMs 10' and packet servers 90; an asynchronous crossbar switch; or dedicated connections between PALMs 10' and packet servers 90 in the TDM switch fabric 30.

Figure 11:
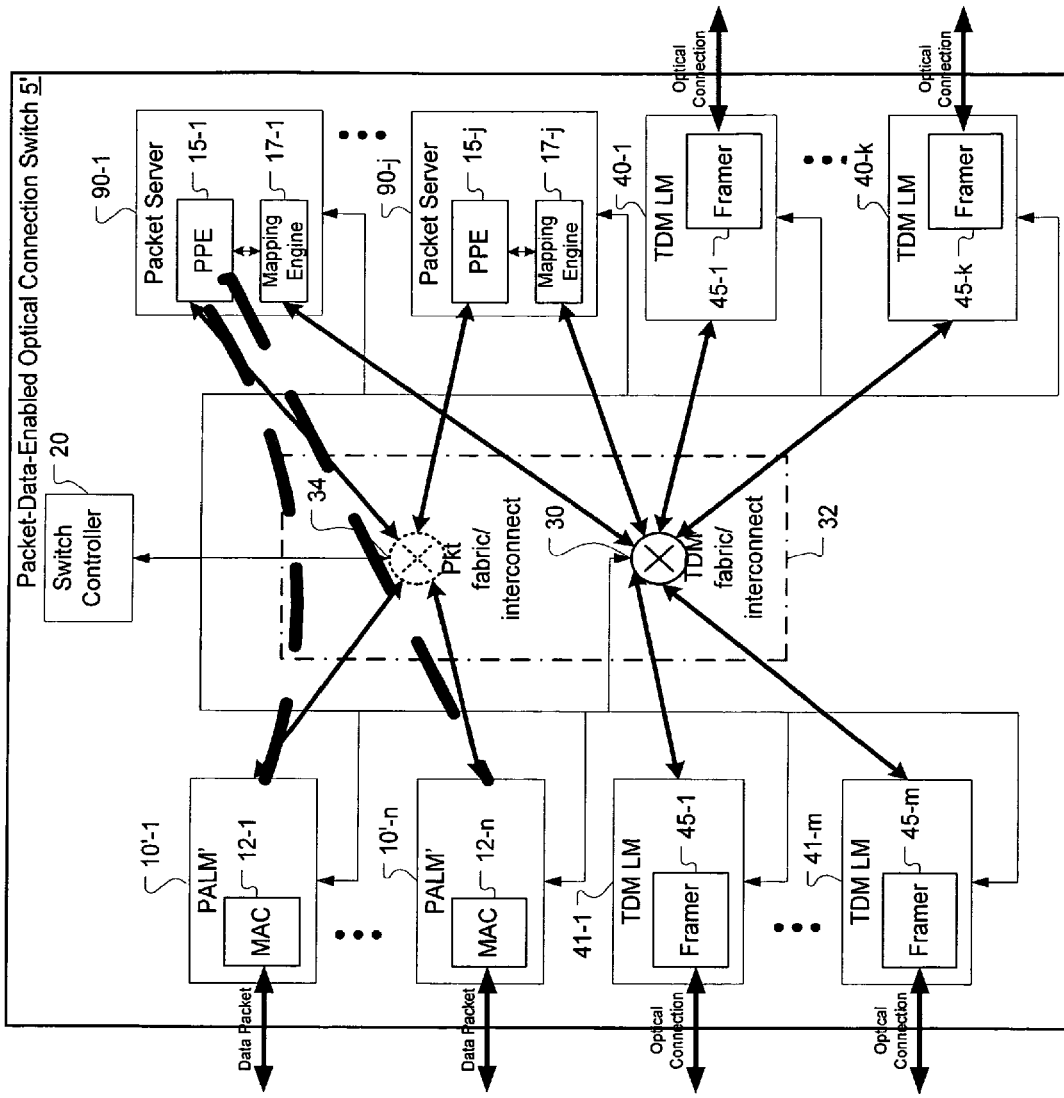
FIG. 11 is a high-level block diagram showing one alternative data flow within the packet-data enabled optical connection switch configuration of FIG. 10.
Figure 12:
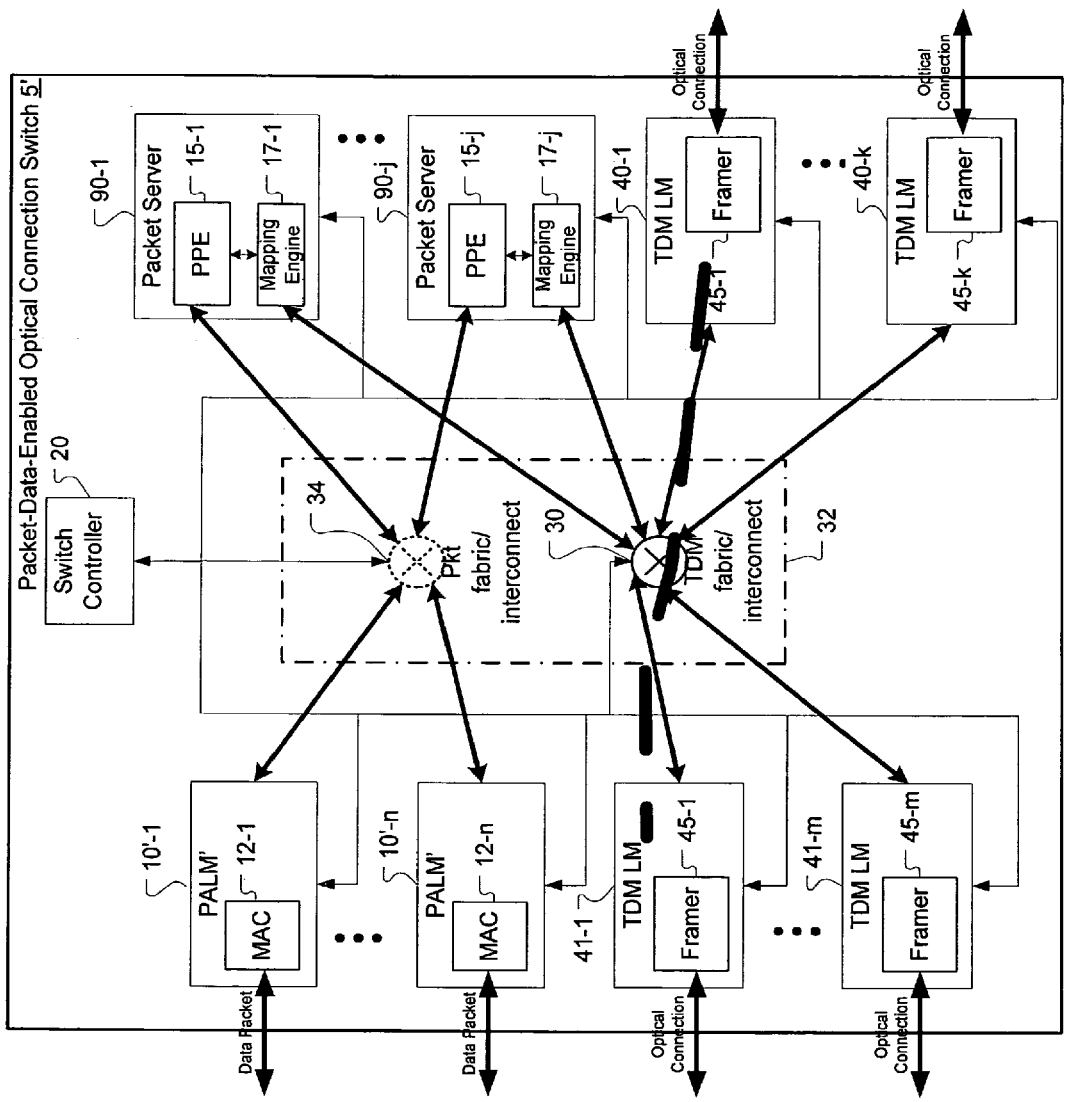
FIG. 12 is a high-level block diagram showing a second alternative data flow within the packet-data-enabled optical connection switch configuration of FIG. 10.
Figure 13:
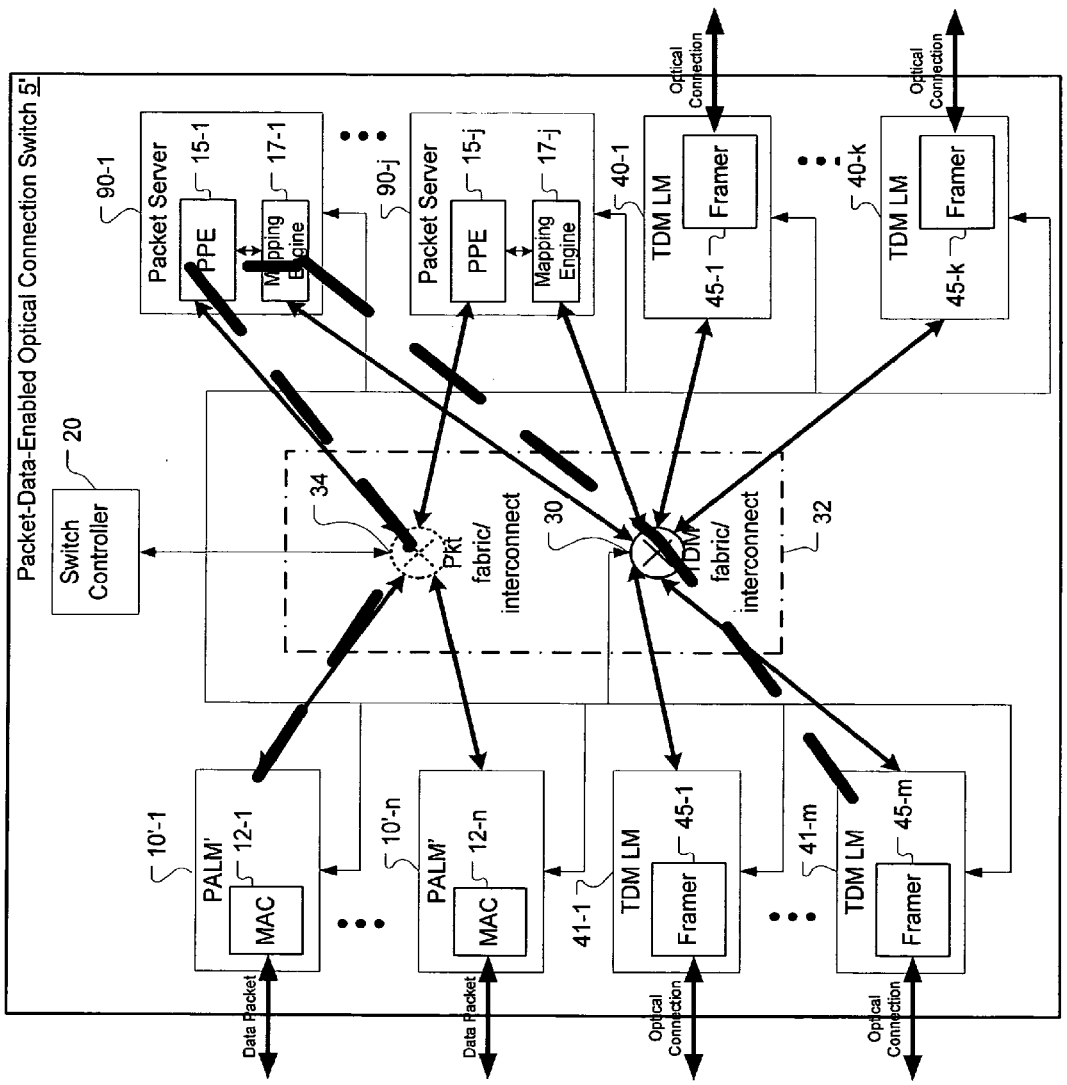
FIG. 13 is a high-level block diagram showing a third alternative data flow within the packet-data-enabled optical connection switch configuration of FIG. 10.

A packet switch fabric 34 or interconnect may be used in the packet-data-enabled optical connection switch 5' even if the architecture does not include packet server modules 90. As shown in FIG. 8, a packet switch fabric 34 or interconnect can be used to transmit packets between PPEs located on multiple PALMs (e.g. between PPE 15-1 on PALM 10-1 and PPE 15-n on PALM 10-n. Transmitting packets between PPEs 15 in such a fashion allows aggregation of packet data from multiple physical ports that reside on different PALMs An advantage of a packet-data-enabled optical connection switch 5, 5' is that the same network element can used to switch a variety of types of traffic. Traditional TDM circuit traffic is switched similarly as on traditional optical connection switches via a TDM fabric such as TDM fabric 32 and TDM line modules 40, 41 as shown in FIG. 12. Simultaneously, the packet-data-enabled optical connection switch 5, 5' can be switching L2 packet flows into pseudo-wires over optical connection as described in the invention and shown in FIG. 13 for the case of a packet server architecture. The PPE 15' and PALM 10' may be implemented to also allow packet switching between packet data ports as shown in FIG. 11.

As mentioned earlier, an intermediate provider node may have the capability to overwrite an encapsulation label. Such a node would most likely contain a PPE 15 or 15' and mapping engine 17 to perform this function. One reason to overwrite the encapsulation label at an intermediate node would be to aggregate multiple pseudo-wires arriving at the node on different optical connections onto a common outbound optical connection.

An example of the data path through packet-data-enabled optical connection switch with packet server architecture is shown in FIG. 13a In this example, an optical connection containing packet data traffic arrives at the switch on TDM line module 40-1 and is switched via the TDM switch fabric 32 to the mapping engine 17-1 located on packet server 90-1. The PPE 15-1 will process the recovered packet as described earlier but the outgoing data interface entry in the circuit filter table will contain a value that reserved for the PPE to loop the packet back into the PPE 15-1 similar to if it were to have arrived from the packet fabric/interconnect 34. The PPE 15-1 will then process the packet again and based on the packet filter table 60 send the packet to the mapping engine 17-1 to go out another optical connection. This other optical connection, originating from the mapping engine 17-1 is switched via the TDM switch fabric 32 to the associated outbound TDM LM, 40-m in FIG. 13a.

As noted previously, the different types of L2 traffic supported by the packet-data-enabled optical connection switch may require multiple MACs 12 and/or multiple types of PALMs 10, 10'. Additionally, the PALM 10, 10' may contain multiple physical ports that may or may not be sending/receiving the same type of L2 traffic.

In a general case, a sub-set of ports on the PALM may send/receive conventional TDM optical connection traffic so that the PALM also functions as a TDM LM on a sub-set or all of the traffic. Similarly, a mixture of conventional TDM traffic and L2 traffic may arrive on the same physical port of a PALM. In this case, the L2 traffic is contained in a TDM transport frame that is multiplexed with other transport frames into a single high-speed TDM frame. In order to access the L2 traffic, the PALM 10, 10' would perform conventional TDM add/drop multiplexing (ADM) functionality to terminate the TDM connection containing the L2 traffic and pass the remaining TDM connections to the TDM switch fabric.

For example, a physical port on a PALM may be receiving/transmitting a SONET OC48 signal with the first 12 STSs carrying ATM traffic and the remaining 36 STSs carrying TDM circuit traffic that is to be switched to other TDM outbound ports on the switch. The PALM 10, 10' would first demultiplex the OC48 signal using conventional means. The resultant tributary that contained the ATM traffic would be terminated and the L2 packets recovered and forwarded to the PPE. The remaining TDM tributaries would be forwarded to the TDM switch fabric 32, similar to how they would have been handled had they arrived at the switch on a TDM LM port.

Example Of Inventive Operation

In this section, we walk through an example of how a carrier provisions a pseudo-wire between SONET switches, such as a CoreDirector® (CD) switch made by CIENA Corporation.

Figure 20:
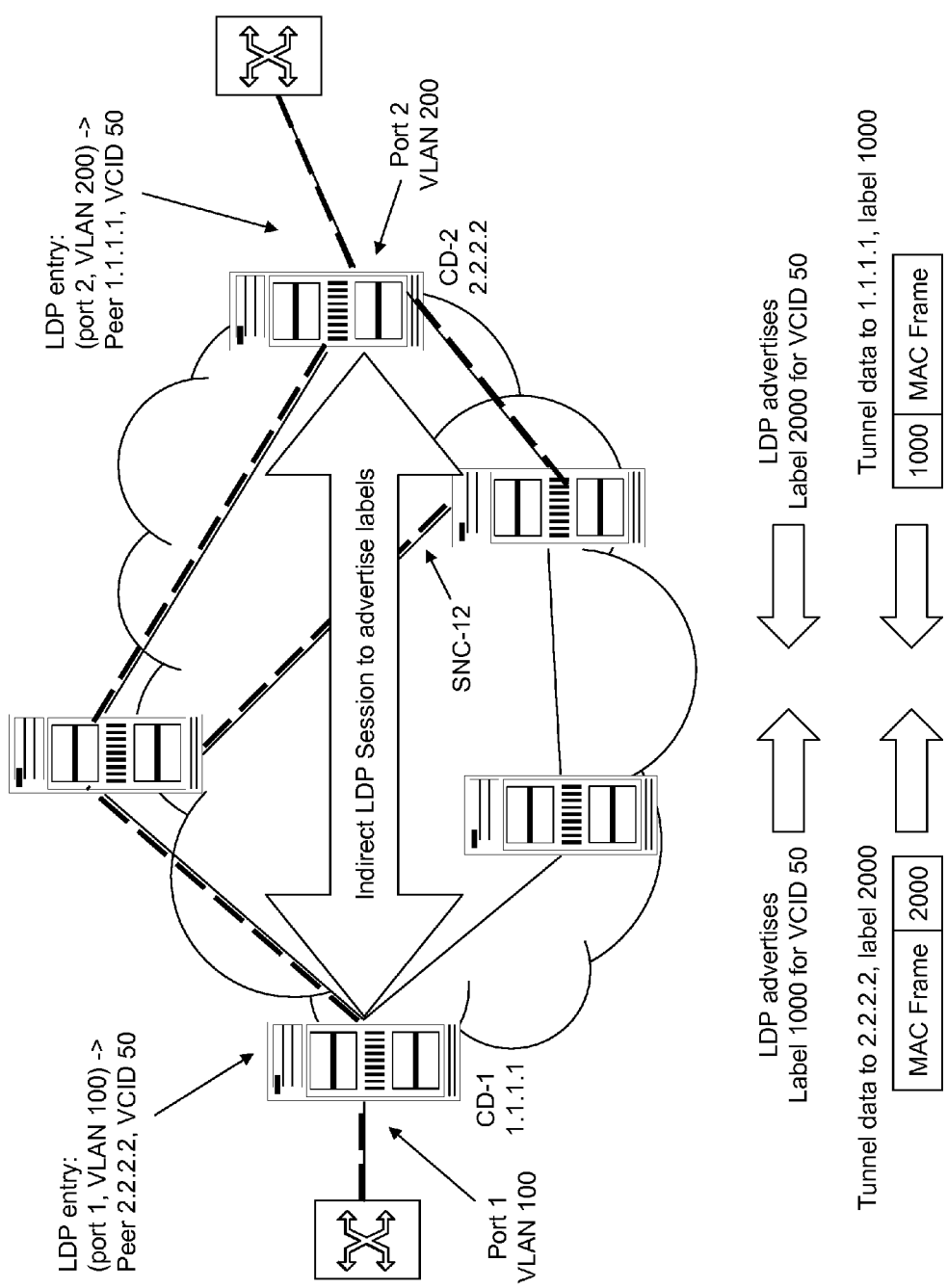
FIG. 20 is an example of the inventive apparatus and methods in operation.
Figure 22:
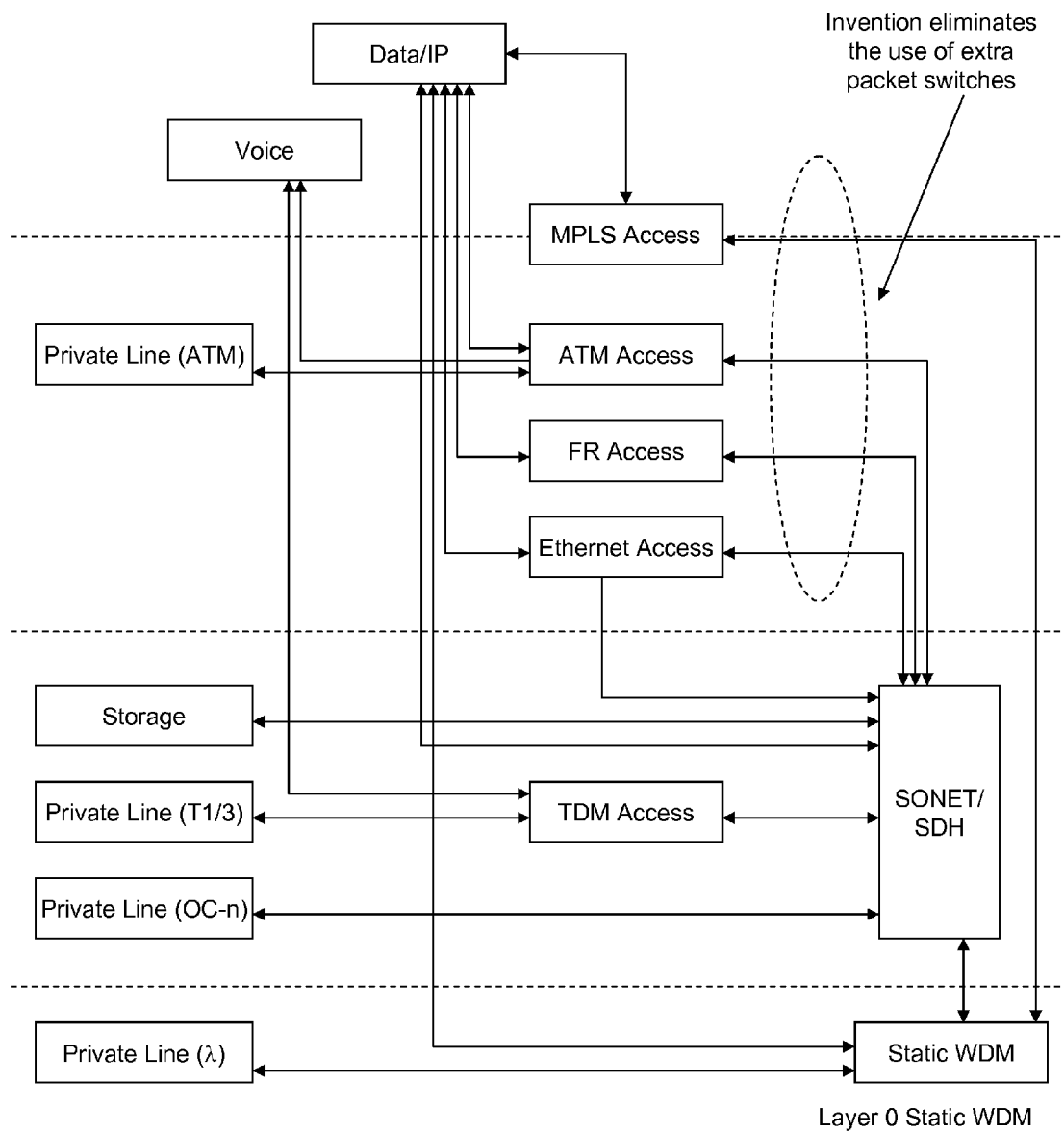
FIG. 22 is a model of the network according to the principles of the invention.

As shown in FIG. 20, CD-1 (IP loopback address 1.1.1.1) and CD-2 (IP loopback 2.2.2.2) are provided in a network having other (unlabelled) CDs that serve as intermediate nodes in the provider network. A customer attaches to port 1 on CD-1 using VLAN ID 100, and to port 2 on CD-2 using VALN ID 200. Inside the SONET transport network, SNC-12 is established ahead of time. SNC-12 can be used to carry Ethernet traffic between CD-1 and CD-2.

Both CD-1 and CD-2 use LDP to discover each other. This allows both nodes to exchange control information to setup the pseudo wires. All control messages are tunneled through SNC-12 as SONET payload and encapsulated with a MPLS "IP4 Explicit NULL Label".

Once a SNC is in place, establishing a pseudo wire includes three basic steps:

1. Network Operator Provisioning:

Each VCID uniquely identifies a pseudo wire between a pair of edge nodes. At each node we associate a port/VLAN with a remote edge (loopback address) and VCID. In the example, the network operator picks VCID 50 to identify the pseudo wire between (Port 1, VLAN 100) on CD-1 to (Port 2, VLAN 200) on CD-2. All necessary information is downloaded to CD-1 and CD-2.

2. MPLS Label Advertisement and Solicitation:

Upon the completion of the provisioning process, LDP automatically exchanges pseudo wire information between CD-1 and CD-2. CD-1 advertises MPLS label 1000 for VCID 50 to CD-2. Similarly, CD-2 advertises label 2000 for VCID 50 to CD-1.

3. Data Plane Setup:

After MPLS labels have been exchanged, the edge nodes program the data plane for pseudo-wire operation. CD-1 will program the PPE as follows:

For all Ethernet frames received from Port 1 with VLAN 100, push label 2000, and send the frames through SNC-12.

For all Ethernet frames carried over SONET arriving on SNC-12 with label 1000, rewrite VLAN-ID to 100, send them through Port 1.

Similar rules are configured on CD-2 for frames going to CD-1.

Advantages Of Invention:

Martini's pseudo-wire approach provides a uniformed method to carry all types of layer-2 traffic over a carrier's backbone network. However, the backbone must be MPLS/IP-enabled. Traditionally, carriers are very careful with setting up SONET cross-connections inside their networks. In many cases, SONET connections are well provisioned with a rich set of features for network resource allocation, traffic restoration, and link protection, etc. Thus, instead of building pseudo-wires over a MPLS backbone, it would be desirable to use SONET cross-connects to carry pseudo-wire traffic directly.

If backbone networks deliver only layer-2 frames between edges, it may be more economical from both an equipment and management expense point of view to provide the "tunneling" functionality on top of the SONET cross-connects directly, rather than building another layer of tunneling mechanism running on top of optical transport networks.

In the invention, optical transport networks can be used to support both traditional voice traffic as well as data packets. The transport backbones can be provisioned and administrated as they have been for years. Only at network edges, pseudo wires are established to transfer data traffic. Thus, the overall transport management system is not disturbed.

By creating pseudo wires on top of SONET cross-connects, carriers can better utilize network resource by mapping individual user traffic onto SONET virtual concatenated trunks, and adapt mechanisms such as LCAS to fine-tune bandwidth reservations. Since the pseudo wires and the optical cross-connections are originated from the same edge nodes, this can potentially reduce network operation cost for carriers.

The carriers can aggregate data traffic into transport networks directly from network edge. There is no need to introduce UNI or NNI interfaces to bring data traffic into the optical domain. Mapping pseudo-wires into pre-established SNC's automatically can eliminate the undesired effect of creating and deleting SNC's dynamically at user and network interfaces.

From a hardware support point of view, this approach will leverage the scalable SONET switching capability in some of the SONET switches. Carriers can bundle and aggregate pseudo-wires into fine-granular STS trunks. It is important to realize that SONET STS trunks themselves are perfect for user flow isolation and bandwidth guarantees. Providing class-of-service or QoS at an STS granularity is hence a unique feature that routers cannot cheaply replace in the foreseeable future.

This invention can aggregate both traditional Layer-2 as well as MPLS labeled traffic over optical transport networks. As a result, this invention can further help network providers to integration services, such as L2 and L2 VPN, more economically.

Second Embodiment (Admission Control Apparatus, System and Method)

Terminology of Second Embodiment

Due to the possibility of a common environment, hardware and application, the second embodiment may use many of the same devices, processes and techniques of the first embodiment. However, it is to be noted that the second embodiment may be applied within a much broader context than the first embodiment. Specifically, the second embodiment may be applied to electrical transport networks that utilize routers and/or L2 switches. Some of the differences are pointed out below in this terminology section while specific hardware and operational differences are explained in following sections.

CE: Customer Edge. This is also referred as a customer data node or customer edge node throughout this specification. The CE may be a router or a switch.

PE: Provider Edge. This is a device (also referred to herein as a provider edge node) that either routes or switches traffic. In the context of the second embodiment of the invention, a PE can be a router, a Layer-2 switch or an optical switch.

Ingress: This refers to traffic entering a provider's backbone from a CE.

Egress: This refers to traffic leaving a provider's backbone toward a CE.

Data Tunnel: A data forwarding connection between two PE's. A data tunnel can be a MPLS label-switched-path (LSP), a SONET/SDH cross-connect, or an optical connection. Throughout this second embodiment one of the primary considerations is traffic engineering that may be applied within the backbone portion of the network to data connections to/from the backbone.

Data Interface: An interface that points to a CE, and is responsible for receiving packets from customer networks.

Data Flow: A stream of packets that can be uniquely identified through packet headers or the received physical interface. In the context of the invention, each Data Flow will be encapsulated with labels and aggregated into a Data Tunnel. That is, each Data Tunnel can aggregate multiple Data Flows.

Pseudo-wires: One pseudo-wire maps to one Data Flow. A Pseudo-wire is the Data Flow with all packets encapsulated with a label. This description interchanges the terms Pseudo-wire or Data Flow during for simplicity and clarity.

Initiating Point: the PE node that initiates the creation of a pseudo-wire.

Terminating Point: the PE node that terminates a pseudo-wire. Note that each pseudo-wire may be a bidirectional data flow, thus, there may be no significant functional difference between an Initiating and a Terminating point.

AC Logic: Pseudo-wire Admission Control Logic (see FIG. 24). This logical entity controls the admission control procedure during pseudo-wire setup and tear down. An actual implementation of AC Logic 220 is a software process running on a control module of a router or switch but this AC logic 220 could also be implemented with an ASIC, FPGA, etc as is known in the art.

The first embodiment described above does not fully address the issues concerning data flow aggregation and the resulting potential for traffic congestion. In the context of pseudo wires used by the first embodiment and also described in conventional pseudo wire techniques such as Pseudo Wire Emulation Edge-to-Edge (PWE3), each data tunnel (such as an optical connection or a MPLS label-switched-path) between two provider edge nodes is capable of aggregating multiple data flows. The aggregation of such data flows can cause real and difficult congestion problems that need to be resolved.

This congestion problem is magnified for those data flows that require service guarantees from provider backbone networks. If such quality of service guarantees are made then the provider edges should apply some type of admission control to regulate both incoming and outgoing data traffic. Otherwise, the quality of service guarantee cannot be consistently met with the result being that the provider may lose customers, be forced to pay fines, etc. While the need for admission control on incoming traffic flows is apparent and a relatively easy problem to solve, such admission control requirements on outgoing traffic flows can be subtle and tricky to resolve.

Figure 23A:
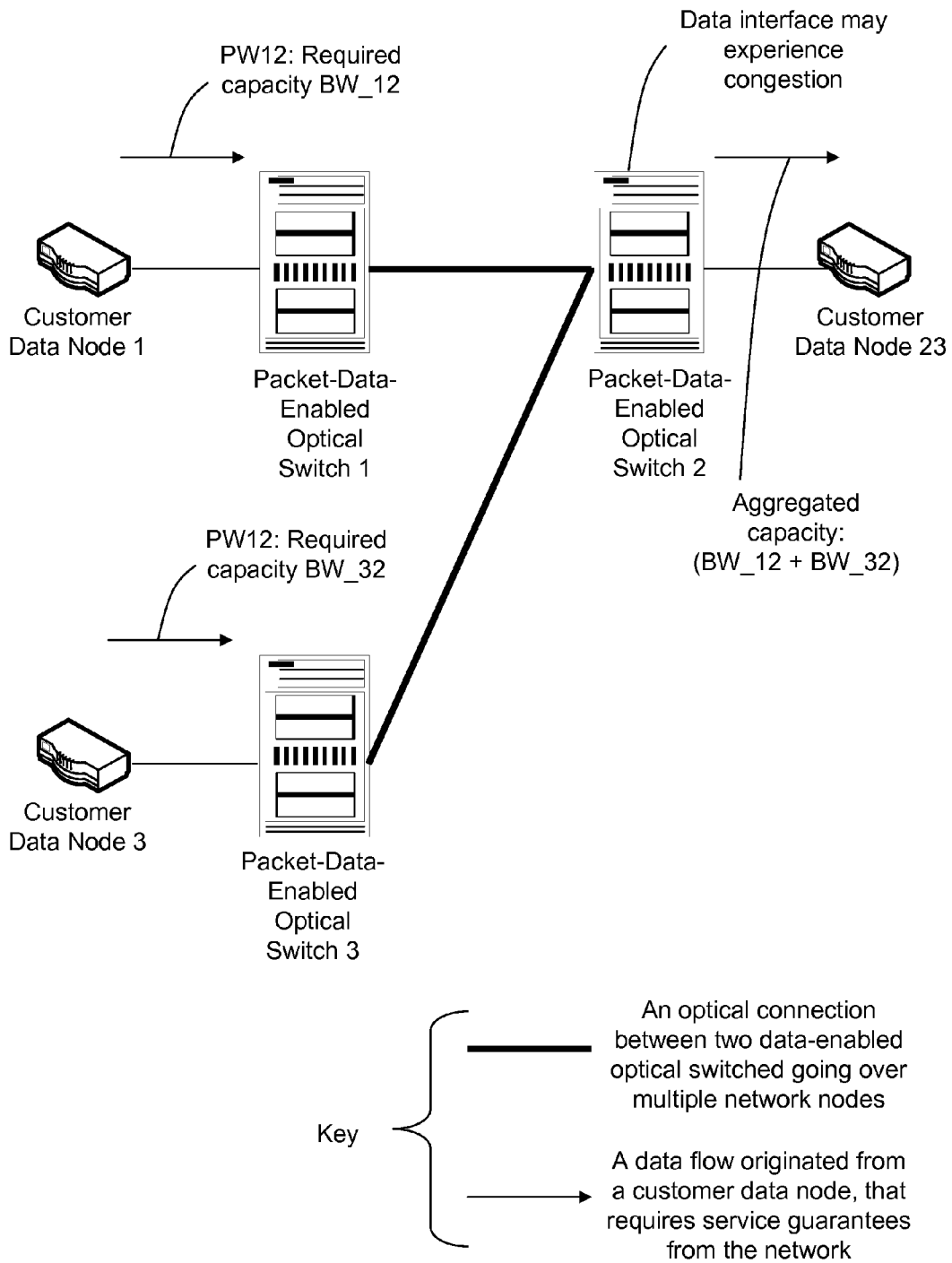
FIG. 23a is a high-level network diagram showing a scenario that exemplifies the need for admission control on outgoing data flows according to the invention.

FIG. 23*a* shows a scenario that exemplifies the need for admission control on outgoing data flows. As shown therein, both Customer Nodes 1 and 3 communicate with Customer Node 2. There exists one pseudo-wire, PW12, between Provider Edge Nodes 1 and 2 to transfer data traffic between Customer Node 1 and 2. Similarly, a pseudo-wire, PW32, is used to carry traffic between Customer Node 3 and 2. PW12 and PW32 require network bandwidth (BW) resources BW_12 and BW_32, respectively.

Within the provider backbone, the provider may deploy techniques such as MPLS in a router backbone, and GMPLS or OSRP (optical signal routing protocol developed by CIENA Corporation) in an optical network backbone to manage the data connections between provider edge nodes. As a result, the packets are not likely to experience any traffic disturbance inside the backbone but this is not true of the ingress and egress data interfaces.

In the example illustrated in FIG. 23*a*, both pseudo-wires (PW12 and PW32) exit the network at the same data interface on Provider Edge Node 2. The data interface, therefore, must have enough capacity to handle data traffic that is the "sum" of both pseudo-wires (BW_12+BW_32). Otherwise, data traffic from Customer Node 1 and 3 may experience congestion at the data interface. This type of data service is unacceptable, and can be quite costly, particularly considering that data traffic has been well provisioned and delivered within the backbone, but dropped at the last leg of the transmission—the egress interface.

Note that network resources are generally multi-dimensional vectors and may contain information such as bandwidth, priority, and service classes. Therefore, it may not be possible to strictly add two resources. For example, one pseudo-wire may call for a higher bandwidth and another calls for a higher priority. In such a case, instead of simply "adding" up two resource vectors, the resource merging routines at the egress interface of the provider edge node must be able to return a third resource vector that is at least as large as each; mathematically, this is the "least upper bound" (LUB). When the term "adding" resources is used herein, it is meant to refer to a LUB operation or equivalent.

To provide edge-to-edge service guarantees, it is critical to provision network resource on egress provider edge nodes. There are a number of conventional methods to achieve this goal each of which has associated disadvantages that the present invention seeks to avoid:

1. Best-effort: This has been assumed in the existing IETF PWE3 framework. This is a reasonable solution if the data service is to deliver best-effort packets only, such as today's Internet IP traffic. However, this is not acceptable for transporting delay-sensitive traffic, such as voice.

2. Over-provisioning: This is a method that over-provisions the egress data interfaces on the provider edge nodes to ensure that needed capacity will always be present. This approach is only reasonable if the providers have the control over the links to the customer networks and where excess capacity is available for the over-provisioning. However, this may not be the case in many existing network configurations, particularly, in situations where the provide networks are transport backbones running SONET/SDH optical connections, and the customer networks are IP router networks. The interfaces between transport and data networks are always administrated separately in current networks thereby making such a method unworkable.

The present invention proposes a method of exchanging data service information between provider edge nodes that is based upon but which significantly extends the existing PWE3 framework. In the example, at pseudo-wire provisioning time, Provider Edge node 2 will be aware of the resources required for PW12 and PW32, and allocate appropriate resource vectors (including bandwidth capacity) accordingly. If not enough resources are available, the Provider Edge nodes of the invention may apply mechanism, such as pre-emption and resource shuffling, to make room for more important pseudo-wires.

Control-Plane Service Negotiation Overview

Figure 23B:
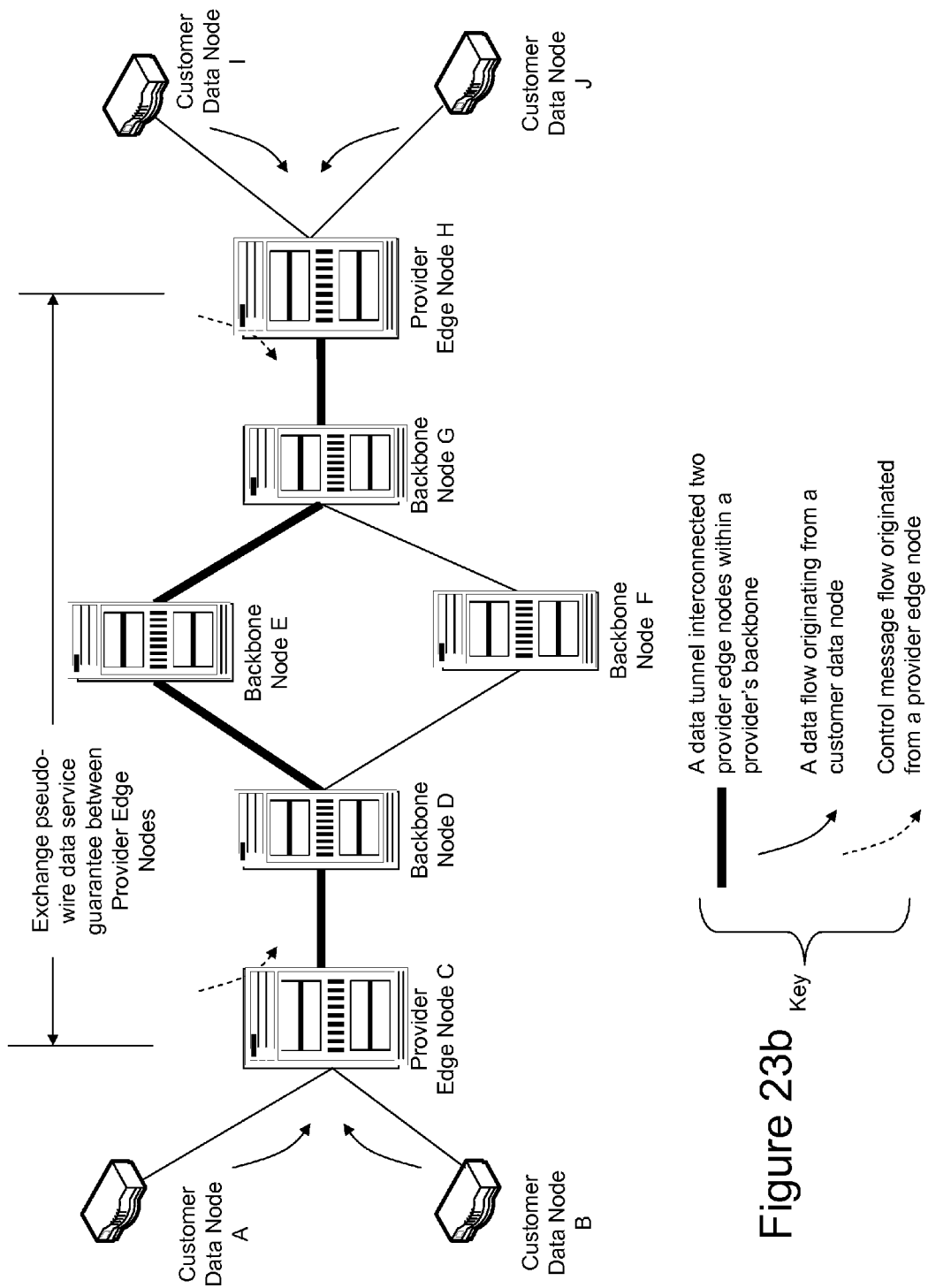
FIG. 23b is another high-level network diagram illustrating the operation of service negotiation between Provider Edge Nodes according to the concepts of the invention.

FIG. 23b illustrates the operation of service negotiation between Provider Edge Nodes. Provider Edge Nodes C and H aggregate data flows (solid arrow) from Customer Data Node A, B, I and J over a data tunnel (heavy black line). The data tunnel traverses through a number of backbone nodes, D, E and G of the provider backbone network.

Provider Edge Nodes C and H use signaling protocols, such as those described above in relation to embodiment 1 or by using LDP and draft-martini, to provision pseudo-wires. The result of the provisioning is to aggregate multiple data flows into a single data tunnel. Each data flow is represented as a pseudo-wire within the data tunnel as will be described in more detail below in relation to FIG. 31.

In addition to the pseudo-wire information that has been described above in the first embodiment, the second embodiment requires the provider edge nodes to exchange the following information for each data flow (or pseudo-wire):

CIR (Committed Information Rate): This information describes the amount of bandwidth that is required for a given pseudo-wire. This CIR information is essentially the same, in and of itself, as the CIR traditionally used in Frame Relay service offerings but is utilized by the invention in a completely different context and environment. CIR is derived from data flow's average and peak bandwidth requirements. Each provider may have different CIR settings the description of which is beyond the scope of this invention.

Class: This information describes the traffic class to which a given pseudo-wire belongs. Although the description of the class may be the same as what has been defined in IETF DiffServ (specifically, RFC2597: Assured Forwarding PHB Group, http://www.ietf.org/rfc/rfc2597.txt, RFC2598: An Expedited Forwarding PHB, http://www.ietf.org/rfc/rfc2598.txt) and the class format may be the same as DSCP [RFC2474: Definition of the Differentiated Services Field (DS Field) in the IPv4 and IPv6 Headers http://www.ietf.org/rfc/rfc2474.txt], the application thereof to the specific provider edge node admission control techniques of the invention is unique.

Setup Priority: This information describes the priority of a given pseudo-wire with respect to taking resources. This value is used in deciding whether this pseudo-wire can preempt another pseudo-wire. The Setup Priority is assigned by the provider to a customer's data flow. During pseudo-wire provisioning, when this is no sufficient amount of network resource, a data flow with higher Setup Priority value can preempt the pseudo-wires with lower priority from a data tunnel. The concept is elaborated upon in detail in the operational section below.

Holding Priority: This invention describes the priority of the pseudo-wire with respect to holding resources. The Holding Priority is used in deciding whether this pseudo-wire can be preempted by another pseudo-wire. The Holding Priority is assigned by the provider to a customer's data flow.

Note that the usage of above parameters may exist in other technologies. Specifically, CIR is a concept from Frame Relay; Traffic Class is the central concept in Internet DiffServ service; Setup and Holding Priority have been mentioned in RSVP-TE for MPLS [RFC3209]. However, they have never been bundled together in the context of supporting CE-PE network edge admission control at PE nodes nor has this information been exchanged among PE's, particularly for the purpose of admission control.

System Logical View

Figure 24:
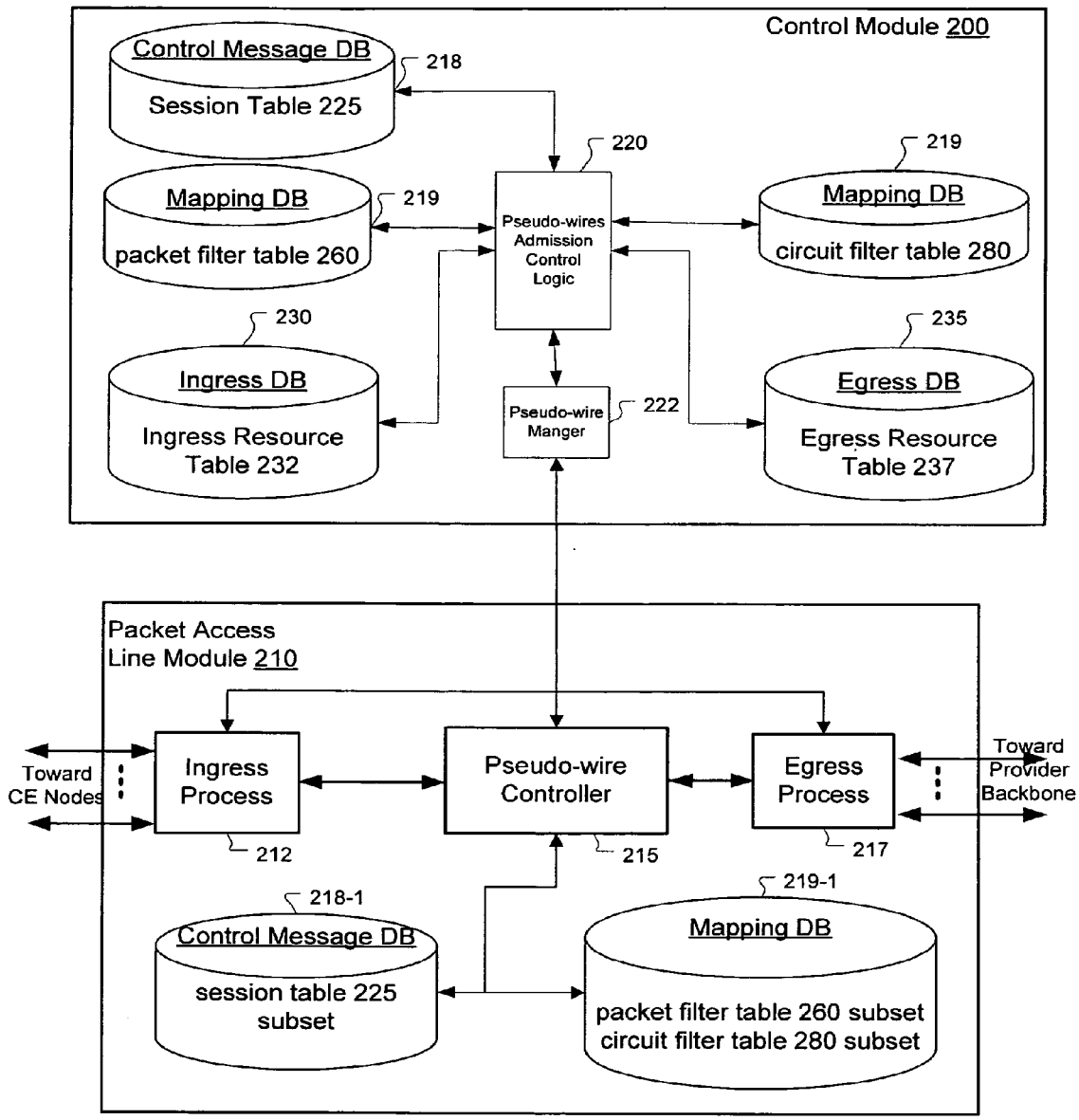
FIG. 24 is a high-level block diagram of a packet access line module and control module for performing admission control according to the invention.

FIG. 24 is a high-level block diagram of a packet access line module 210 and control module 200 for performing admission control according to the invention. The elements of FIG. 24 may be included within the provider edge nodes illustrated in FIGS. 23a and 23b. In this second embodiment, the provider edge nodes may be a router, a Layer-2 data switch, or an optical switch that is capable of processing data traffic. In the latter case of an optical switch capable of processing data traffic, a prime example is the first embodiment of the invention that is described above in relation to FIGS. 1-22.

As shown in FIG. 24, the inventive system includes a control module 200 that is responsible for handling all control protocol messages including the setup of pseudo-wires. As further shown in FIG. 24, the control module 200 includes a pseudo-wire manager 222 and a pseudo-wire admission control logic 220 that interfaces with multiple databases during its operation, which will be explained in detail below. The control module 200, pseudo-wire admission control logic 220 and pseudo-wire manager 222 may all be implemented as software processes and executed by an available microprocessor which may already be present in the provider edge node. Alternatively, these elements may be part executed by a separate microprocessor or group of microprocessors or may be implemented by an FPGA, ASIC or other combination of hardware and software as is generally known in the art.

As further shown in FIG. 24, the invention further includes a packet-access line module 210. Multiple packet access line modules 210 are typically included in an actual implementation but for the ease of explanation only one is illustrated in FIG. 24.

The packet access line modules 210 differ from the PALMs 10, 10' of the first embodiment in that the packet access line modules 210 are more general and are not so tied to the SONET/SDH optical switching environment of the first embodiment. In the first embodiment, the PALM 10, 10' is responsible for processing MAC packets and maps them into an optical connection, thus, it is a component on an optical switching device. Whereas in the second embodiment, a PALM 210 can process packets from any data interface, and send them out to any data interface. Thus, the PALM 210 of the second embodiment can be one used on routers. However, in both cases, the PALM needs to be capable of supporting packet admission control, such as policing and shaping.

The packet access line modules 210 interface with Customer Equipment (CE) Data Nodes, and are responsible for aggregating data flows using a multiplexer (not shown) or other conventional device for the physical aggregation. This could be a line module that interfaces with Customer Equipment Data Nodes directly, or a service module that process data flows from other line modules within the same system. Nevertheless, each Packet-Access Line Module 210 processes packets coming from multiple data interfaces, and aggregates them into multiple outgoing interfaces toward the provider's backbone, which is explained below in more detail.

To interface with the provider backbone, one or multiple provider-interface line modules (not shown) should be provided as is known in the art. Such provider-interface line modules interface with the Packet-Access Line Modules 210 to inject packets into provider's backbone in the conventional fashion. Depending on the type of provider's network, they can be a conventional router packet forwarding module, a Layer-2 switching module, or a TDM switching module (see first embodiment above for an example).

Using or otherwise accessing the control module 200, network operators request the setup of pseudo-wires. The actual details of pseudo-wire setup have been exemplified and specified in other relevant documents [draft-martini, LDP] a significant variation of which is described above in relation to embodiment one. To support the second embodiment, the pseudo-wire process needs to maintain the following additional information within the databases shown in FIG. 24:

Session Table 225: The session table 225 may be stored in a control message database 218 to maintain all the logical connections that the system has currently established with other provider edge (PE) nodes. Note that each PE node may have multiple parallel connections to another PE node, which results in having multiple logical peering sessions. Each peering session may be a TCP session, which can be uniquely identified by the combination of IP source and destination address, and source and destination port numbers. Further details of the session table 225 are discussed below in relation to FIG. 28.

Mapping Tables: A provider-edge node system of the invention maintains two mapping tables within a mapping database 219: a packet filter table 260 and a circuit filter table 280 are maintained by the control module 200 to enable admission control The packet filter table 260 is maintained to regulate data flows coming into the backbone (from a customer edge node), while the circuit filter table 280 is for controlling data flows leaving the backbone (and to be provided to a customer edge node).

Resource Tables: The control module 200 also includes a pair of resource tables including an ingress resource table 232 stored in an ingress database 230 and an egress resource table stored in an egress database 235. These resource tables respectively maintain all data tunnels (provider-bound) and data interfaces (CE-bound) on a PE node. A data tunnel can be a MPLS Label-Switched-Path, a SONET/SDH cross-connection, or an optical DWDM connection. A data interface can be any interface that can carry data packets, such as Ethernet, FDDI, ATM, POS etc. In the context of the invention, all the data tunnels and data interfaces described here are always associated with network resources such as link bandwidth. There is much less relevance for using admission control in networks and links that do not support traffic engineering or QoS (quality of service).

The pseudo-wire controller 215 on each packet access line module 210 is responsible for processing the actual packets. System-wide control is provided by the pseudo-wire manager 222 that keeps track of system-wide information (e.g. the control message database 218 and session table 225 have system-wide information for the pseudo-wire manager 222).

In contrast, the pseudo-wire controller 215 within each of the Packet Access Line Modules 210 maintains subsets of Mapping Tables and Sessions Tables.

The packet access line modules 210 also include an ingress process 212 that interfaces with an appropriate subset (260-1) of the packet filter table 260 to control incoming data flows for that packet access line module 210. Similarly, an egress process 217 interfaces with an appropriate subset (280-1) of the circuit filter table 280 to control outgoing data packets for that packet access line module 210.

To support pseudo-wires, the ingress process 212 is responsible for encapsulating labels to incoming packets, that have a match in the Packet Filter Table 260, while the egress process 217 strips off the labels when delivering those packets to the customer networks. However, both processes may share the same set of traffic conditioning mechanisms in regulating incoming traffic. Some of the typical and conventional traffic conditioning mechanisms that may be used by the invention include RED ("Random early detection gateways for congestion avoidance", Sally Floyd, Van Jacobson, IEEE Transaction Networking, 1993), Token Bucket, protective buffer management ("Protective buffer management policies", I. Cidon, R. Guerin, and A. Khamisy, IEEE Trans. Networking, 1994), and WFQ ("Analysis and simulation of a fair queuing algorithm", A. Demers, S. Keshav and S. Shenker, Journal of Internetworking, 1990). By applying these mechanisms, packet traffic flows will behave according to the QoS parameters defined between PE's.

The pseudo-wire controller 215 generally operates as follows: When sending control messages within data tunnels, pseudo-wire controller 215 relies on the session table 225 to determine where to forward the control messages. In other words, the pseudo-wire controller 215 generally operates like the PPE controller 70 of the first embodiment details of which are provided above.

Before turning to details of the inventive operation, the tables and databases used by the invention will be discussed.

Packet Filter Table 260

The packet filter tables are for the purpose of handling packets coming from the customer equipment (CE) on the ingress interfaces. FIG. 26 illustrates a packet filter table 260 that is relevant to and used by the invention. Like the packet filter table 60 of the first embodiment, the packet filter table 260 of the second embodiment includes several data fields in common, namely, the data interface, label, data tunnel, and encapsulation label data that are described above in more detail. The packet filter table 260 of the second embodiment, however, includes additional data fields as further described below:

A Searching Key which includes the packet's (incoming) data interface and label information.
(Incoming) data interface: This is the interface that receives the packet. It can be the identification for either a physical or logical interface. The invention makes no assumption on how such information is actually obtained. However, the interface information is required for each packet being received. In some applications, the system can direct incoming traffic base on the incoming data interface information only.
Label: This can be, for example, a Layer-2 header. A Layer-2 header can be an Ethernet MAC and VLAN tag, a Frame Relay DLCI, or an ATM VCI/VPI.
Data Tunnel: This is the connection that the packet will be injected into as it enters the provider network. As shown in the figure, a data tunnel can a MPLS LSP, a SONET Virtual Concatenation path, or an optical cross-connect.

Encapsulation Label: The label for each data flow. It will be encapsulated with the packet. The encapsulation label can be in MPLS label format, or any other format, so long as it can uniquely identify each individual data flow (that is, pseudo-wires) within a data tunnel.

CIR (Committed Information Rate): This indicates the amount of network bandwidth that an incoming data flow can consume. If incoming traffic exceeds this value, traffic congestion may result within a data tunnel. For packets that do not comply, a user-defined traffic conditioning mechanism, such as RED, WFQ etc as described above and buffer management, will be used.

Class: This indicates the traffic class that incoming packets belong. The traffic classes can be Assured Forwarding (AF) and Expedited Forwarding (EF) classes defined in RFC2597 and RFC2598 referenced above in which, there are four independent AF classes, and one EF class.

Setup Priority: The priority of the pseudo-wire with respect to taking resources. This value is used in deciding whether this pseudo-wire can preempt another pseudo-wire.

Holding Priority: The priority of the pseudo-wire with respect to holding resources. The Holding Priority is used in deciding whether this pseudo-wire can be preempted by another pseudo-wire.

The CIR, Class, Setup and Holding Priorities of the packet filter table 260 may be assigned by the provider. As shown in FIG. 26, the packets from Filter-1 and Filter-3 share the same data tunnel, SONET VCG Number-3. Within the data tunnel, each data flow is differentiated by the encapsulation label. The packets that belong to Filter-1 and Filter-3 belong to the same traffic class, AF-1, however, each has a different CIR value. To avoid potential traffic congestion, the PE will apply a conventional mechanism such as RED and buffer management to regulate ingress traffic flows.

Circuit Filter Table 280

FIG. 27 provides further details of the circuit filter table 280 that is used by the second embodiment to handle packets coming from the provider backbone and going toward CE's at the egress interfaces. As shown there, circuit filter table 280 includes the following attributes many of which are shared with the circuit filter table 80 of the first embodiment:

A Searching Key which includes the provider backbone-bound data tunnel and label information.

Data Tunnel: The data connection where the packet arrives from the backbone. It can be a MPLS LSP, a SONET VCG (Virtual Concatenation Group), or an optical interface.

Label: This is the label that has been inserted at the ingress of the data flow. It is used to identify a specific data flow within a data tunnel.

Outgoing Data Interface: The interface where the packet is to be forwarded.

CIR (Committed Information Rate): This indicates the amount of network bandwidth that an outgoing data flow can consume. If data traffic exceeds this value, traffic congestion may result at an egress data interface. For packets that do not comply, a user-defined traffic conditioning mechanism, such as RED, WFQ, and buffer management, will be used.

Class: This indicates the traffic class that outgoing packets belong. The traffic classes can be Assured Forwarding (AF) and Expedited Forwarding (EF) classes defined in RFC2597 and RFC2598, in which, there are four independent AF classes, and one EF class.

Setup Priority: The priority of the data flow with respect to taking resources. This value is used in deciding whether this data flow can preempt another one.

Holding Priority: The priority of the data flow with respect to holding resources. The Holding Priority is used in deciding whether this data flow can be preempted by another one.

In the circuit filter table 280 example of FIG. 27, Filter-1 and Filter-4 share the same outgoing data interface (data port 1). Packets from each filter must comply with the CIR that has been negotiated during the setup of the pseudo-wires.

Session Table 225

The session table 225 is used to keep track of all the control information with peering PE's. In the context of the invention, the provider can assign network resources to ensure the reliable and timely delivery of the control messages.

The session table 225 applies to control messages that are delivered as special "labeled" packets within the data tunnels where pseudo-wires will traverse details of which are described above in relation to the first embodiment.

As shown in FIG. 28, session table 225 has the following attributes many of which are shared with the session table 25 of the first embodiment:

Searching Key: Control Message ID

Each control message carries a unique ID to identify the "peering session" to which it belongs. A "peering session" is a logical connection between two edge nodes and is used to exchange control information between two nodes. For example, in pseudo-wire operation, the customer may apply LDP [RFC3036] "Label Distribution Protocol, http://www.ietf.org/rfc/rfc3036.txt to negotiate data flows. LDP operates over TCP. Between two edge nodes, all control messages go over a TCP session that can be uniquely identified with TCP Sender Port Number, and IP addresses. In this invention, the exact message ID format is not specified but is left open to provide compatibility with existing systems. However, it is reasonable to assume that each control message carries enough information to identify the session to which it belongs.

As an example, FIG. 28 shows three sessions that are identified with, in this non-limiting example, TCP port numbers.

Outgoing Data Tunnel: This is the connection that the control messages will be injected into.

Encapsulation Label: The identifiable label for the control message. The system will insert this label to the control message as further described above in relation to the first embodiment.

CIR (Committed Information Rate): All control messages within a session will have a fixed network resource level. This is designed to protect the control messages from potential congestion caused by regular data traffic.

Class: Control messages are assigned to a traffic class, according to DiffServ. This will further improve the latency for packet delivery. In the example, we assign EF (Expedited Forwarding) class to all three control messaging sessions. Consequently, control messages will always have the highest priority over regular data packets.

Note that in FIG. 28, there are three peering sessions on a specific PE node that are differentiated by TCP source port. In an actual implementation, these three peering sessions correspond to three different TCP sockets on a POSIX interface. It is possible that there is no CIR assigned to a control message for a number of reasons:

1. There is plenty of bandwidth within the data tunnel.
2. The system relies on transport layer (TCP retransmission) for reliable message delivery.

In the example of FIG. 28, Session-3 has no CIR; however, it does have an EF class to ensure the timely delivery of the control messages. This illustrates some of the variations on how the session table may be structured and utilized by the invention.

Resource Tables

The control module 200 of each provider edge node maintains local resource usage information concerning both provider-network-bound data tunnels and customer-equipment-bound data interfaces. These inter-related resource tables are shown in FIG. 29a and FIG. 29b and respectively illustrate the ingress resource table 232 and the egress resource table 237 maintained by the control module 200.

The resource tables maintain the available resource information for each data flow local to the PE node in which the control module 200 resides. As shown in FIGS. 29a and 29b, the inter-related resource tables 232, 237 support multiple service classes and the control module 200 keeps track of the available resource information per each traffic class.

Furthermore, the inventive resource tables 232, 237 support multiple types of PE/CE data interfaces including ATM, Ethernet, Frame Relay, PPP, RPR, Ethernet over SONET (EoS), LAPS, GFP-F, and Cisco-HDLC. As such, the inter-related resource tables of the invention may be termed multi-service-class/flexi-interface resource tables that may be used by provider edge nodes to negotiate consistently managed data tunnels across a provider network on behalf of data flowing from/to a diverse base of customer edge nodes.

The resource tables 232, 237 shown in FIGS. 29a and 29b provide a typical but non-limiting example of the invention and its many applications. Although three service classes are shown the number could vary. Some granularity in the number of service classes is desirable both from a standpoint in traffic negotiation but also in terms of creating different levels of service points necessary for a broad range of network offerings. The invention further improves these offerings by permitting network providers to make better use of their networks by admitting more pseudo-wires and, thereby, more customer traffic. Thus, not only does the invention permit customer traffic from diverse data interfaces to have multiple service classes, the invention also permits the provider network to more efficiently utilize all of the available bandwidth to carry this traffic.

Further details of the resource tables 232, 237 will become apparent in the following sections.

Operation Of Second Embodiment

The following sections describe the methods and operations of the second embodiment. These methods may be performed utilizing the elements described above or their equivalents.

Provisioning Pseudo Wires for Admission Control

This section describes the inventive method of provisioning pseudo-wires that permit admission control functionality. Following sections will describe both pseudo-wire shuffling and preemption according to the inventive concepts.

The provisioning of pseudo wires that will permit admission control functionality to operate is a process that includes the exchanging of specific resource information between PE nodes during the creation of pseudo-wires.

Setting up pseudo-wires (PW) may follow a procedure as defined in [PWE3-CTRL] or the procedure as defined above in the first embodiment. The second embodiment, however, modifies these provisioning processes to operate in context of and to otherwise permit admission control functions over pseudo-wires and in a more general context that is not necessarily limited to optical transport networks.

Figure 25A:
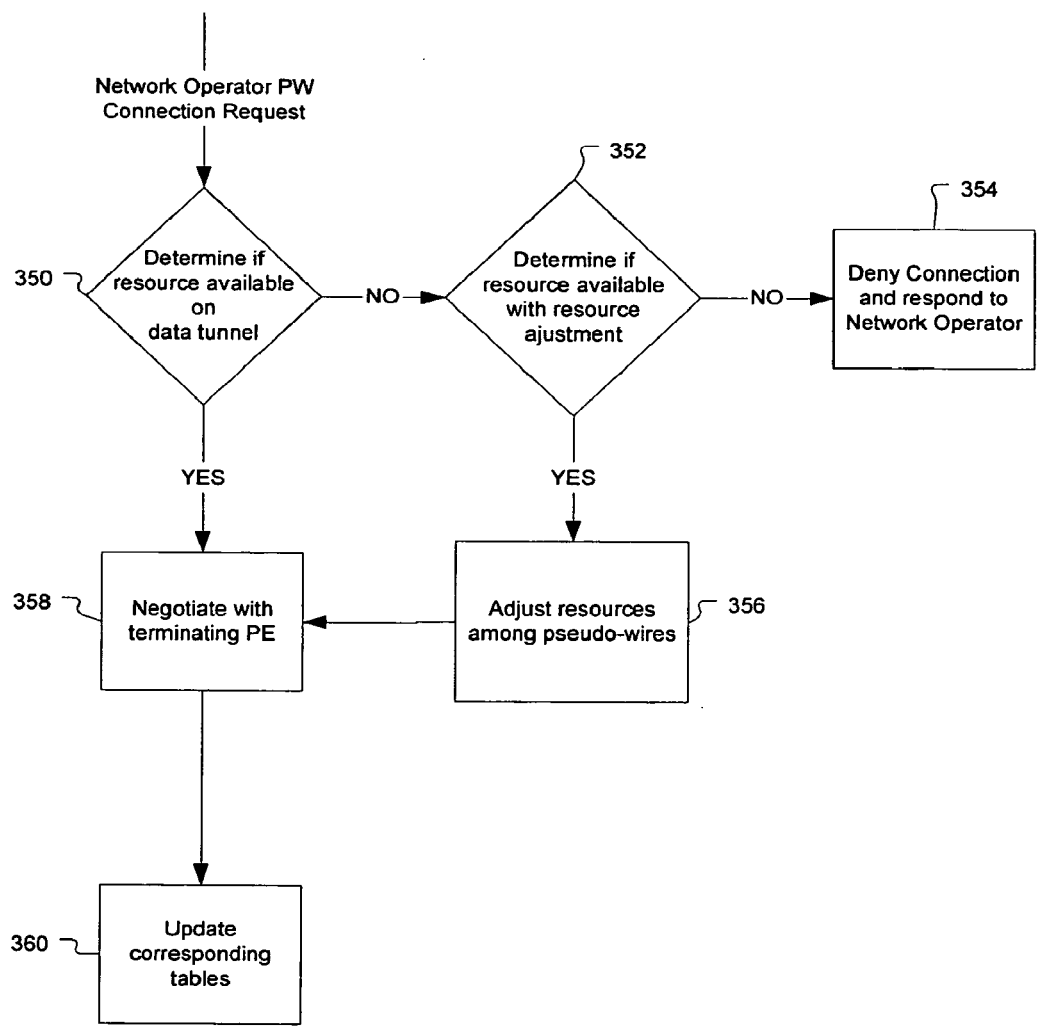
FIG. 25a is a high-level flowchart illustrating the processes and methods performed by the invention for pseudo-wire admission control provisioning from the perspective of an initiating point.
Figure 25B:
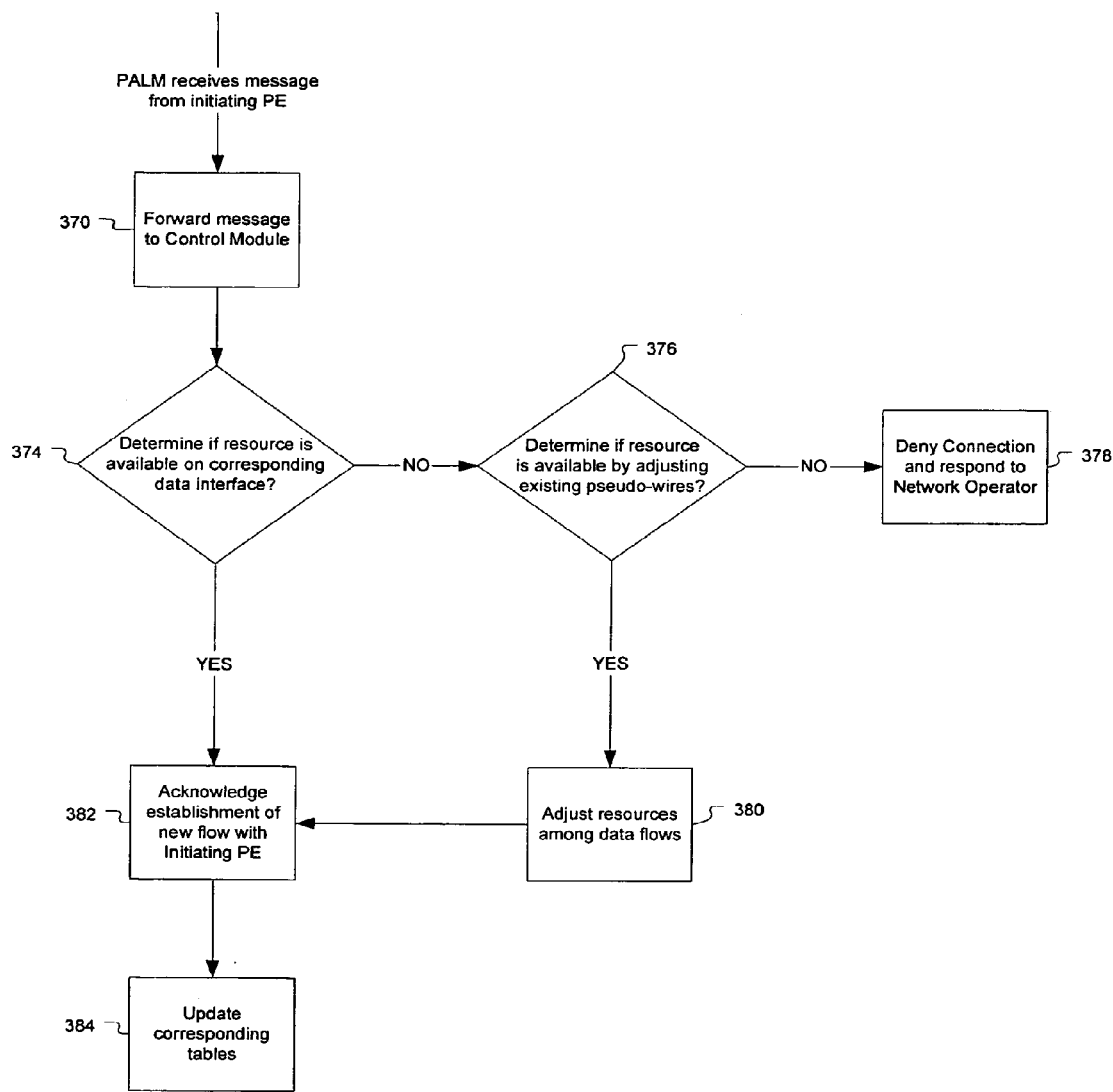
FIG. 25b is a high-level flowchart illustrating the processes and methods performed by the invention for pseudo-wire admission control provisioning from the perspective of an initiating point.

FIG. 25a FIG. 25b are high-level flowcharts illustrating the processes and methods performed by the invention for pseudo-wire admission control provisioning from the perspective of initiating and terminating points. For ease of illustration, the method in both figures operates on two PE nodes, each connected to a CE node. For reference sake, one of the PE edge nodes is called the Initiating PE and the other the Terminating PE.

As shown in FIG. 25a, the carrier/provider network requests to set up a data flow on the Initiating PE. The Initiating PE receives the message on its control module 200. The carrier network request includes the network resource information [CIR, Class, Setup Priority, Holding Priority] for the new data flow.

The AC control logic 220 may then determine (350) if there is enough bandwidth available of the data tunnel to support the new data flow connection request by referring to the ingress resource table 232. This determination (350) also includes the AC control logic 220 searching its packet filter table 260 to determine which data flows already exist that are configured to utilize the corresponding data tunnel. The CIR for all flows is tallied and the switch controller determines how much spare BW there is available on the data tunnel.

If the new data flow CIR would not exceed the data tunnel's capacity, the pseudo-wire manager 222 will negotiate with the corresponding Terminating PE node to continue the creation of the pseudo-wire (358).

If the addition of the requested data flow would cause the data tunnel to exceed its resource, then the AC control logic 220 searches the packet filter table 260 to determine (352) if the request can be accommodated by adjusting the existing flows toward the terminating point. Such adjustment may include preemption and shuffling as described in detail below. If the adjust can gather enough resources on the data tunnel for the new data flow, the AC control logic 220 will proceed to adjust (356) the flows. The pseudo-wire manager 222 may then continue the negotiation (358) of pseudo-wire with the terminating PE node. Otherwise, the AC logic 220 will refuse or otherwise deny (354) the connection.

Upon the completion of pseudo-wire creation, the AC logic 220 updates (360) the packet filter table 260 as well as the ingress resource table 232 with the network resource information for the new data flow.

At the terminating PE node, as shown in FIG. 25b, the control messages are captured and forwarded (370) to the local control module 200.

The termination PE node control module 200 will determine (374) the resource of the corresponding data port using the egress resource table 237 and by searching the circuit filter table 280 to determine the total CIRs of all pseudo-wire connections terminating on the given data port. If the requested data flow CIR would not exceed the data port capacity, the AC logic 220 will accept the new pseudo-wire.

If the addition of the requested data flow would cause the data port to exceed its resources, then the switch controller searches the circuit filter table 280 to determine (376) if the new flow can be accommodated by adjust the existing pseudo-wires, which we will describe in detail below. If more resource can be found, AC logic 220 will proceed with the resource adjustment (380) action. Otherwise, the AC logic 220 will deny (378) the connection.

Upon accepting a new flow, AC logic 220 will update (384) the corresponding entries in the circuit filter table 280 and egress resource table 237. As a part of pseudo-wire process as defined in LDP and draft-martini, the Terminating PE node will acknowledge (382) the establishment of the new flow to the Initiating PE node.

Note that FIGS. 26a and 26b are very similar in dealing with the data flow. However, FIG. 26a is the logic to admit flows into data tunnels in the backbone, while FIG. 26b is the logic dealing with the data interfaces going toward the customer networks.

FIG. 30 is a mid-level flowchart illustrating processes and method that may be performed by the invention for pseudo-wire admission control provisioning at both pseudo-wire initiating and terminating points (the PE nodes) and further including both pseudo-wire shuffling and pseudo-wire preemption processes to maximize the number of pseudo-wires admitted. The separate processes performed are indicated by the dashed line separating the respective initiating (labeled transmitting in the figure) initiating and the terminating (labeled receiving in the figure) PE node processes. Since the communication may be bi-directional the terms transmitting and receiving are not accurate in all circumstances but these terms are helpful to gain an understanding of the invention. The relevant components of the control module 200 and packet access line module 210 in the PE nodes that perform these methods are shown in FIG. 25.

Initiating Point Operation

At the initiating point, Pseudo-wire Admission Control Logic 220 (AC Logic 220) will initiate (700) a pseudo wire with another PE node. To do this, the AC logic 220 first determines (705) if there remains a sufficient amount of resources between the two PE nodes to satisfy the pseudo wire to be initiated. The determination (705) involves an extensive search in the Ingress Resource Table 232 (see FIG. 29a) for the available bandwidth. As mentioned above, network resource referred to here may be a multi-dimensional vector that includes bandwidth and traffic class therefore the determination is a class-by-class determination for available bandwidth that is facilitated by the ingress resource table 232.

It is possible and likely that there are multiple parallel data tunnels between two PE's. In this case, the provider may set up a pseudo-wire on any of the data tunnels (links) between the two PE nodes that can satisfy the resource requirement. The actual link selection may depend on the network provider's policy, which is a topic beyond the scope of this invention.

If there are not enough network resources, the AC Logic 220 will attempt to shuffle (710) pseudo-wires on all the links between two PEs. The goal of the shuffling (710) is to free up link resources to accommodate the new pseudo-wire. The mechanism for shuffling (710) will be described below. It is possible that the provider may not allow the practice of pseudo-wire shuffling to avoid traffic disturbance on operational data flows that may occur in some instances. It is also important to recognize, however, that such a potential traffic disturbance may be avoided by the invention. This may be done by the AC Logic 220 which, in the case that it determines that shuffling pseudo-wires would not free up enough resource for the new flow, would not permit shuffling to take place.

If it is determined (720) that shuffling (710) does not free up enough network resources, the AC Logic 220 will try to preempt (725) less important flows to make room for the new flow. We will describe the detailed preemption procedure (725) below. Note that the policy that determines or assigns relative importance levels to a flow is internal to network providers and their policies, and is also beyond the scope of this invention.

If it is determined (730) by AC Logic 220 that it cannot gather enough network resources by preemption (720), it will reject (735) the user's request for a new pseudo-wire creation. Otherwise, after the preemption (720) of the less important flows, AC Logic will once again shuffle (740) the remaining pseudo-wires and make enough room for the new flow.

Finally, AC Logic 220 formally admits the new pseudo wire flow by updating (745) the corresponding entries in ingress resource table 232 and packet filter table 260. The system will then continue the creation of the new pseudo-wire by exchanging control messages with the terminating node (750). The control messages may be routed to the terminating point via routers over the backbone network. Alternatively, the control message may be switched by pseudo-wire manager 222 to the provider backbone network via pseudo-wire controller 215 and egress process 217. In the latter case, the reliability and performance of the message delivery could be guaranteed by allocating network resources to control message traffic, as indicated in Session Table (FIG. 28). A particular and preferred example of such control messaging is described above in the first embodiment.

Terminating Point Operation

The control message from the initiating provider edge node is received (755) by the provider edge node that will serve as the terminating point. The new pseudo wire request is extracted from the encapsulated control message in a manner like that described above in relation to the first embodiment with a unique label identifying the message as a control message such that it may be routed to the pseudo-wire manager 222 and AC logic 220. Upon receiving (755) the new request from the initiating point, the terminating point's AC Logic 220 will determine (760) if the outgoing data interface has available resource to accommodate the new pseudo-wire.

If there are not enough network resources, the AC Logic 220 will try to preempt (765) the less important flows. If the pre-emption process (765) fails to free up enough network resources for the new pseudo-wire as determined (770) by the AC logic with reference to the egress resource table 237, AC Logic 220 will reject (775) the setup of the pseudo-wire. The rejection process (775) includes sending a control message back to the initiating PE node such that initiating node may update its packet filter table 260 and ingress resource table 232. Otherwise, the AC Logic 220 of the terminating node will admit the new flow by updating (780) its corresponding circuit filter table 280 and egress resource table 237.

Note that no shuffling or preemption should take place on pseudo-wires, unless AC Logic 220 determines that such action would gather enough resources for the new flow. Likewise, the pseudo-wire managers 222 of the initiating and terminating points should only trigger AC Logic 220 when there is a high probability that the new pseudo-wire would pass other checks, and be created successfully. Otherwise, it will cause unnecessary traffic disturbance to the existing data service.

Pseudo-Wire Shuffling

By applying pseudo-wire shuffling and preemption techniques described below in more detail, network providers can make better use of their network resources by admitting more pseudo-wires.

Figure 31:
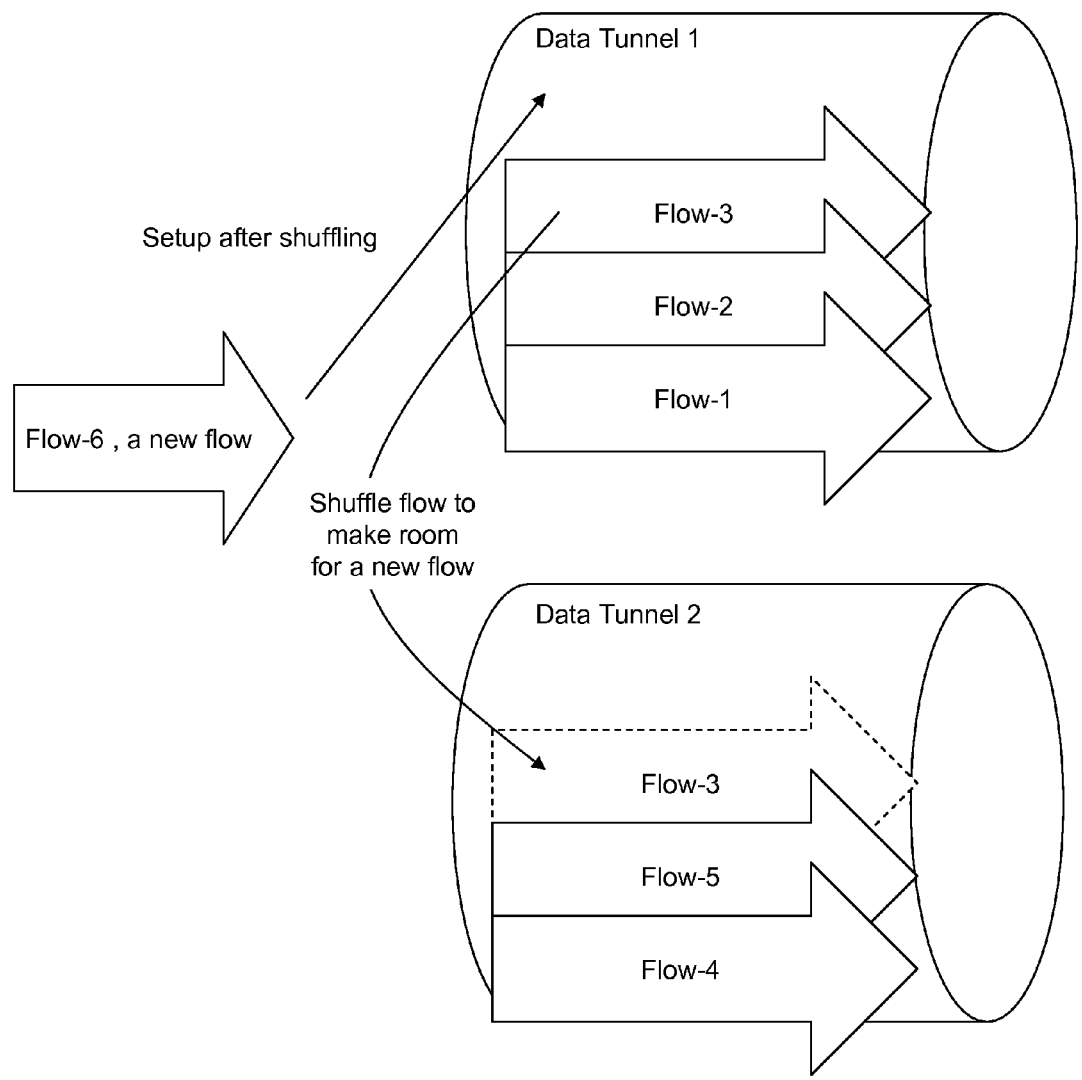
FIG. 31 diagrammatically illustrates the concept of pseudo-wire shuffling according to the invention.

FIG. 31 diagrammatically illustrates the concept of pseudo-wire shuffling according to the invention.

In the example shown therein, there are two parallel links (data tunnel 1 and data tunnel 2) between two PE nodes that together support five flows, Flow-1 to Flow-5. Before the new flow (Flow 6) arrives, data tunnel 1 carries Flows 1, 2 and 3. When a new flow, Flow-6, arrives, there are not enough resources on either of the links to admit the new flow. To admit Flow-6, AC Logic 220 can move Flow-3 from Data-Tunnel-1 to Data-Tunnel-2 as further illustrated in FIG. 31. After the moving, Flow-6 may be accommodated with Data-Tunnel-1. The invention refers to this "pseudo-wire shuffling" or "shuffling pseudo-wires."

It is to be noted that FIG. 31 is a bit simplistic in that the only network resource being fully illustrated is bandwidth while the invention is capable of handling bandwidth demands within a plurality of service classes. Nevertheless, FIG. 31 is helpful for understanding the inventive concept of shuffling pseudo-wires as that term applies to the full network resource vector.

The process of shuffling, in and of itself, is conventional. In fact, a similar practice has been done in plain old telephone systems (POTS) for years. However, the present invention represents a new application of the shuffling technique within the context of data (IP) networks in general and pseudo-wires in particular.

In addition, each shuffling requires extensive PE-node-to-PE-node negotiation on the "shuffled" flow. In FIG. 31, the moving of Flow-3 would trigger a deletion procedure in Data-Tunnel-1, followed by a creation procedure in Data-Tunnel-2. Both procedures require extensive control-plane message negotiation which may introduce impact on existing data flows and the performance of the control plane. There are mechanisms to alleviate the stress imposed by the shuffling one of which is described below but others of which are certainly applicable to the invention.

Figure 32:
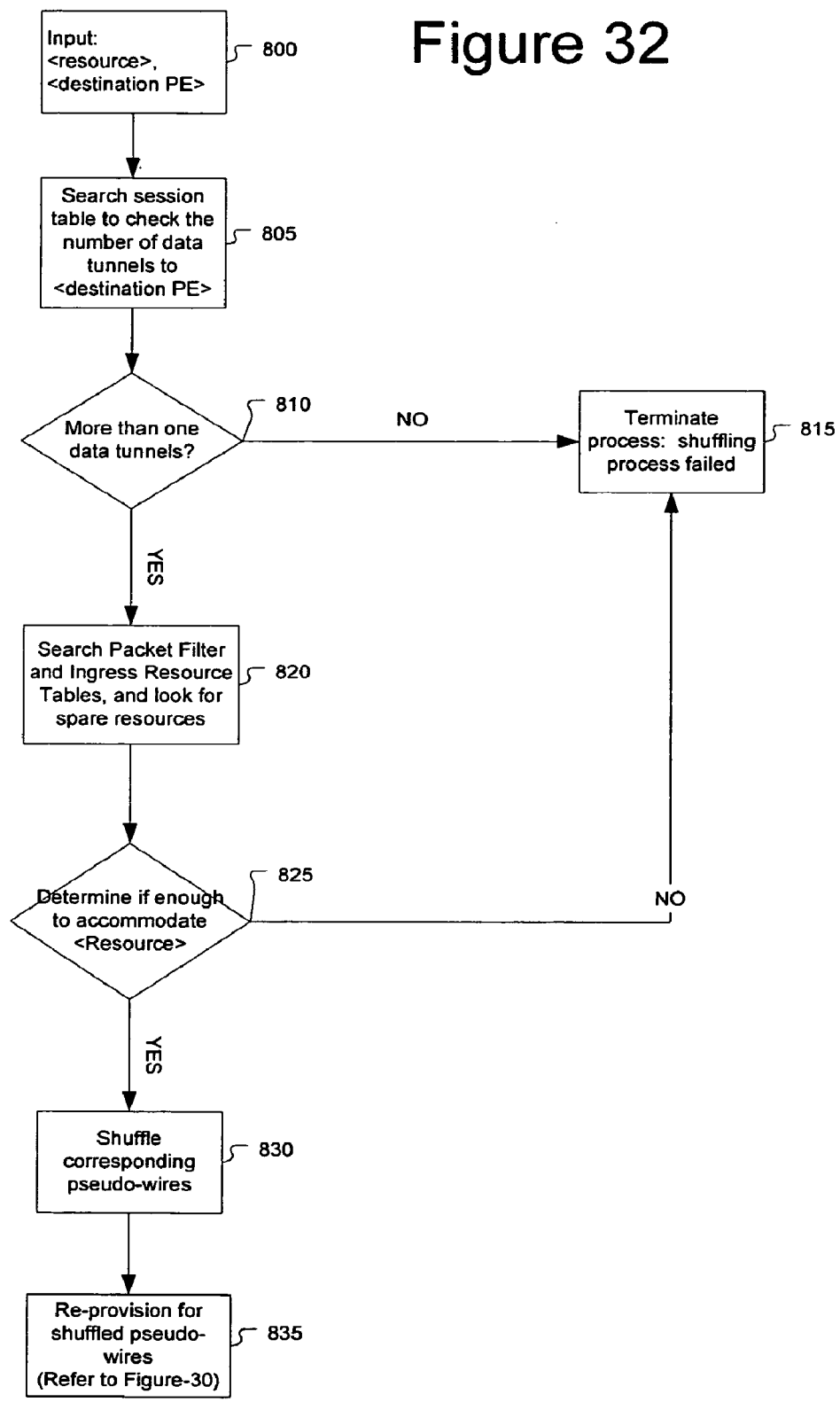
FIG. 32 is a high-level flowchart illustrating the process for shuffling pseudo-wires according to the invention.

FIG. 32 is an algorithm to shuffle pseudo-wires. In other words, the shuffling process of FIG. 32 is an example of how the shuffling steps 710, 740 (FIG. 30) may be performed.

As illustrated in FIG. 32, based on the new flow's inputted (800) resource requirement and destination PE node identification, the algorithm will first search (805) the session table 225 (FIG. 28) to check if there exists at least one parallel link (data tunnel) to the destination PE. If it is decided (810) that there is no parallel link (not more than one data tunnel), the process will terminate (815) since there is no place to shuffle old flows into. In other words, the shuffling process has failed and the new flow is not admitted.

If there is more than one data tunnel that the invention can use to shuffle flows, the algorithm will search (820) the packet filter table (FIG. 26) and Ingress Resource Table 232 (FIG. 29*a*) to determine if enough network resources can be found after shuffling one or multiple existing flows. The actual searching (820) procedure varies depending on network utilization, network topology, user traffic behavior, and provider policy. For example, shuffling could start on the data tunnel with the most available resource, or the one with the most physical bandwidth. Another implementation issue would shuffle the flows with the least resources first, vs. the ones with the most resources. Also, the selection of the shuffling flows can be sorted or random.

If the algorithm determines (825) that there are not enough network resources to accommodate the new flow, the algorithm will terminate (815) the shuffling process. Otherwise, the search procedure (820) will produce a list of pseudo-wires that may be shuffled by the shuffle step 830. Shuffling (830) a flow may follow the following sequence:

1. If possible, direct existing traffic to a backup link (e.g. such as using protection bandwidth triggered via a conventional APS (automatic protection switch) protocol for SONT/SDH traffic).

2. Negotiating with the destination PE to create a new pseudo-wire over the data tunnel where the flow will move into. The negotiation can be the same pseudo-wire setup procedure described in LDP, draft-martini or FIG. 30 above.

3. If possible, upon the completion of the new pseudo-wire, move data traffic into the new data tunnel from the backup link.

4. Notify the destination PE to withdraw the pseudo-wire from the old data tunnel. The negotiation can be the same pseudo-wire withdrawal procedure described in LDP, draft-martini or FIG. 30 above.

5. Update the corresponding entries in the Packet Filter Table 260 (FIG. 26), and Ingress Resource Table 232 (FIG. 29*a*).

Note that in the above sequence, shuffling a flow is preferably a "make-before-break" process, which does not impact the ongoing user traffic.

Figure 34:
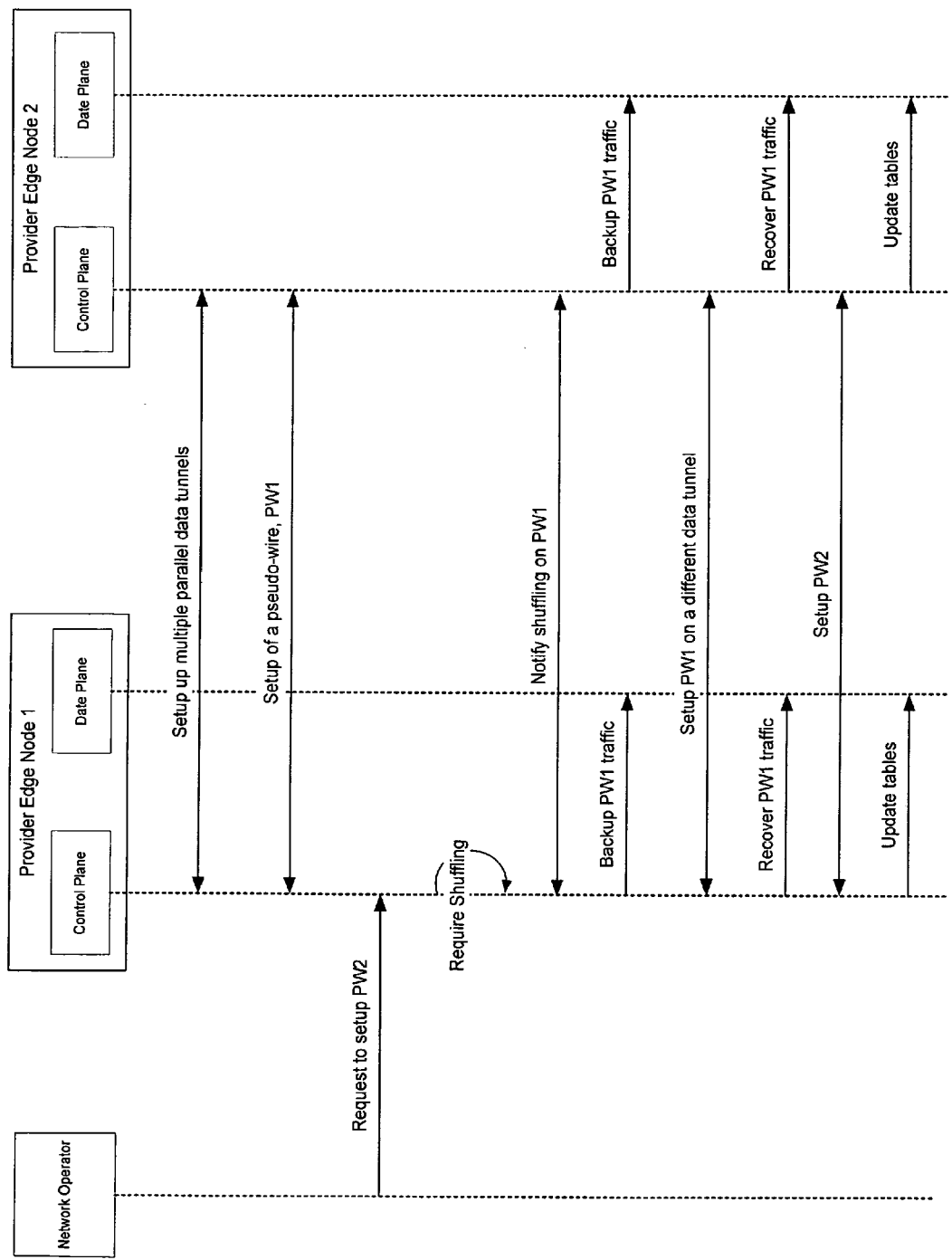
FIG. 34 shows the operational sequence of pseudo-wire shuffling between two PE nodes in terms of both the data plane and control plane.

FIG. 34 shows the operational sequence of pseudo-wire shuffling between two PE nodes in terms of both the data plane and control plane. It is assumed that there are multiple data tunnels and one pseudo-wire (PW1) between PE1 and PE2 initially. When a new pseudo-wire PW2 is admitted into the network, PE1 needs to shuffle PW1 into another data tunnel by first backing up PW1's traffic. It follows by setting up a new pseudo-wire on a different data tunnel. After PW1's traffic is redirected into the new pseudo-wire, PE1 can begin the process of setting up PW2 as further illustrated in FIG. 34.

Pseudo-Wire Preemption

Preemption, in and of itself, is a conventional technique for CAC (Call Admission Control). The general idea is to rank the importance, or priority, of a flow relative to the others competing for admission into a network. Priority considerations are utilized when a set of flows attempting admission through a node or a link that cause overbooking of resources. CAC resolves the overbooking or oversubscription problem by rejecting one or more of the flows competing for admission. Network nodes also use priorities to preempt some previously admitted low-priority flows in order to make room for a newer, higher-priority flow. The application of such CAC techniques in the specific environment disclosed herein, particularly in combination with the other features of the invention is a novel and highly advantageous features.

In the invention, two basic priority classes may be used for each flow: Setup Priority and Holding Priority which are defined above in detail and further discussed below.

Setup Priority is the relative importance (ranking) of a new pseudo-wire with respect to taking resources from other pre-established pseudo-wires.

Holding Priority is the relative importance (ranking) of an existing pseudo-wire with respect to holding the resources from being taken away or pre-empted by another pseudo-wire requesting admission.

For any data flow at an ingress and egress point, its Setup Priority is preferably less than or equal to the Holding Priority. The gap between Setup and Holding Priority makes it harder for a data flow to preempt others, but once it succeeds, the higher Hold Priority makes it easier for the flow to prevent being preempted itself This mechanism provides a mechanism for balancing between dependency and priority.

Both Setup and Holding Priorities may be assigned by the providers or network operators using a craft interface, network administrator node, or other known technique. The preemption algorithm of the invention applies at both ingress and egress interfaces of a pseudo-wire, as illustrated in the flowchart of FIG. 30 (e.g. see pseudo-wire preemption step 725 (transmit or ingress interface) preemption step 770 (receive or egress interface).

Figure 33:
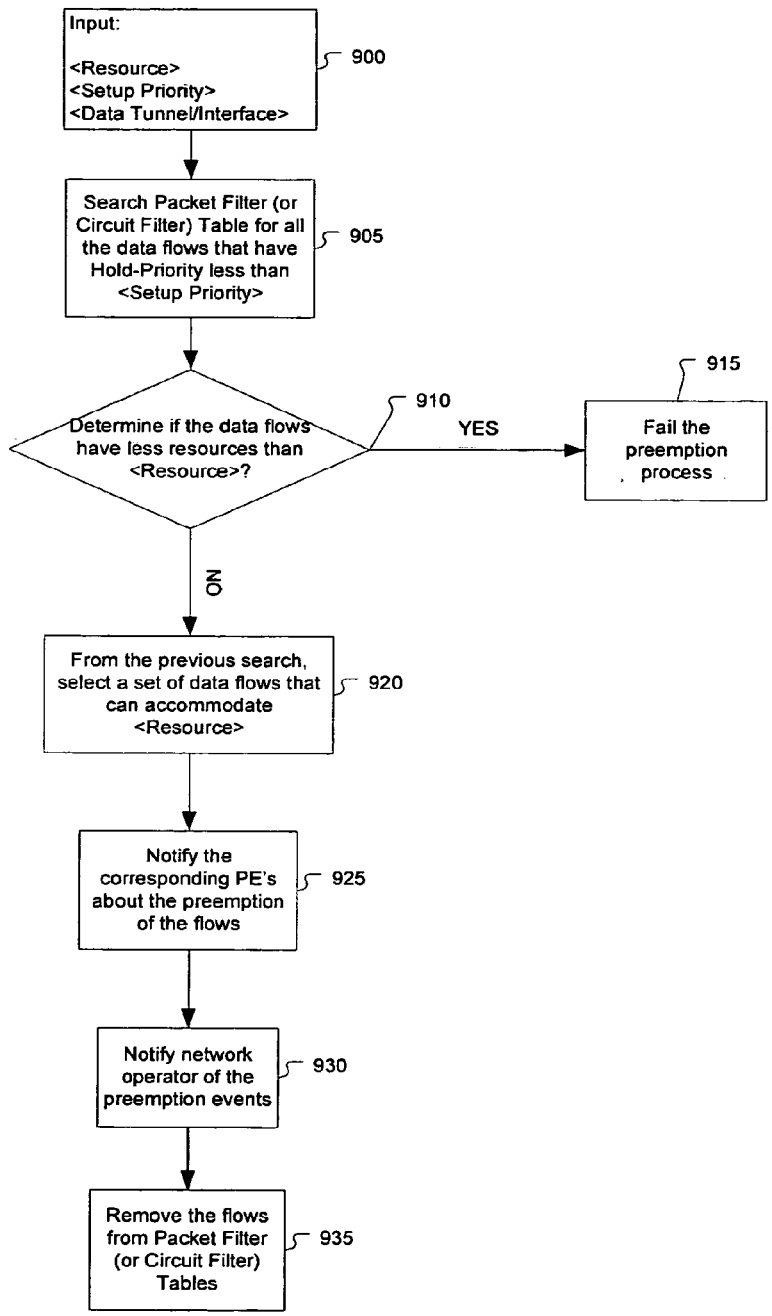
FIG. 33 is a high-level flowchart illustrating the process for preempting pseudo-wires according to the invention.

The preemption steps illustrated in FIG. 30 and discussed above may utilize the more detailed preemption algorithm illustrated in FIG. 33. The preemption algorithm requires an input (900) providing the information on a pseudo-wire's resource requirement, set-up priority and the data tunnel or interface where preemption will take place. Note that this algorithm is applied at both ingress and egress interfaces. At ingress, preemption may take place in a data tunnel, whereas preemption can remove less important flows from a data interface at an egress point.

The algorithm begins in earnest by searching (905) for all the flows having a holding priority less than the setup priority of the new flow. If at the ingress point, the searching (905) is done within the packet filter table 260.

With this information in hand, the method may then determine (910) if the combined resources from the selected flow(s) having a holding priority less than the setup priority are not enough to accommodate the new flow. If so, the algorithm will fail (915) the preemption process because the new flow simply cannot be accommodated according to the relative priority levels and resource demands. Otherwise, the algorithm will select (920) a set of flows that can accommodate the new flow and which may be preempted according to the relative setup and holding priorities. The combined resources from the selected (920) flows will be larger or equal to the resources required by the new flow. The actual selection mechanism (920) may be based on provider policy. For example, only the smallest flows would be preempted, or the flow selection can be random.

After the selection (920) of the preempting flows, the algorithm will notify (925) the PE nodes corresponding to the flows being preempted in order to trigger the pseudo-wire withdrawal procedure (defined in LDP and draft-martini) that removes the flows from the control-plane. The method should also notify (930) the network operator of the preemption events. After which or at the same time, the algorithm will update the corresponding entries in packet filter table 260, circuit filter table 280, ingress resource table 232 and egress resource table 237 as appropriate and thus remove (935) the flows from the data-plane.

Figure 35:
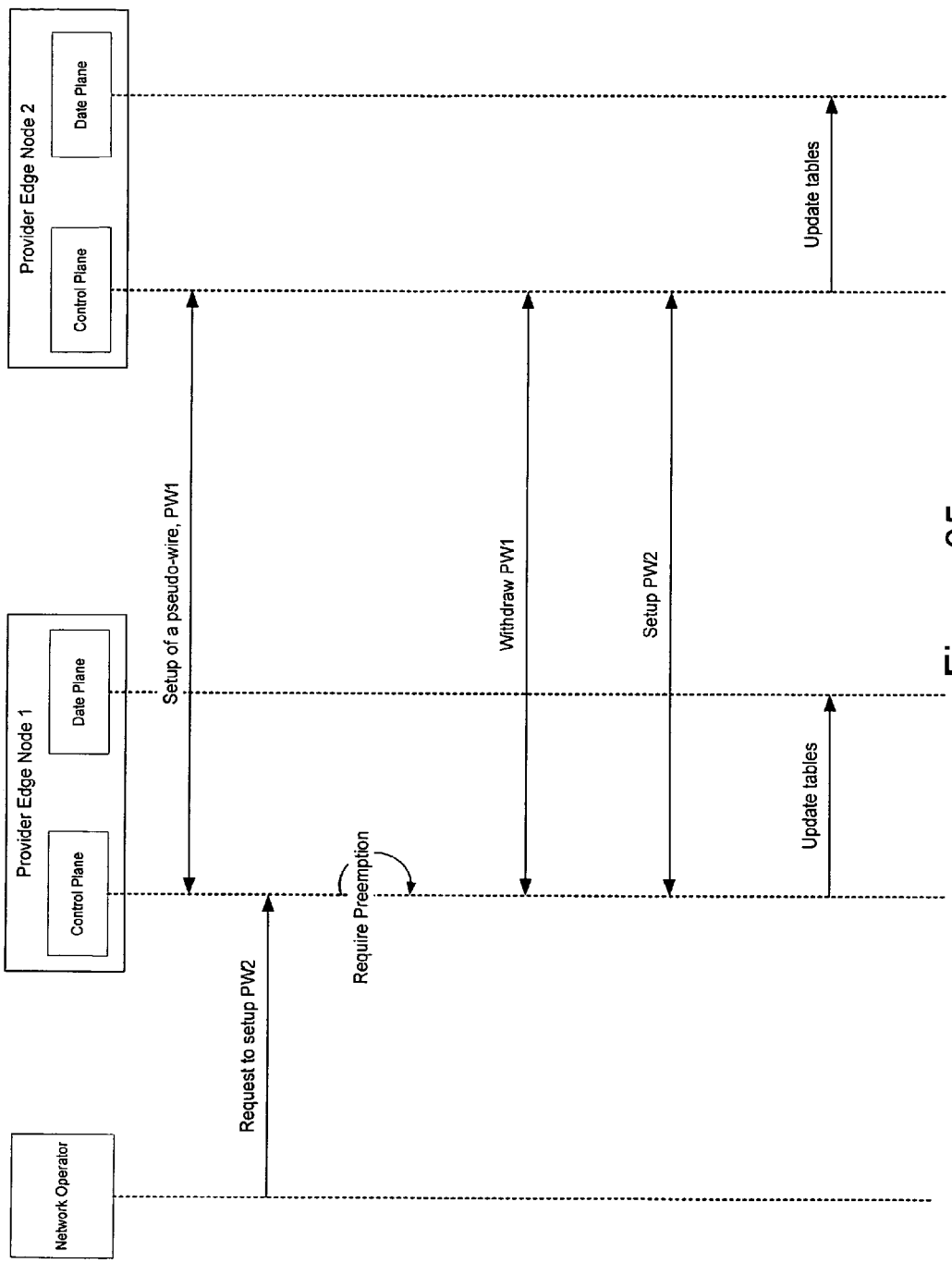
FIG. 35 shows the operational sequence for pseudo-wire preemption at an ingress point.
Figure 36:
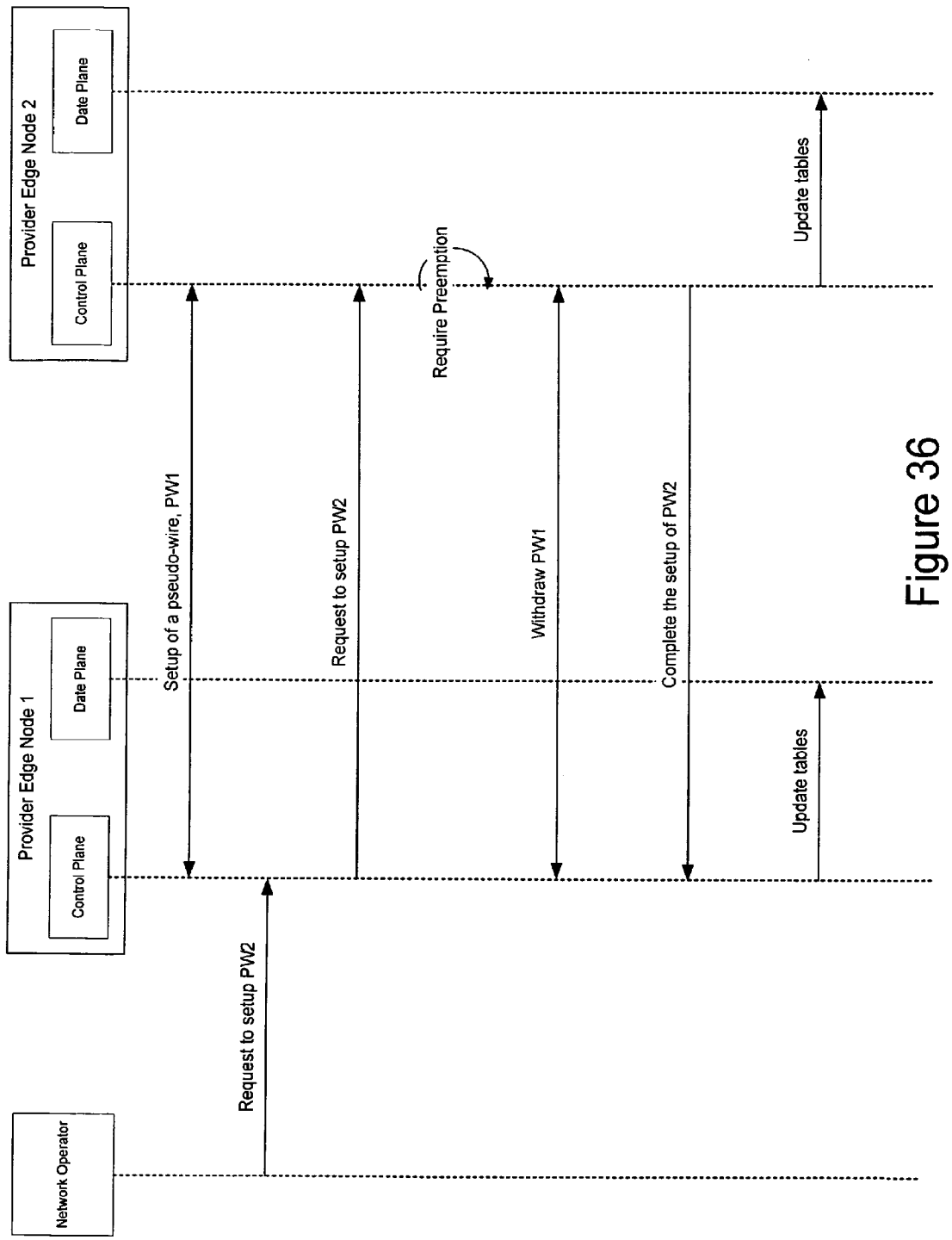
FIG. 36 shows the operational sequence for pseudo-wire preemption at an egress point.

FIG. 35 and FIG. 36 are the operational sequence diagrams for pseudo-wire preemption at ingress and egress, respectively. These diagrams show the operations relative to both the control plane and data plane relative to the initiating and terminating provide edge nodes 1 and 2. As detailed therein, the creation of a higher priority PW2 will result in the deletion of PW1.

It is important to realize that both shuffling and preemption can be applied during pseudo-wire modification as well and are not limited to pseudo-wire creation. For example, a user may decide to increase the bandwidth allocated to a pseudo-wire. The AC Logic 220 at both ingress and egress will apply appropriate mechanisms described in this invention to accommodate the modification request in much the same way as the creation or initiation or a pseudo-wire.

Third Embodiment

The invention also includes a third embodiment that is generally directed to pseudo-wire probing. The pseudo-wire probing feature allows the network operators to actively detect the aliveness of pseudo-wires from network edge.

The general concept is derived from LSP-ping [LSP-PING], which supports both RSVP-TE and LDP. All probing packets may use UDP (port 3503).

The existing LSP-ping is to "ping" at the FEC level. The processing procedure can be very complex due to LSP merging among nodes inside the network. Worse, for load-balanced traffic, the LSP-ping cannot probe the intended path accurately.

To probe pseudo-wires, the invention modifies the scope of the conventional protocol and simplifies the implementation. The invention essentially probes edge-to-edge, point-to-point connections. For example, instead of "pinging" at FEC level, the invention will "ping" per VCID (that is, per pseudo-wire).

Since each pseudo-wire is always strictly a point-to-point connection between two network edges, the probing will always be accurate. Thus, the protocol level processing is largely simplified.

At the data processing level, at ingress, the invention marks the probing messages and injects them into the targeted pseudo-wires. The probing messages must be processed differently at the PPE. Each probe message is encapsulated with a special control word beneath the MPLS header as described above in relation to the first embodiment.

The procedure of the third embodiment is as follows:

The control module will provide the following to the PALM:
  probing message payload;
  message length;
  the targeted pseudo-wire ID.

On the PALM, the CPU and the PPE will perform the following method:
  1. Based on the pseudo-wire ID, the CPU constructs a MPLS header and a layer-2 header to the probing message. The MPLS label and the layer-2 id's (such as VLAN-tag, DLCI, etc.) must be the same as the ones used by the pseudo-wire that carries user traffic.
  2. In addition, a Control Word needs to be created and inserted beneath the MPLS header.
  3. Update the message length field in the layer-2 header.
  4. Send out the control messages through the same SNC used by the user traffic.

At the egress edge, the PPE performs the following method:
  1. After checking on the incoming MPLS label, check if there exists a control word that indicates the packet is a probing message.
  2. If the result is negative, forward the packet to the corresponding outgoing port.
  3. Otherwise, forward the packet to the CPU, which in turn will send it up to the control module.

It is to be understood that the inventive concepts are not limited to SONET and also include SDH which is the prevailing standard in Europe and emerging standards such as OTN. In other words, although the invention (particularly the first embodiment) is described mainly in terms of SONET in the interest of simplifying the description, the inventive concepts may be equivalently applied to SDH or OTN networks.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A control module for a provider edge node of a provider network, comprising:
    a session table storing control information relating to peering sessions between the provider edge node and the provider network;
    a circuit table storing, for each data tunnel, data tunnel identification data, encapsulation label data, outgoing data packet interface identification data, CIR data, class data, setup priority data, and holding priority data;
    a packet table storing, for each data packet flow, packet data interface identification data, data tunnel identification data, encapsulation label data, CIR data, class data, setup priority data, and holding priority data;
    an ingress resource table storing, for each data runnel, data tunnel identification data, physical bandwidth data and available bandwidth for each of a plurality of classes;
    an egress resource table storing, for each egress data interface, egress data interface identification data, physical bandwidth data, available total bandwidth data, and available bandwidth for each of a plurality of classes;
    admission control logic operatively connected to said session table, said circuit table, said packet table, said ingress resource table, and said egress resource table;
    said admission control logic referring to said session table, said circuit table, said packet table, said ingress resource table, and said egress resource table to perform admission control on behalf of a new data flow requesting ingress to and egress from the provider network.

2. A method of establishing pseudo-wires between an initiating provider edge node and a terminating provider edge node of a provider network so as to permit admission control, comprising:
    initiating a pseudo-wire request from the initiating provider edge node requesting a new data flow having a network resource requirement;
    searching an ingress resource table for available network resources on one or more data tunnels to determine if there is a sufficient amount of available network resources on one or more data tunnels connecting the initiating and terminating provider edge nodes to satisfy the new data flow;
    wherein upon the determination that there is a sufficient amount of available network resources to satisfy the new data flow, the method further comprises:
        updating a packet table associated with the initiating provider edge node with the network resource requirement of the new data flow;
        updating the ingress resource table with the network resources to be consumed by the new data flow; and
        creating and sending a control message to the terminating provider edge node requesting a pseudo-wire to be set up between the initiating and terminating provider edge nodes to carry the new data flow;
    wherein at the terminating provider edge node, the method further comprises:
    receiving the control message requesting a pseudo-wire to be set up between the initiating and terminating provider edge nodes; and
    determining if there are enough available network resources on the outgoing data interface to accommodate the new data flow based on the information contained in the control message and an egress resource table.

3. The method according to claim 2, wherein upon the determination that there is a sufficient amount of available network resources on the outgoing data interface to accommodate the new data flow, the method further comprises:
    updating a circuit table associated with the terminating provider edge node with the network resource requirement data of the new data flow; and
    updating an egress resource table with the network resources to be consumed by the new data flow.

4. The method according to claim 2, wherein upon the determination that there is not a sufficient amount of available network resources on the outgoing data interface to accommodate the new data flow, the method further comprises:
    rejecting the pseudo-wire request.

5. The method according to claim 3,
    wherein the network resource requirement of the new data flow includes CIR data and class data.

6. A method of establishing pseudo-wires between an initiating provider edge node and a terminating provider edge node of a provider network so as to permit admission control, comprising:
    initiating a pseudo-wire request from the initiating provider edge node requesting a new data flow having network resource requirements;
    determining if there is a sufficient amount of available network resources on one or more data tunnels connecting the initiating and terminating provider edge nodes to satisfy the new data flow;
    shuffling at least one existing pseudo-wire to accommodate the network resource requirements the new data flow if said determining step determines that there are insufficient available network resources; and
    preempting at least one existing pseudo-wire with the new data flow if said shuffling fails to provide enough network resources to accommodate the new data flow.

7. The method according to claim 6, said shuffling further including exchanging control messages between the initiating and terminating provider edge nodes to adjust the shuffled pseudo-wires and ensure that the existing pseudo-wires are not disturbed due to said shuffling.

8. The method according to claim 6, said preempting further including exchanging control messages between the initiating and terminating provider edge nodes to adjust the at least one preempted pseudo-wire, ensure that the remaining pseudo-wires are not disturbed due to said preemption, and ensure that data flows associated with the preempted pseudo-wire can be properly terminated.

9. The method according to claim 6, further comprising:
    re-determining, after said shuffling and said preempting, if there is a sufficient amount of available network resources on one or more data tunnels connecting the initiating and terminating provider edge nodes to satisfy the new data flow based on the network resource requirements of the new data flow and an ingress resource table.

10. The method according to claim 9, wherein upon the re-determination that there is not a sufficient amount of available network resources to satisfy the new data flow after said shuffling, the method further comprises:
    rejecting the new data flow request.

11. The method according to claim 9, wherein upon the re-determination that there is a sufficient amount of available network resources to satisfy the new data flow after said shuffling, the method further comprises:
    re-shuffling at least one existing pseudo-wire to accommodate the network resources of the new data flow.

12. The method according to claim 6,
said determining step searching an ingress resource table for available network resources on one or more data tunnels existing between the initiating and terminating provider edge nodes.

13. The method according to claim 12,
wherein upon the determination that there is a sufficient amount of available network resources to satisfy the new data flow, the method further comprises:
updating a packet table associated with the initiating provider edge node with the network resource requirements of the new data flow;
updating the ingress resource table with the network resources to be consumed by the new data flow; and
creating and sending a control message to the terminating provider edge node requesting a pseudo-wire to be set up within at least one data tunnel between the initiating and terminating provider edge nodes to carry the new data flow.

14. The method according to claim 13, wherein at the terminating provider edge node the method further comprises:
receiving the control message requesting a pseudo-wire to be set up between the initiating and terminating provider edge nodes; and
determining if there are enough available network resources on the outgoing data interface to accommodate the new data flow based on the information contained in the control message and an egress resource table.

15. The method according to claim 14, wherein if said determination step determines that there are not enough available network resources on the outgoing data interface to accommodate the new data flow, the method further comprises:
preempting bandwidth between the terminating provider edge node and a customer equipment node connected to the terminating provider edge node via the outgoing data interface and the associated pseudo-wire in order to accommodate the new data flow.

16. The method according to claim 15, further comprising:
re-determining, after said preempting, if there are enough available network resources on the outgoing data interface to accommodate the new data flow based on the information contained in the control message and an egress resource table.

17. The method according to claim 16, wherein upon the re-determination that there is not a sufficient amount of available network resources on the outgoing data interface to accommodate the new data flow, the method further comprises:
rejecting the pseudo-wire request.

18. The method according to claim 14, wherein upon the re-determination that there is not a sufficient amount of available network resources on the outgoing data interface to accommodate the new data flow, the method further comprises:
updating a circuit table associated with the terminating provider edge node with the network resource requirements of the new data flow; and
updating an egress resource table with the network resources to be consumed by the new data flow.

19. The method according to claim 18,
wherein the network resource requirements of the new data flow include CIR data, class data, setup priority data, and holding priority data.

* * * * *